(12) United States Patent
Behzadpour et al.

(10) Patent No.: US 11,613,341 B2
(45) Date of Patent: Mar. 28, 2023

(54) WING ASSEMBLY HAVING WING JOINTS JOINING OUTER WING STRUCTURES TO CENTER WING STRUCTURE

(71) Applicant: The Boeing Company, Chicago, IL (US)

(72) Inventors: Forouzan Behzadpour, Woodinville, WA (US); Patrick B. Stickler, Everett, WA (US)

(73) Assignee: The Boeing Company, Arlington, VA (US)

( * ) Notice: Subject to any disclaimer, the term of this patent is extended or adjusted under 35 U.S.C. 154(b) by 22 days.

(21) Appl. No.: 17/376,124

(22) Filed: Jul. 14, 2021

(65) Prior Publication Data

US 2022/0033060 A1 Feb. 3, 2022

Related U.S. Application Data

(60) Provisional application No. 63/057,941, filed on Jul. 29, 2020.

(51) Int. Cl.
*B64C 3/32* (2006.01)
*B64C 3/18* (2006.01)
*B64C 3/26* (2006.01)

(52) U.S. Cl.
CPC .............. *B64C 3/32* (2013.01); *B64C 3/182* (2013.01); *B64C 3/185* (2013.01); *B64C 3/187* (2013.01); *B64C 3/26* (2013.01)

(58) Field of Classification Search
CPC .... B64C 3/32; B64C 3/26; B64C 3/18; B64C 3/185
See application file for complete search history.

(56) References Cited

U.S. PATENT DOCUMENTS

| 4,606,961 A | 8/1986 | Munsen |
| 7,871,040 B2 | 1/2011 | Lee |
| (Continued) | | |

FOREIGN PATENT DOCUMENTS

| CN | 106741849 | 5/2017 |
| EP | 1288124 | 3/2005 |
| (Continued) | | |

OTHER PUBLICATIONS

Unknown: "ATR 72 Cutaway Drawing", Dec. 31, 1989 (Dec. 31, 1989), retrieved from the Internet at <https://conceptbunny.com/atr-72/> retrieved on Nov. 24, 2021.

(Continued)

*Primary Examiner* — Timothy D Collins
*Assistant Examiner* — Eric Acosta

(57) ABSTRACT

A wing assembly includes a center wing structure and a pair of outer wing structures. The center wing structure includes a center wing front spar, a center wing rear spar, and an engine mounting location on each side of a wing centerline. Each outer wing structure includes an outer wing front and rear spar configured to be coupled respectively to the center wing front and rear spar to define a wing joint coupling the outer wing structure to the center wing structure. The center wing structure is configured such that the spar terminal ends of the center wing front and rear spars at each wing joint are located no further inboard than an engine centerline associated with the engine mounting location, and no further outboard of the engine centerline than ten percent of a distance between the engine centerline and the wing centerline.

20 Claims, 48 Drawing Sheets

(56) References Cited

U.S. PATENT DOCUMENTS

| | | | |
|---|---|---|---|
| 10,974,478 B2 | 4/2021 | Behzadpour | |
| 2003/0222170 A1* | 12/2003 | Wojciechowski | B64C 3/00 244/10 |
| 2011/0139932 A1* | 6/2011 | Matheson | B29D 99/0014 156/182 |
| 2011/0215202 A1* | 9/2011 | Rhoden | B64C 3/185 244/131 |
| 2012/0052247 A1 | 3/2012 | Pook | |
| 2013/0099058 A1* | 4/2013 | Payne | B29C 70/086 156/263 |
| 2016/0052214 A1 | 2/2016 | Behzadpour | |
| 2019/0016436 A1 | 1/2019 | Behzadpour | |
| 2019/0047676 A1 | 2/2019 | Behzadpour | |
| 2019/0283856 A1 | 9/2019 | Clapp | |
| 2020/0282692 A1 | 9/2020 | Behzadpour | |

FOREIGN PATENT DOCUMENTS

| | | |
|---|---|---|
| EP | 2657128 | 10/2013 |
| GB | 123910 | 3/1919 |
| GB | 474003 | 10/1937 |

OTHER PUBLICATIONS

Tropis, Thomas: "Figure 1 of the Certification of the composite outer wing of the ATR 72", Journal of Aerospace Engineering, Dec. 1, 1995 (Dec. 1, 1995), Retrieved from the Internet at <https://www.semanticscholar.org/paper/Certification-of-the-Composite-Outer-Wing-of-the-Tropis-Thomas/40759110bfe4b4e99d5b06ee2088c46053594ef1>retrieved on Nov. 24, 2021.

Ahamed et al. "Ply-interleaving technique for joining hybrid carbon/glass fibre composite materials," Composites Part A: Applied Science and Manufacturing, vol. 84, May 2016, pp. 134-146.

Maxpro Corporation, "Bolted Joint Design: The Difference Between Tension, Shear and Bending Joints," dated Apr. 25, 2018, available at <https://blog.maxprocorp.com/the-difference-between-tension-shear-and-bending-joints>.

Wang et al. "Application of Interface Technology in Nonlinear Analysis of a Stitched/RFI Composite Wing Stub Box," NASA technical memorandum 112837; National Aeronautics and Space Administration; Springfield, Va., 1997.

EPO, Extended European Search Repor for Appl. No. 21179475 dated Apr. 7, 2022.

* cited by examiner

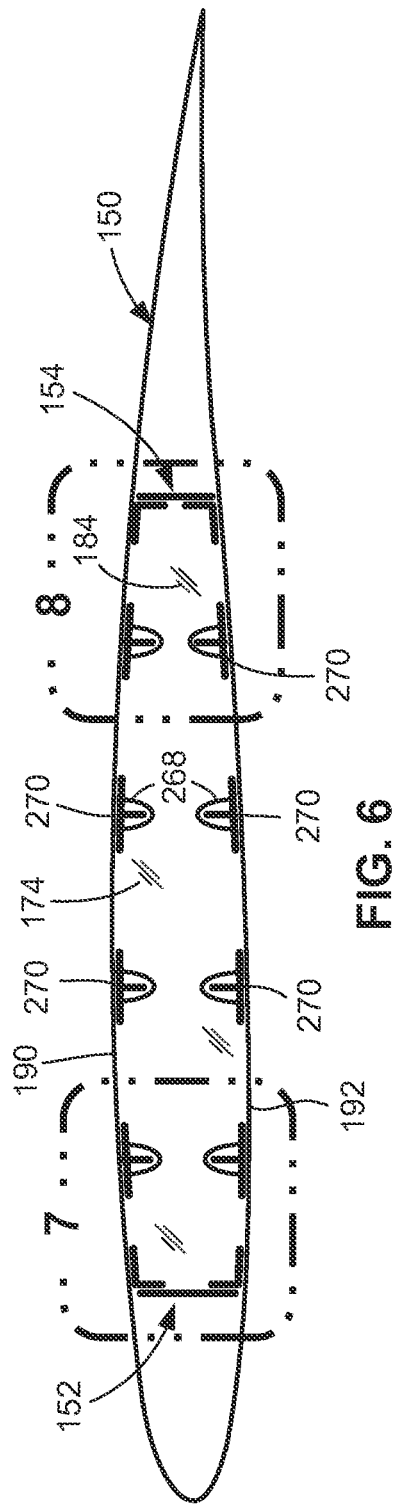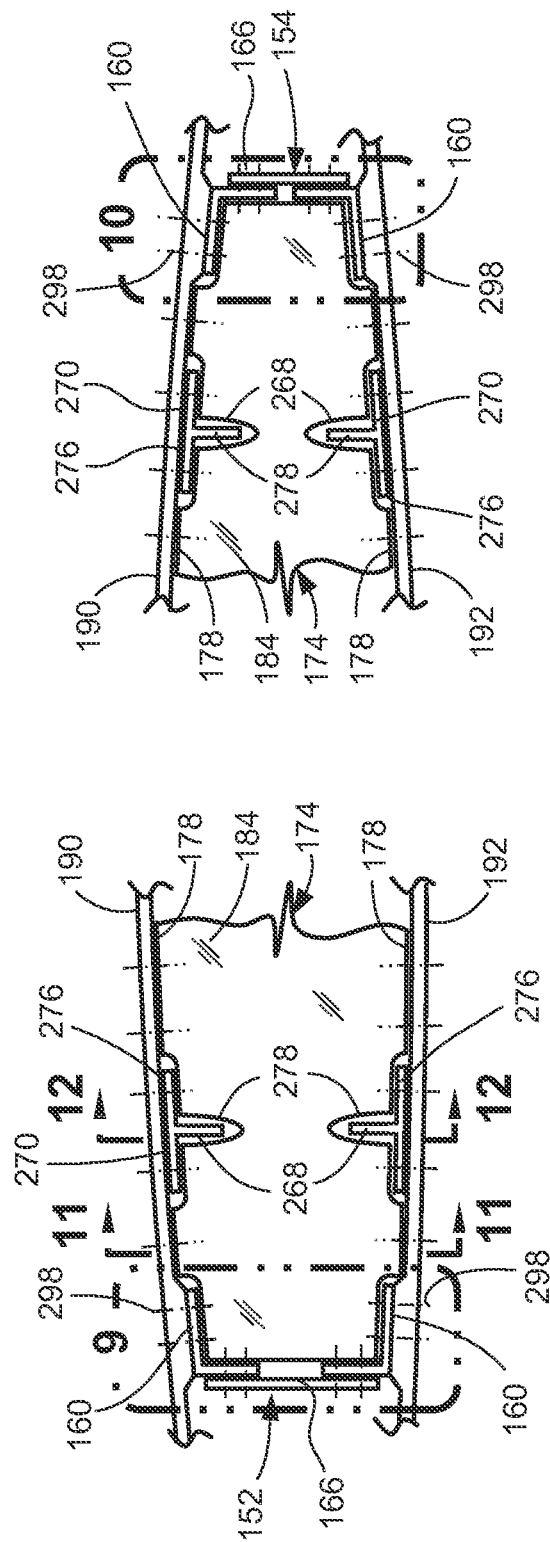

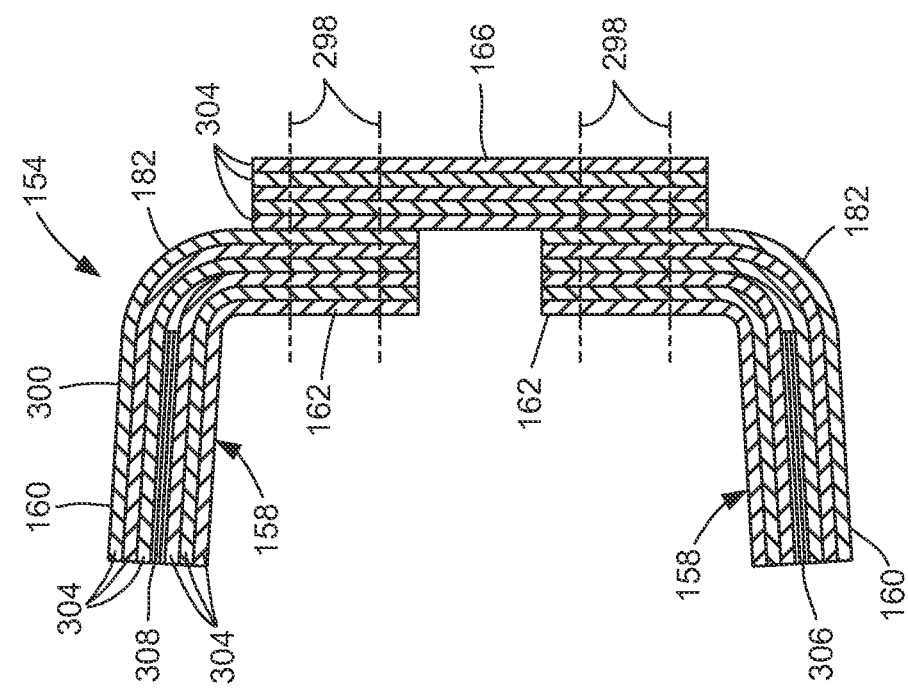
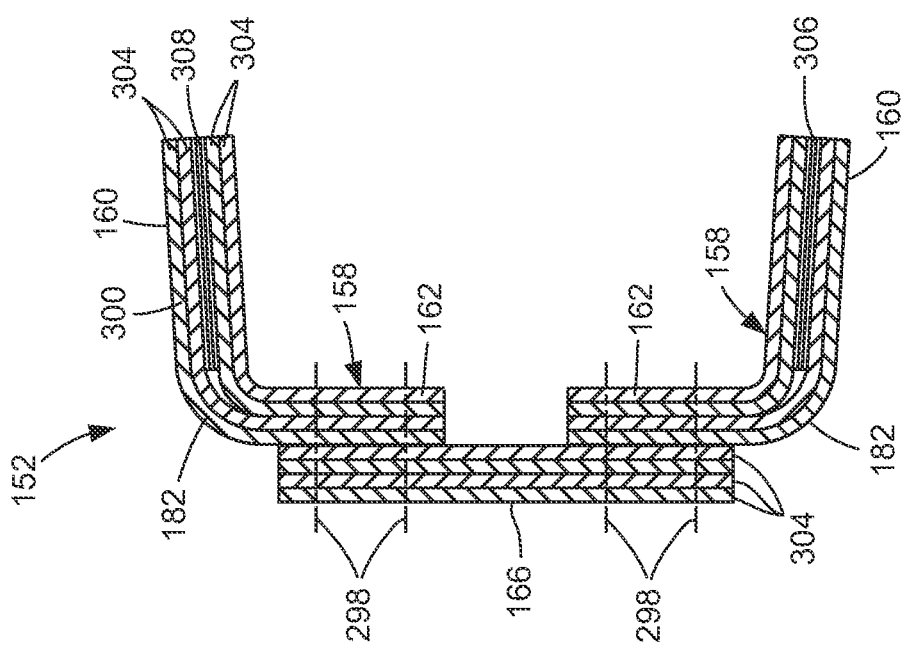

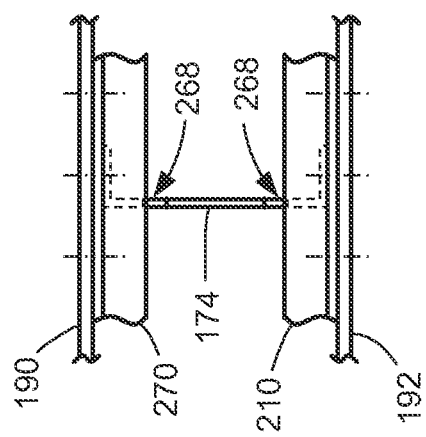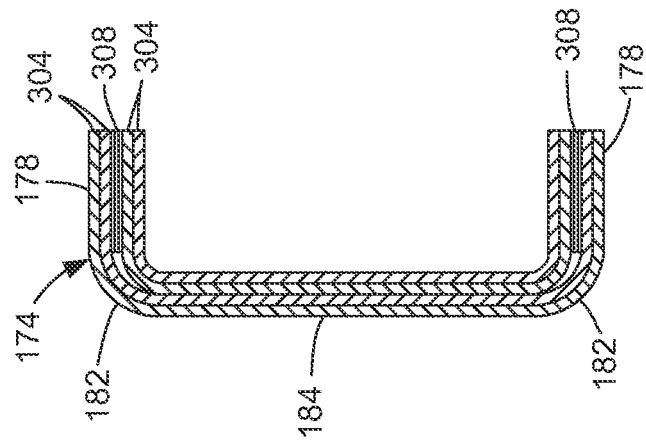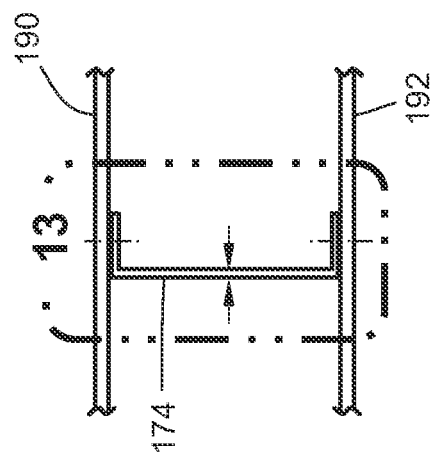

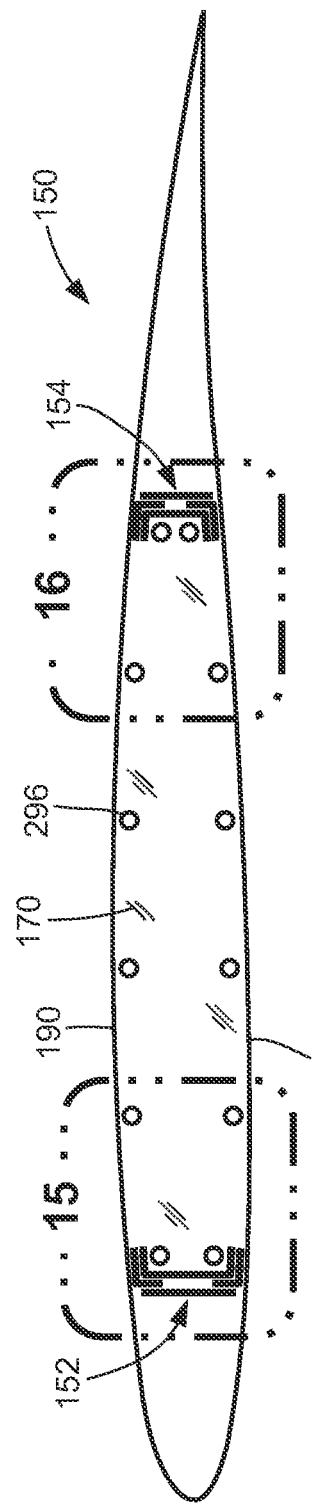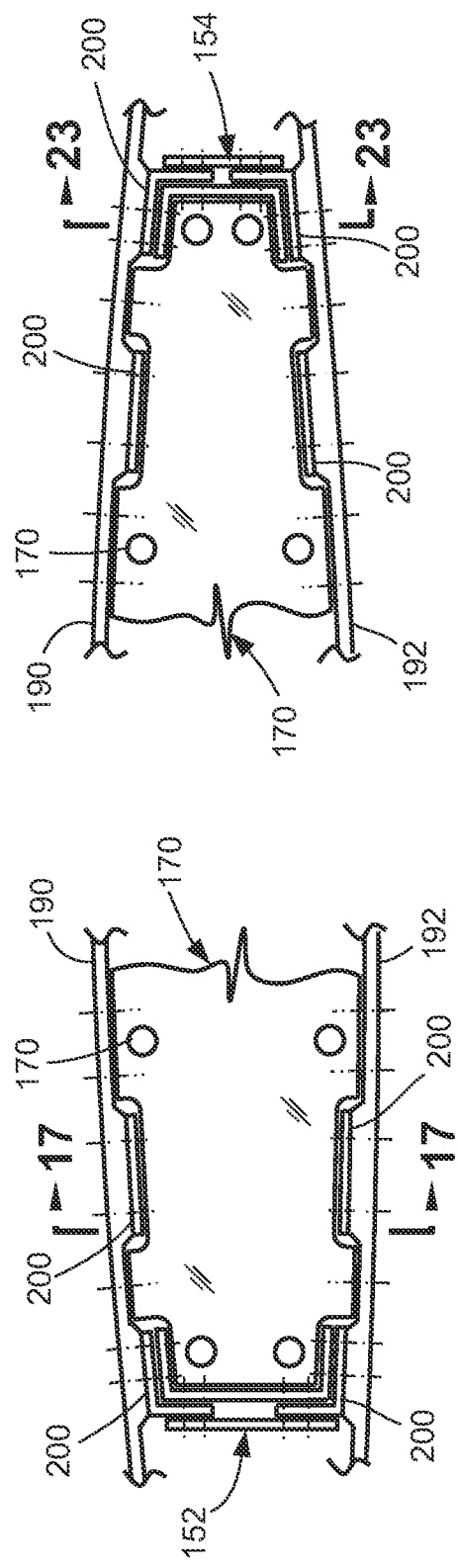

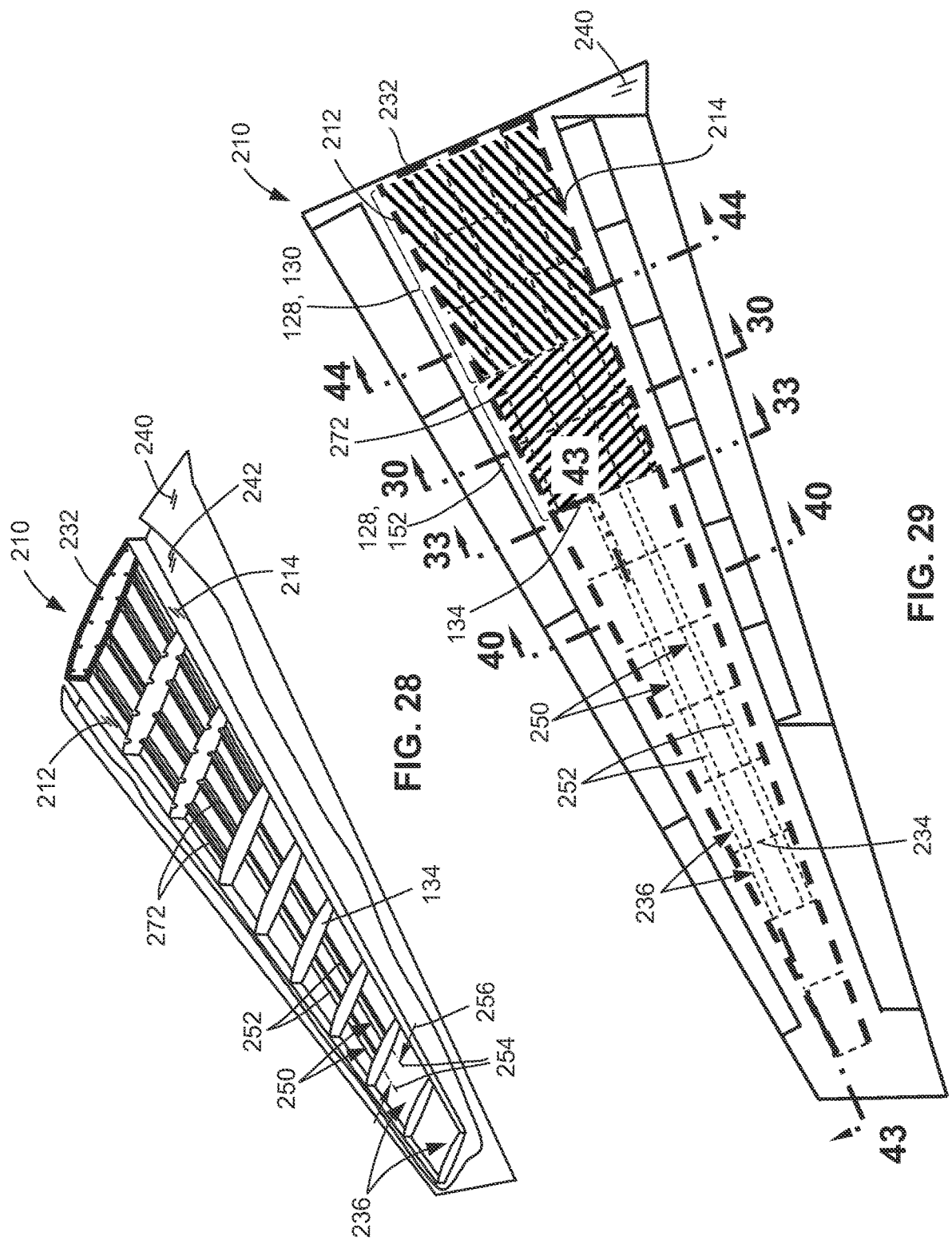

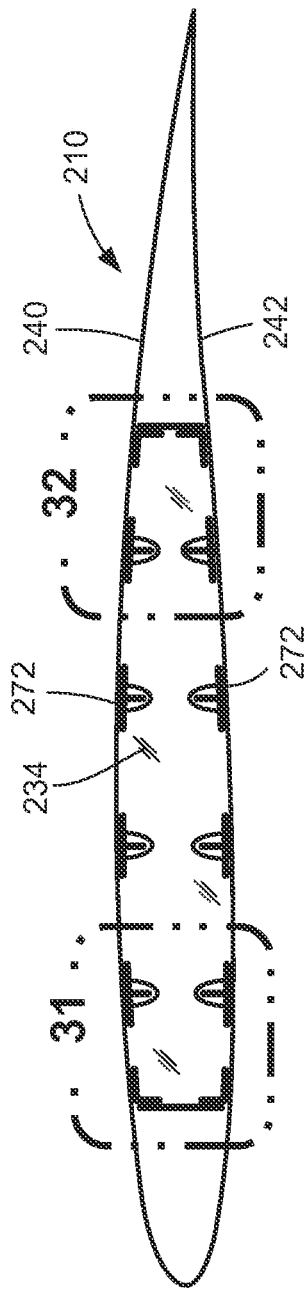
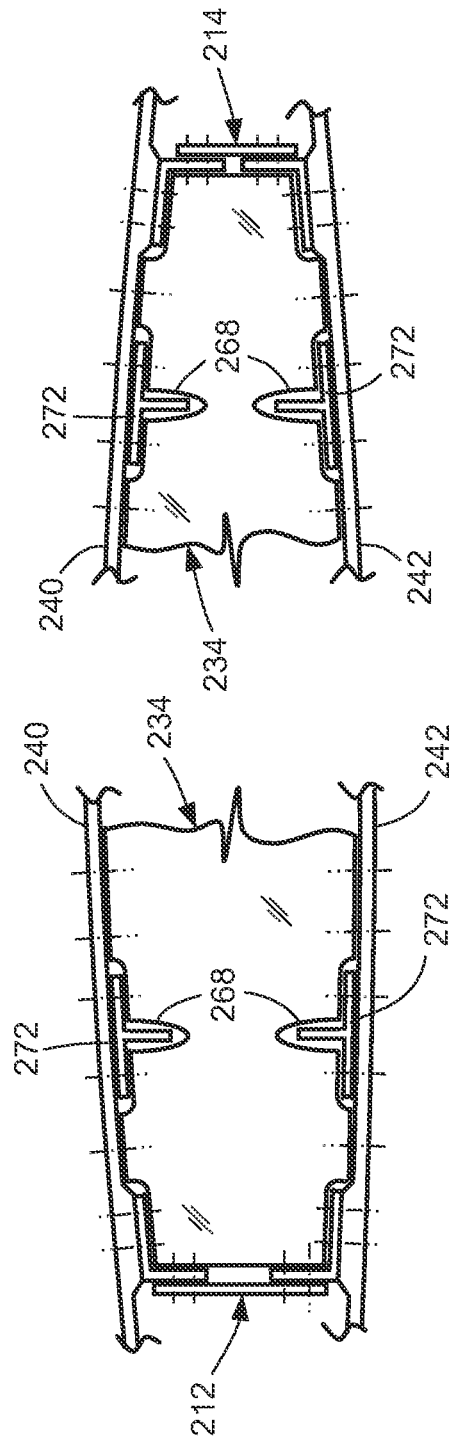

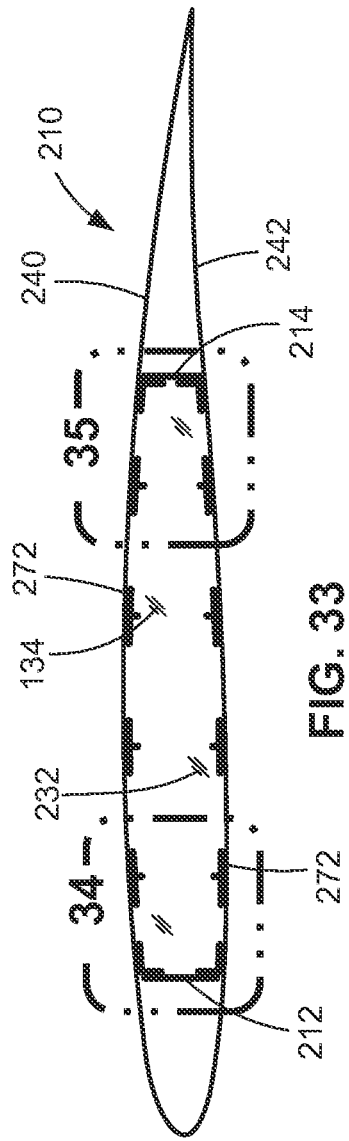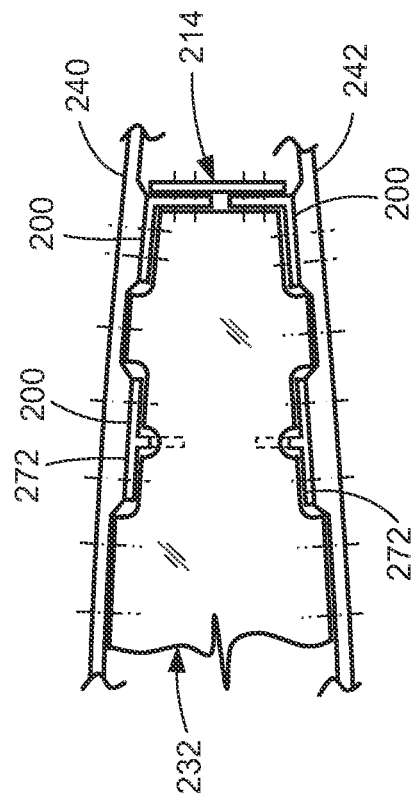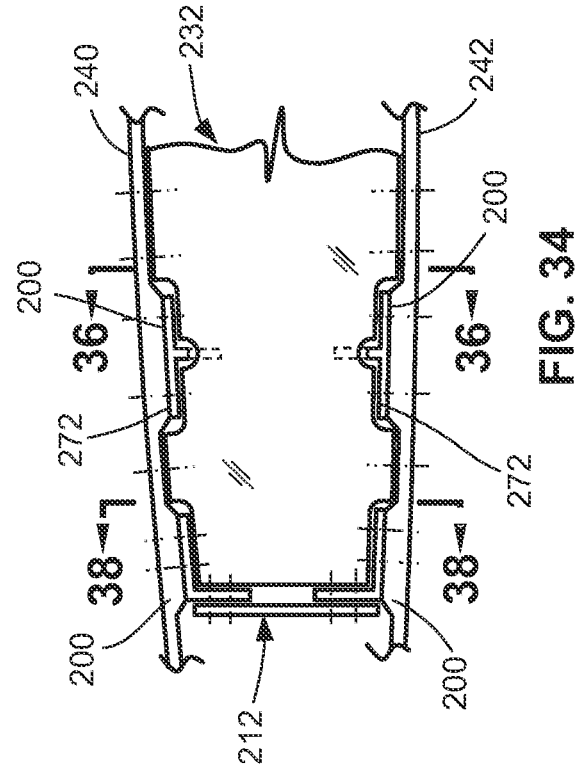
FIG. 33
FIG. 35
FIG. 34

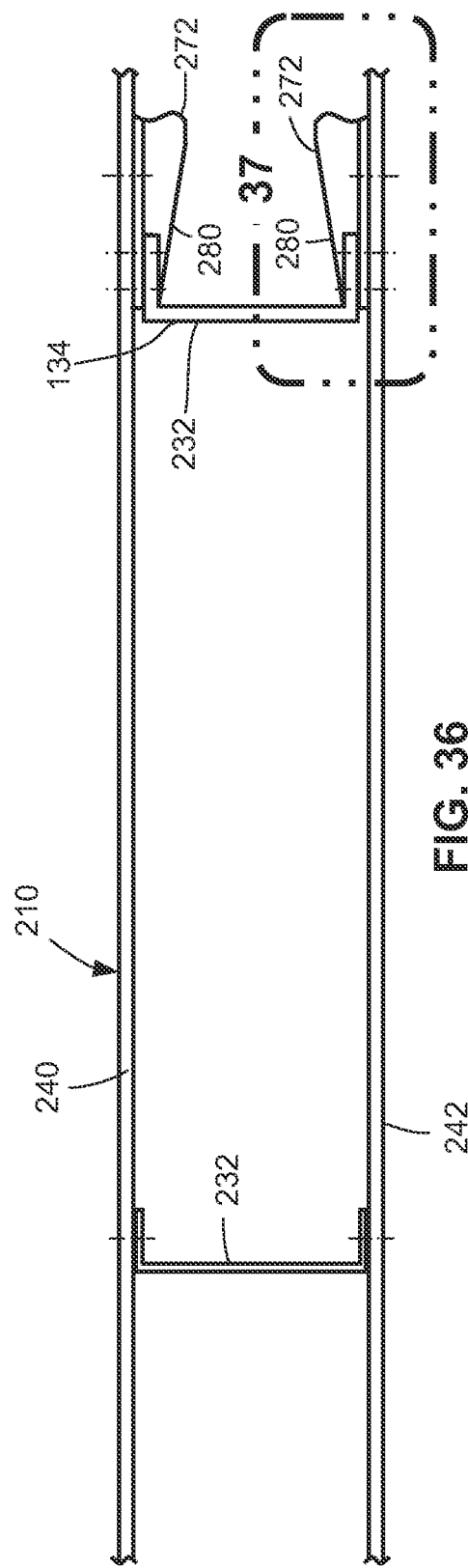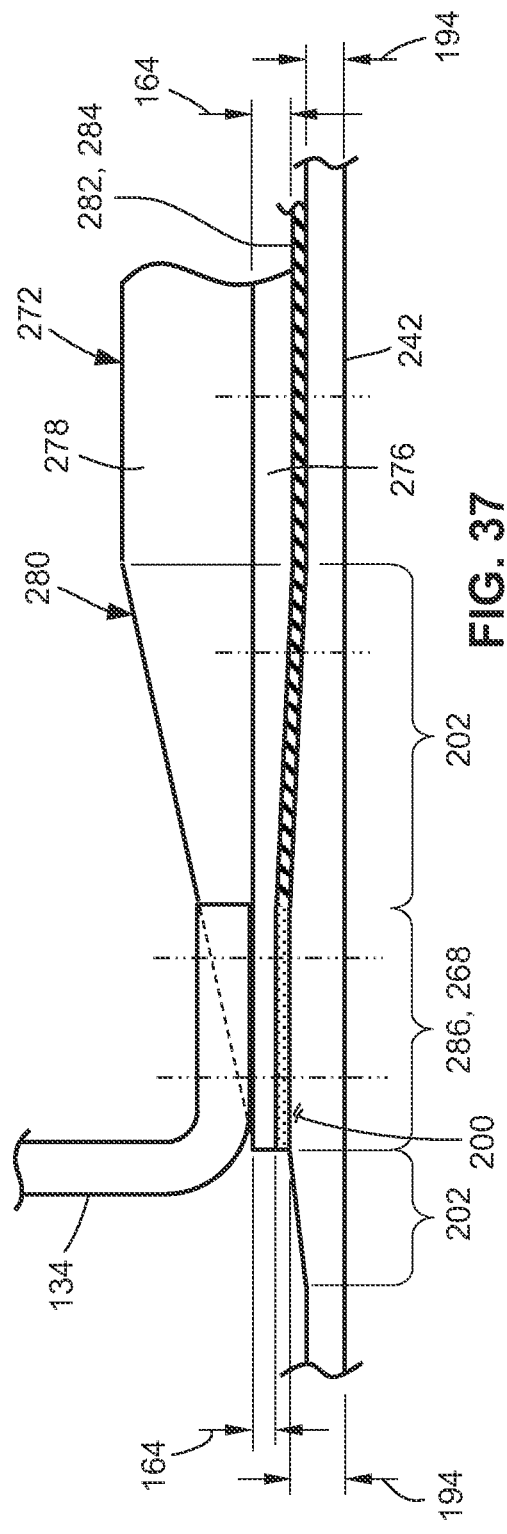

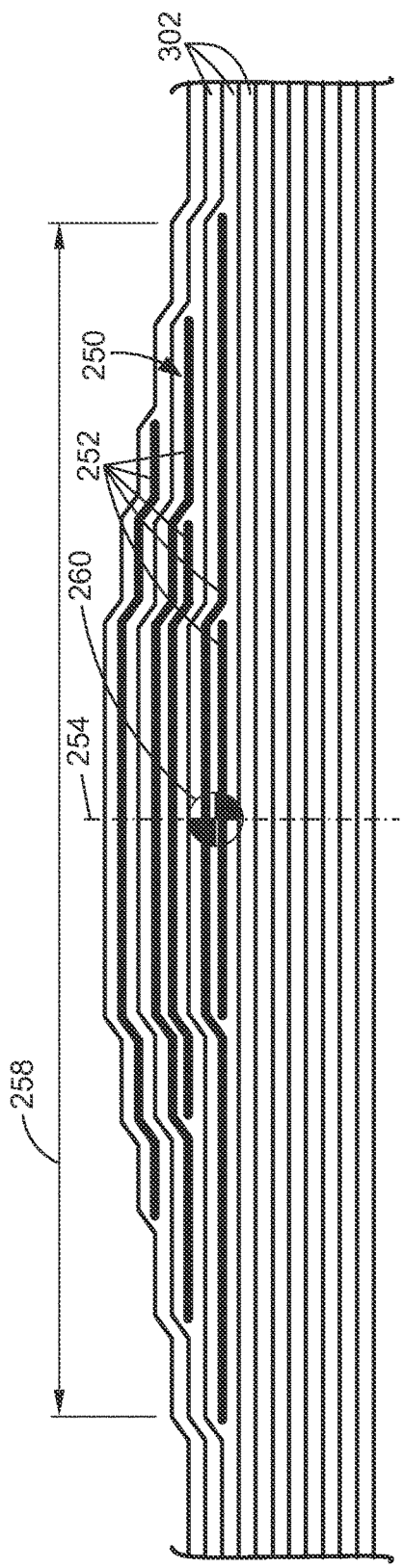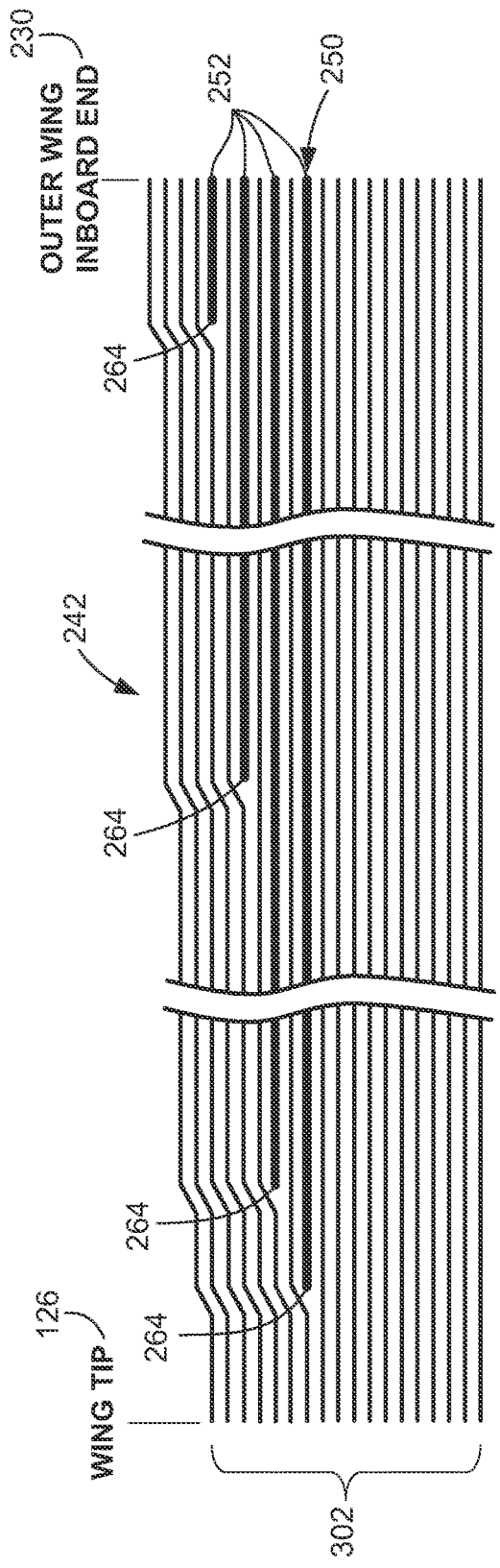

500

502

COUPLING AN OUTER WING INBOARD END OF EACH ONE OF A PAIR OF OUTER WING STRUCTURES RESPECTIVELY TO OPPOSING CENTER WING OUTBOARD ENDS OF A CENTER WING STRUCTURE TO DEFINE A PAIR OF WING JOINTS COUPLING THE OUTER WING STRUCTURES TO THE CENTER WING STRUCTURE;

WHEREIN THE CENTER WING STRUCTURE HAS A CENTER WING FRONT SPAR AND A CENTER WING REAR SPAR EACH HAVING A SPAR TERMINAL END AT EACH OF THE CENTER WING OUTBOARD ENDS, AND AN ENGINE MOUNTING LOCATION ON EACH OF OPPOSING SIDES OF A WING CENTERLINE, AND EACH OF OPPOSING SPAR TERMINAL ENDS OF THE CENTER WING FRONT SPAR AND THE CENTER WING REAR SPAR AT EACH WING JOINT ARE LOCATED NO FURTHER INBOARD THAN AN ENGINE CENTERLINE ASSOCIATED WITH THE ENGINE MOUNTING LOCATION, AND NO FURTHER OUTBOARD OF THE ENGINE CENTERLINE THAN TEN PERCENT OF A DISTANCE BETWEEN THE ENGINE CENTERLINE AND THE WING CENTERLINE

FIG. 46

550 — PROVIDING A WING ASSEMBLY HAVING A PAIR OF OUTER WING STRUCTURES EACH JOINED TO A CENTER WING STRUCTURE, THE CENTER WING STRUCTURE INCLUDING:

552 —
- A PAIR OF CENTER WING OUTBOARD ENDS AND A PAIR OF ENGINE MOUNTING LOCATIONS RESPECTIVELY ON OPPOSITE SIDES OF A WING CENTERLINE;
- A CENTER WING FRONT SPAR AND A CENTER WING REAR SPAR EACH HAVING A SPAR TERMINAL END AT EACH OF THE CENTER WING OUTBOARD ENDS;

THE PAIR OF OUTER WING STRUCTURES EACH INCLUDING:
- AN OUTER WING INBOARD END;
- AN OUTER WING FRONT SPAR AND AN OUTER WING REAR SPAR COUPLED RESPECTIVELY TO THE CENTER WING FRONT SPAR AND THE CENTER WING REAR SPAR TO DEFINE A WING JOINT COUPLING THE OUTER WING STRUCTURE TO THE CENTER WING STRUCTURE;

WHEREIN THE SPAR TERMINAL ENDS OF THE CENTER WING FRONT SPAR AND THE CENTER WING REAR SPAR AT EACH WING JOINT ARE LOCATED NO FURTHER INBOARD THAN AN ENGINE CENTERLINE ASSOCIATED WITH THE ENGINE MOUNTING LOCATION, AND NO FURTHER OUTBOARD OF THE ENGINE CENTERLINE THAN TEN PERCENT OF A DISTANCE BETWEEN THE ENGINE CENTERLINE AND THE WING CENTERLINE

554 — PLACING THE WING ASSEMBLY IN A GROUND STATIC LOADING CONDITION

556 — PLACING THE WING ASSEMBLY IN A DYNAMIC LOADING CONDITION

FIG. 47

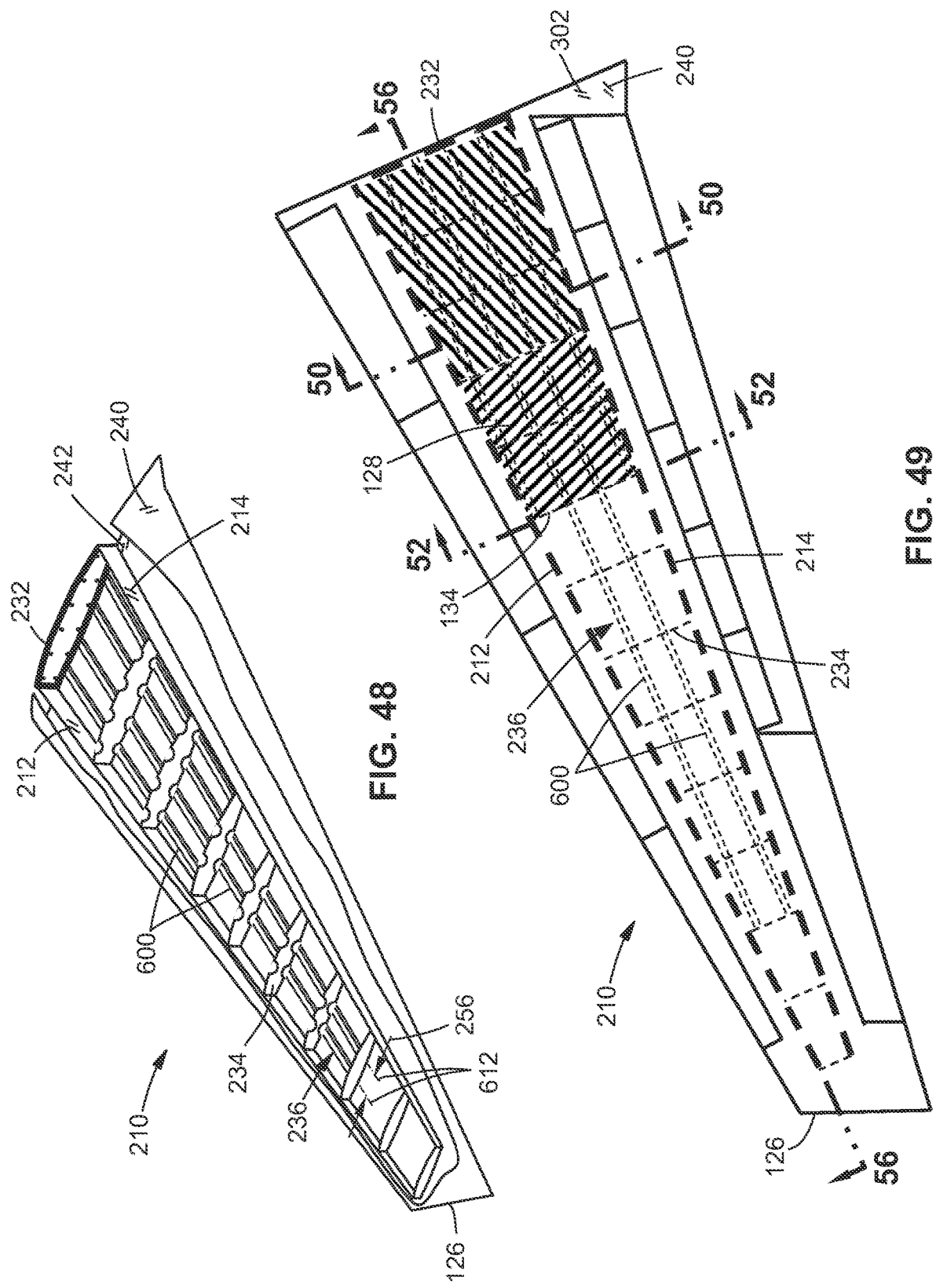

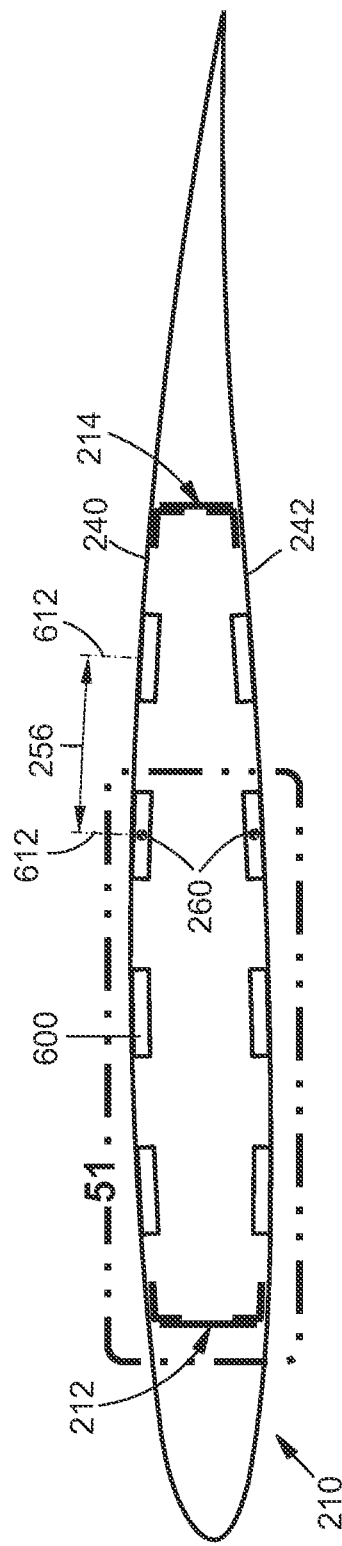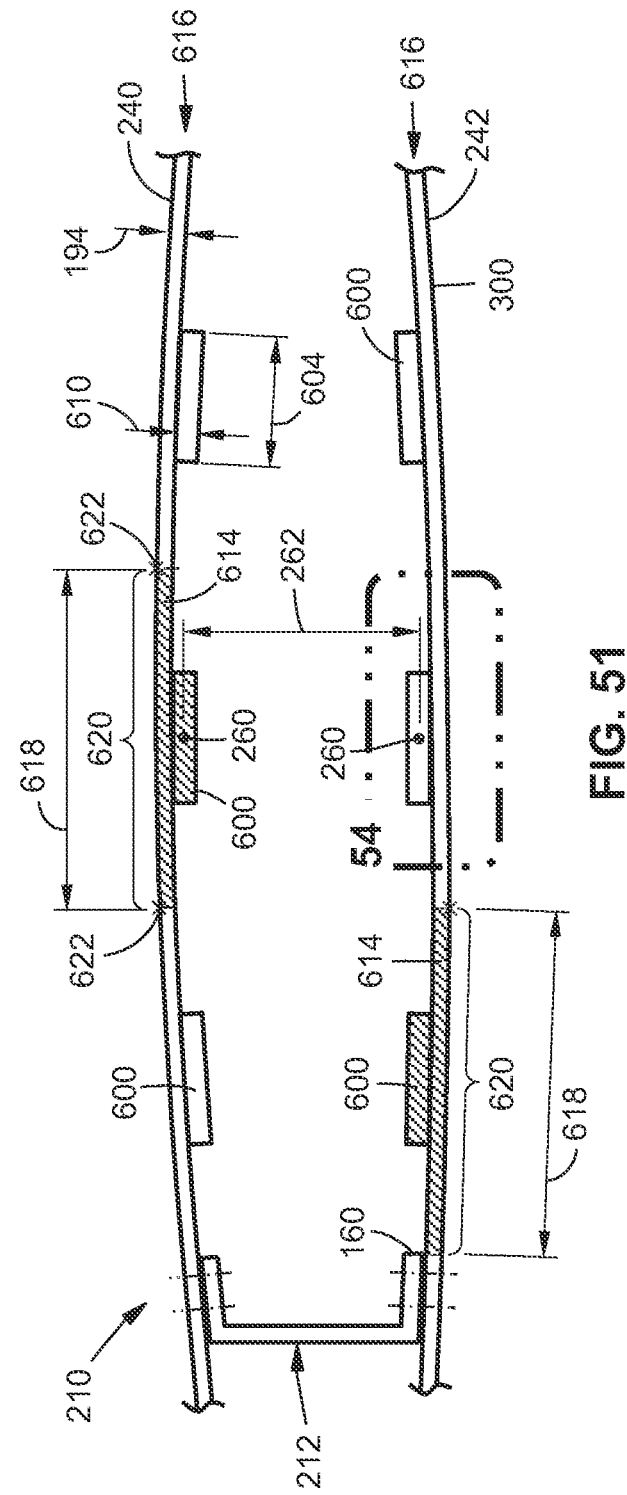

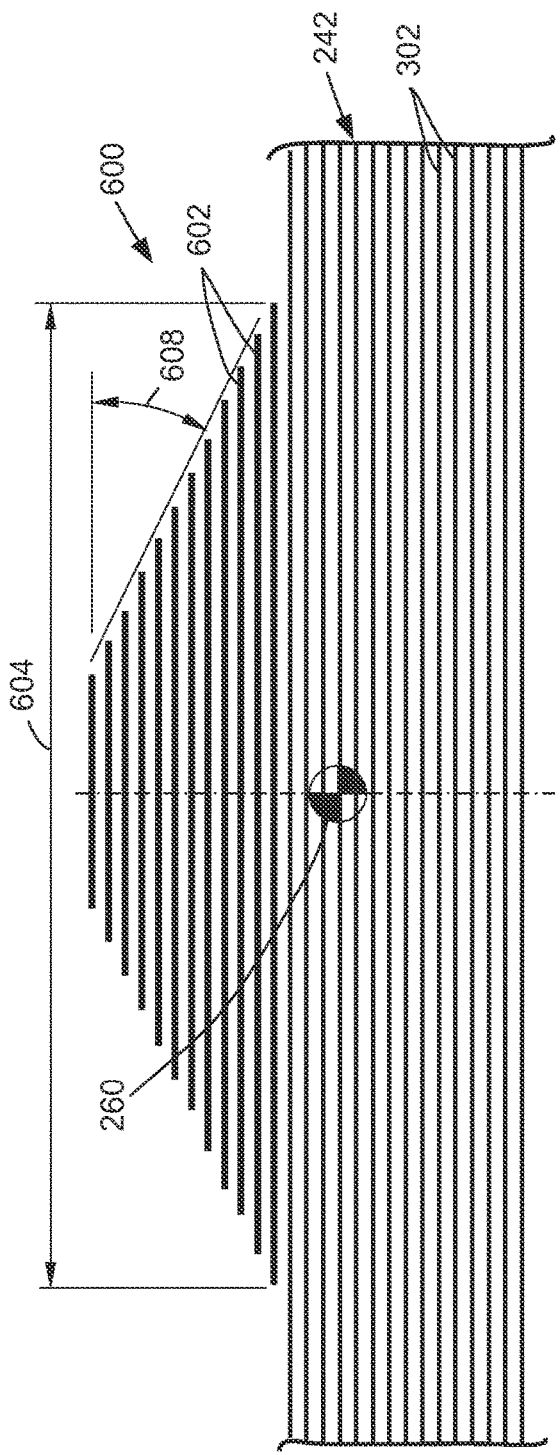
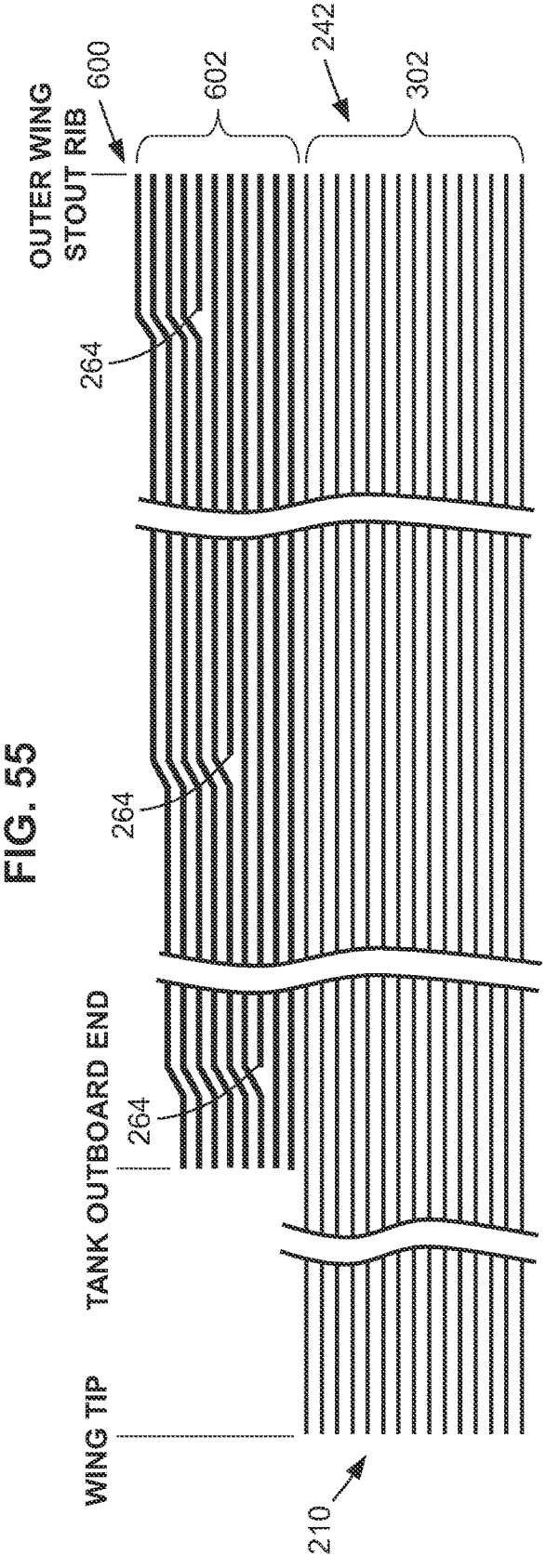
FIG. 55
FIG. 56

700 — BONDING ONE OR MORE PLANKS TO AT LEAST ONE OF AN OUTER WING UPPER SKIN PANEL AND AN OUTER WING LOWER SKIN PANEL OF A PAIR OF OUTER WING STRUCTURES, EACH PLANK EXTENDING IN A SPANWISE DIRECTION AND COMPRISED OF PLANK PLIES, THE OUTER WING UPPER AND LOWER SKIN PANEL ARE COMPRISED OF ACREAGE PLIES HAVING A PANEL THICKNESS THAT IS CONSTANT, THE PLANK PLIES HAVING A NARROWER WIDTH THAN THE ACREAGE PLIES

702 — COUPLING THE OUTER WING UPPER AND LOWER SKIN PANEL TO AN OUTER WING FRONT SPAR AND AN OUTER WING REAR SPAR OF AN OUTER WING STRUCTURE

704 — COUPLING AN OUTER WING FRONT AND REAR SPAR OF AN OUTER WING INBOARD END OF THE OUTER WING STRUCTURES RESPECTIVELY TO A CENTER WING FRONT AND REAR SPAR OF A CENTER WING STRUCTURE TO DEFINE A PAIR OF WING JOINTS ON OPPOSING CENTER WING OUTBOARD ENDS;

706 — WHEREIN THE CENTER WING STRUCTURE HAS AN ENGINE MOUNTING LOCATION ON EACH OF OPPOSING SIDES OF A WING CENTERLINE, AND A SPAR TERMINAL END OF THE CENTER WING FRONT AND REAR SPAR AT EACH WING JOINT ARE LOCATED NO FURTHER INBOARD THAN AN ENGINE CENTERLINE ASSOCIATED WITH THE ENGINE MOUNTING LOCATION, AND NO FURTHER OUTBOARD OF THE ENGINE CENTERLINE THAN TEN PERCENT OF A DISTANCE BETWEEN THE ENGINE CENTERLINE AND THE WING CENTERLINE

FIG. 57

800 — PROVIDING A WING ASSEMBLY HAVING A PAIR OF OUTER WING STRUCTURES EACH JOINED TO A CENTER WING STRUCTURE, THE CENTER WING STRUCTURE INCLUDING:

A PAIR OF CENTER WING OUTBOARD ENDS AND A PAIR OF ENGINE MOUNTING LOCATIONS;

A CENTER WING FRONT SPAR AND A CENTER WING REAR SPAR;

THE PAIR OF OUTER WING STRUCTURES EACH INCLUDING:

AN OUTER WING FRONT SPAR AND AN OUTER WING REAR SPAR CONFIGURED TO BE COUPLED RESPECTIVELY TO THE CENTER WING FRONT SPAR AT A PAIR OF WING JOINTS;

AN OUTER WING UPPER SKIN PANEL AND AN OUTER WING LOWER SKIN PANEL EACH COMPRISED OF ACREAGE PLIES HAVING A PANEL THICKNESS THAT IS CONSTANT ALONG A SPANWISE DIRECTION;

ONE OR MORE PLANKS BONDED TO AT LEAST ONE OF THE UPPER SKIN PANEL AND THE LOWER SKIN PANEL;

WHEREIN THE SPAR TERMINAL ENDS OF THE CENTER WING FRONT SPAR AND THE CENTER WING REAR SPAR AT EACH WING JOINT ARE LOCATED NO FURTHER INBOARD THAN AN ENGINE CENTERLINE ASSOCIATED WITH THE ENGINE MOUNTING LOCATION, AND NO FURTHER OUTBOARD OF THE ENGINE CENTERLINE THAN TEN PERCENT OF A DISTANCE BETWEEN THE ENGINE CENTERLINE AND A WING CENTERLINE

802

804 — PLACING THE WING ASSEMBLY IN A GROUND STATIC LOADING CONDITION

806 — PLACING THE WING ASSEMBLY IN A DYNAMIC LOADING CONDITION

FIG. 58

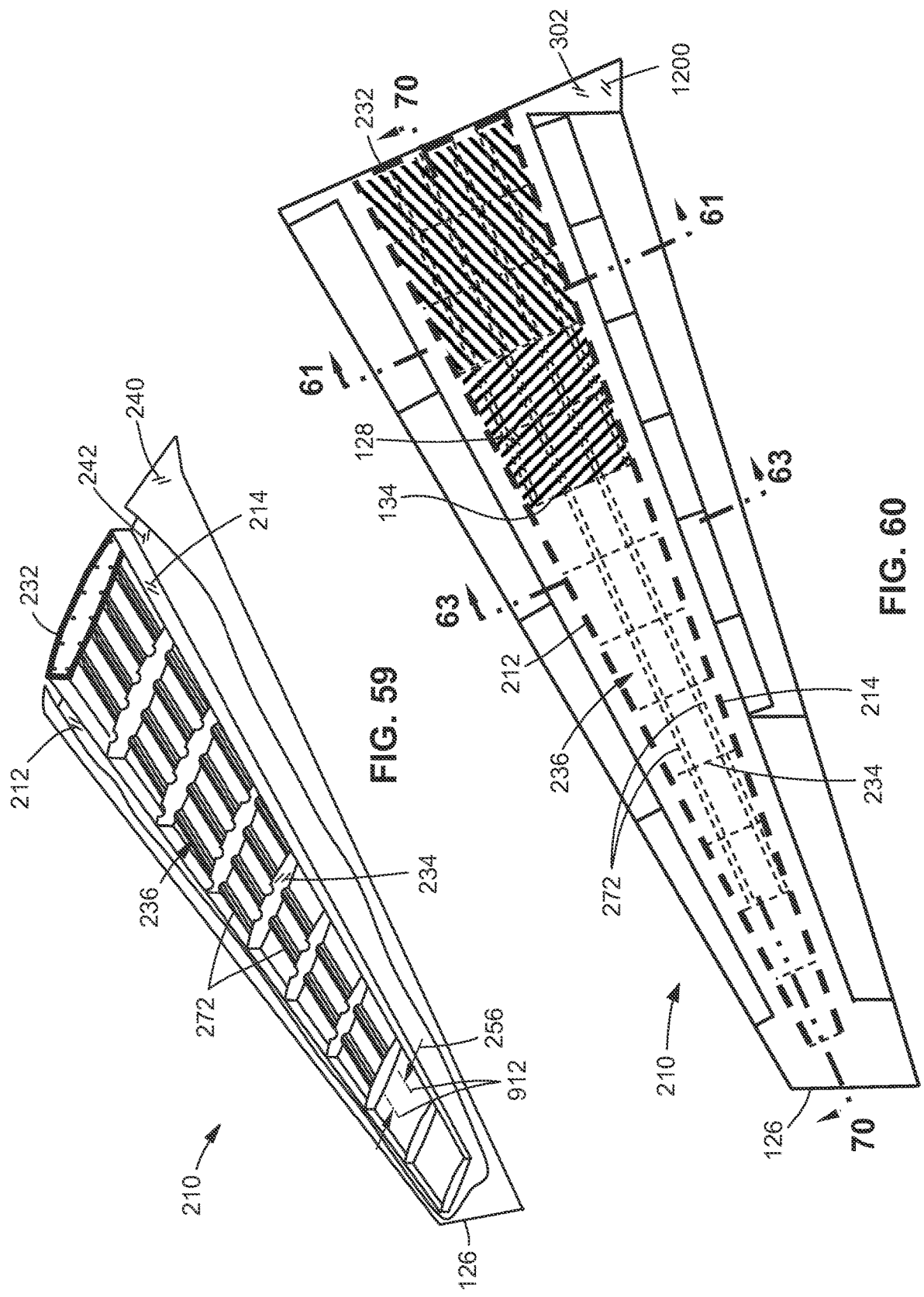

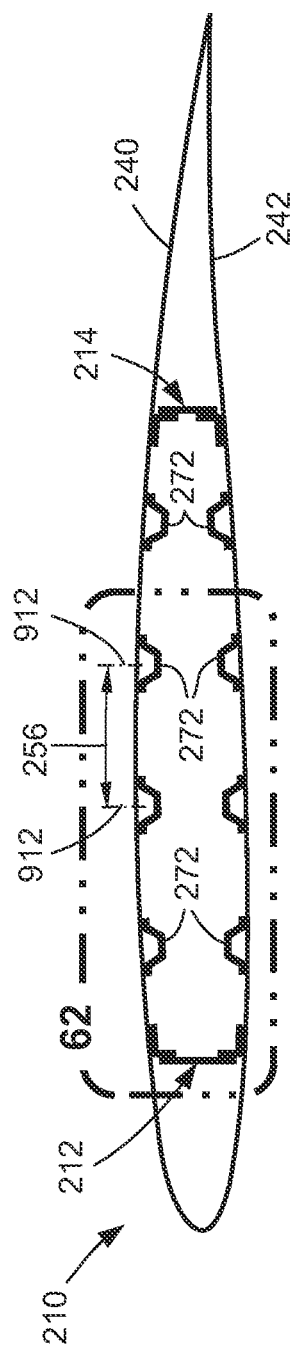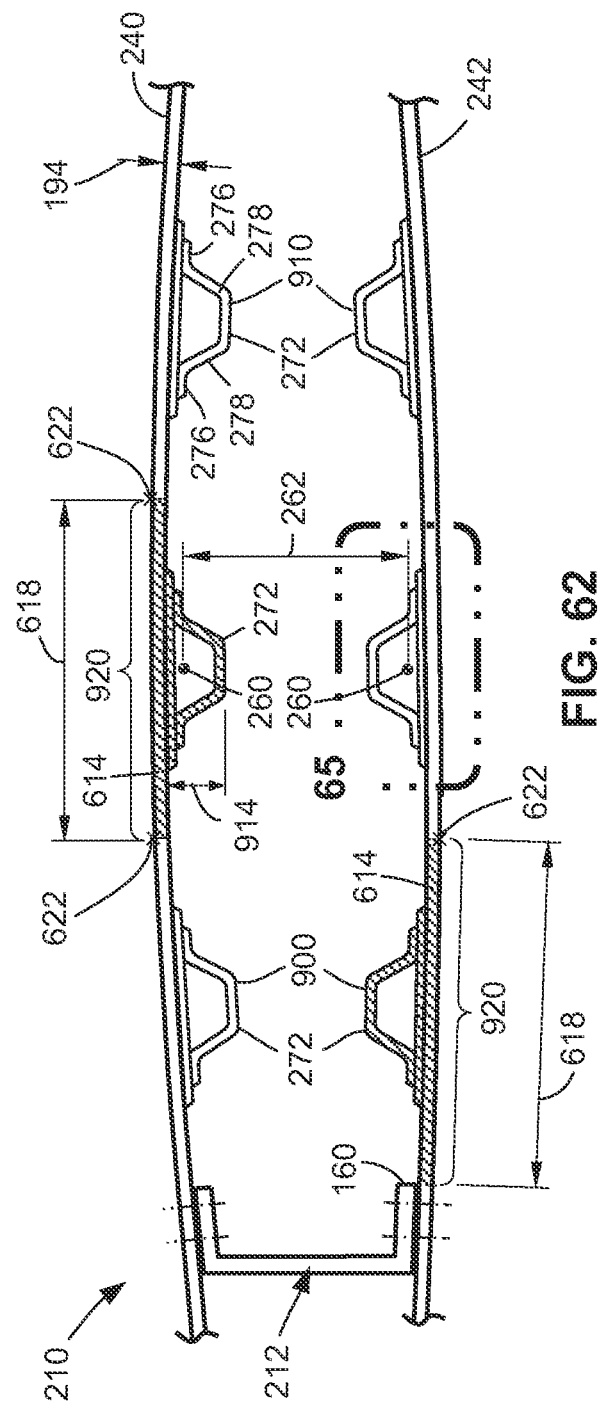

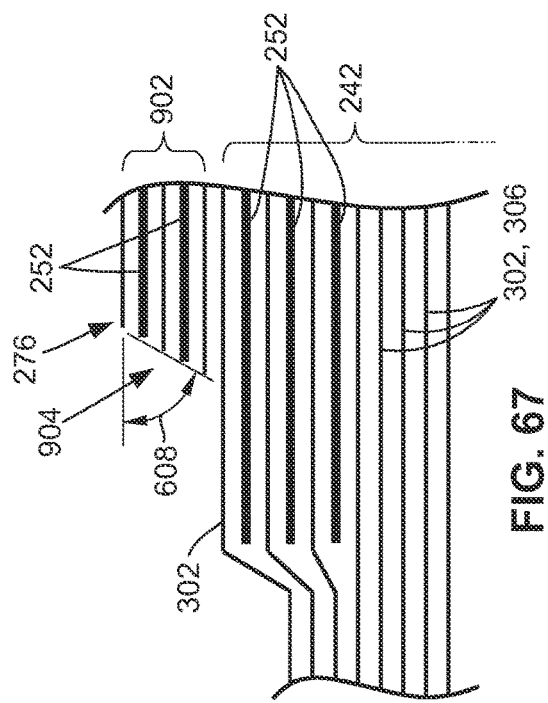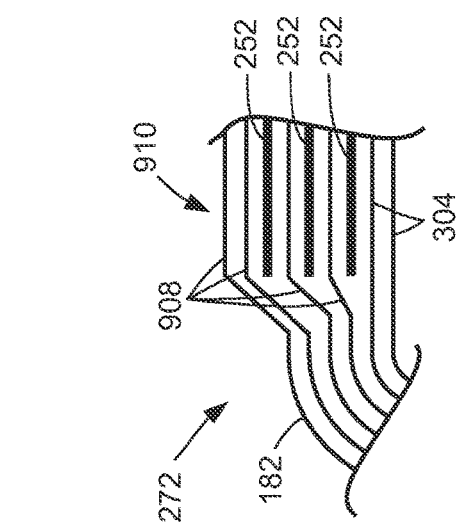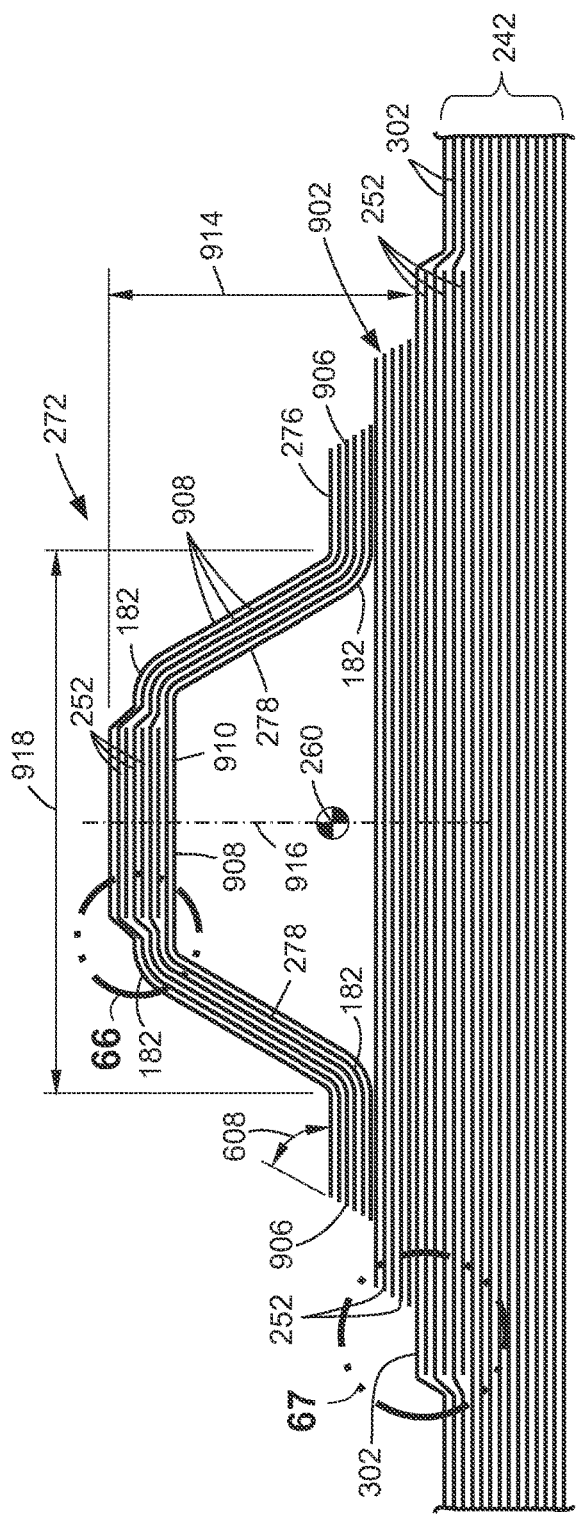

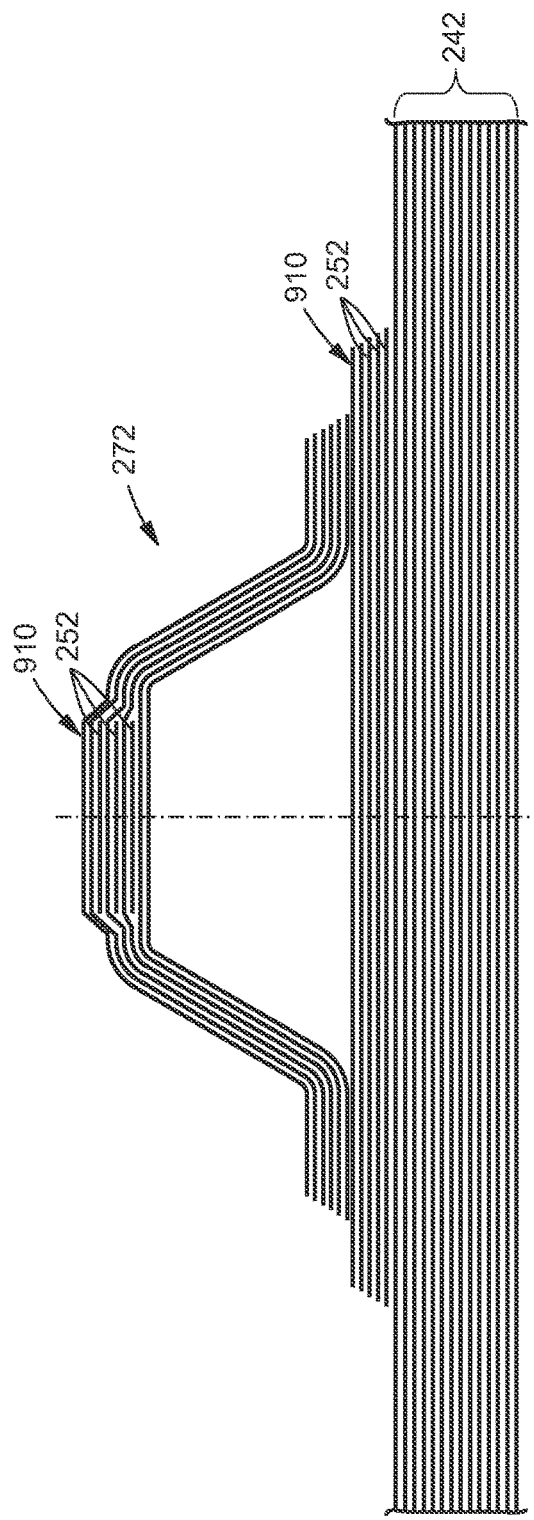
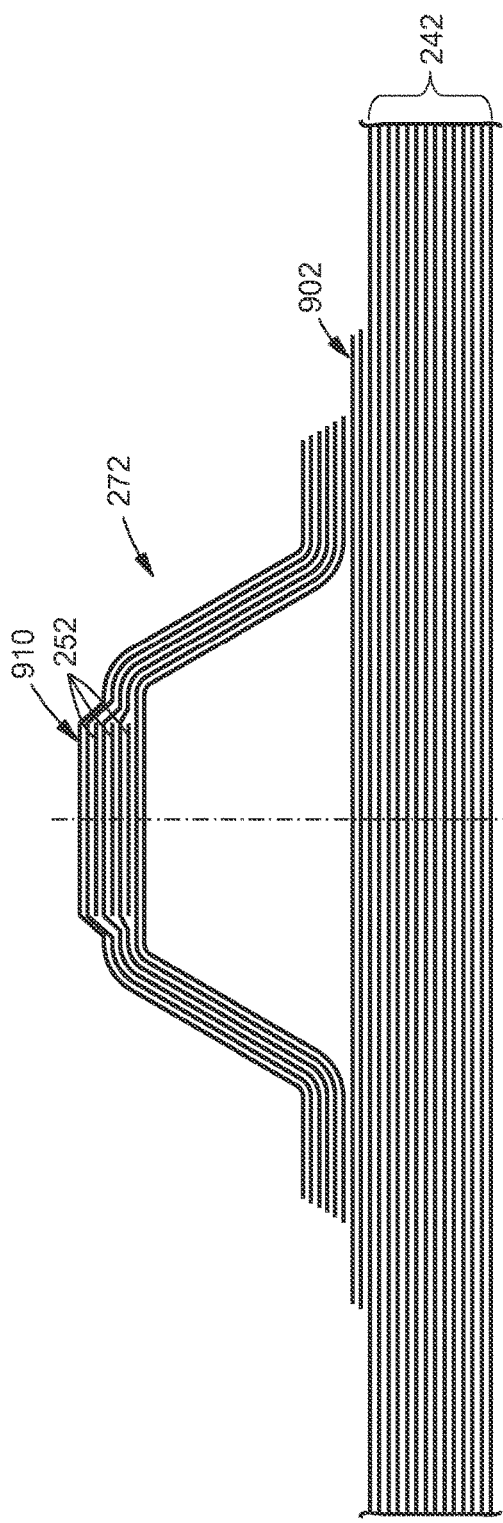

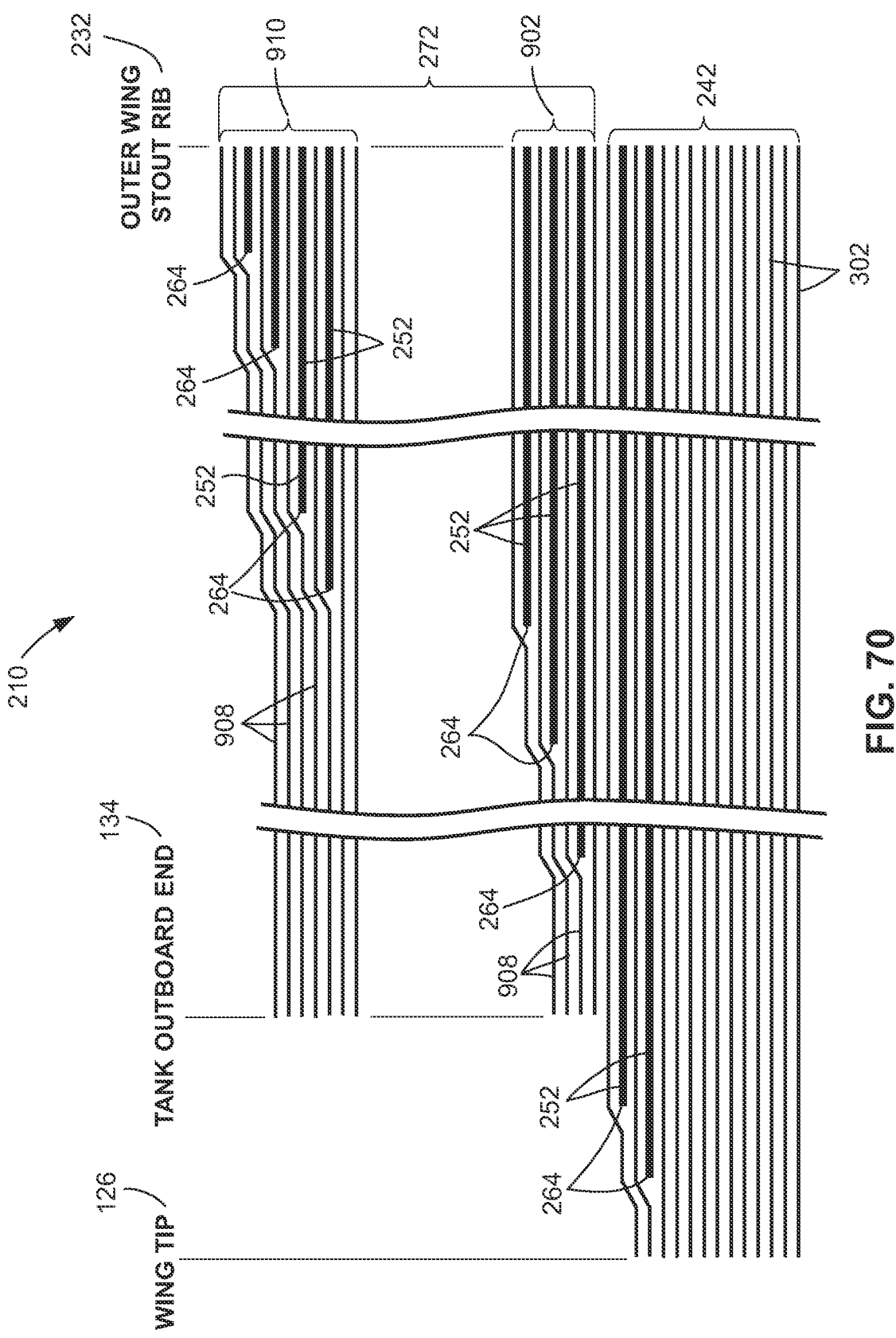

1000 ─ 1002 BONDING ONE OR MORE OUTER WING STRINGERS TO AT LEAST ONE OF AN OUTER WING UPPER SKIN PANEL AND AN OUTER WING LOWER SKIN PANEL, EACH OUTER WING STRINGER EXTENDING IN A SPANWISE DIRECTION AND COMPRISED OF A STRINGER PLIES AND HAVING A STRINGER CAP CONTAINING ONE OR MORE 0-DEGREE PLY STRIPS, EACH OF THE OUTER WING UPPER SKIN PANEL AND THE OUTER WING LOWER SKIN PANEL COMPRISED OF ACREAGE PLIES HAVING A PANEL THICKNESS THAT IS CONSTANT ALONG A SPANWISE DIRECTION

1004 COUPLING THE OUTER WING UPPER AND LOWER SKIN PANEL TO AN OUTER WING FRONT SPAR AND AN OUTER WING REAR SPAR OF AN OUTER WING STRUCTURE

1006 COUPLING AN OUTER WING FRONT AND REAR SPAR OF AN OUTER WING INBOARD END OF THE OUTER WING STRUCTURES RESPECTIVELY TO A CENTER WING FRONT AND REAR SPAR OF A CENTER WING STRUCTURE TO DEFINE A PAIR OF WING JOINTS ON OPPOSING CENTER WING OUTBOARD ENDS;

WHEREIN THE CENTER WING STRUCTURE HAS AN ENGINE MOUNTING LOCATION ON EACH OF OPPOSING SIDES OF A WING CENTERLINE, AND A SPAR TERMINAL END OF THE CENTER WING FRONT AND REAR SPAR AT EACH WING JOINT ARE LOCATED NO FURTHER INBOARD THAN AN ENGINE CENTERLINE ASSOCIATED WITH THE ENGINE MOUNTING LOCATION, AND NO FURTHER OUTBOARD OF THE ENGINE CENTERLINE THAN TEN PERCENT OF A DISTANCE BETWEEN THE ENGINE CENTERLINE AND THE WING CENTERLINE

FIG. 71

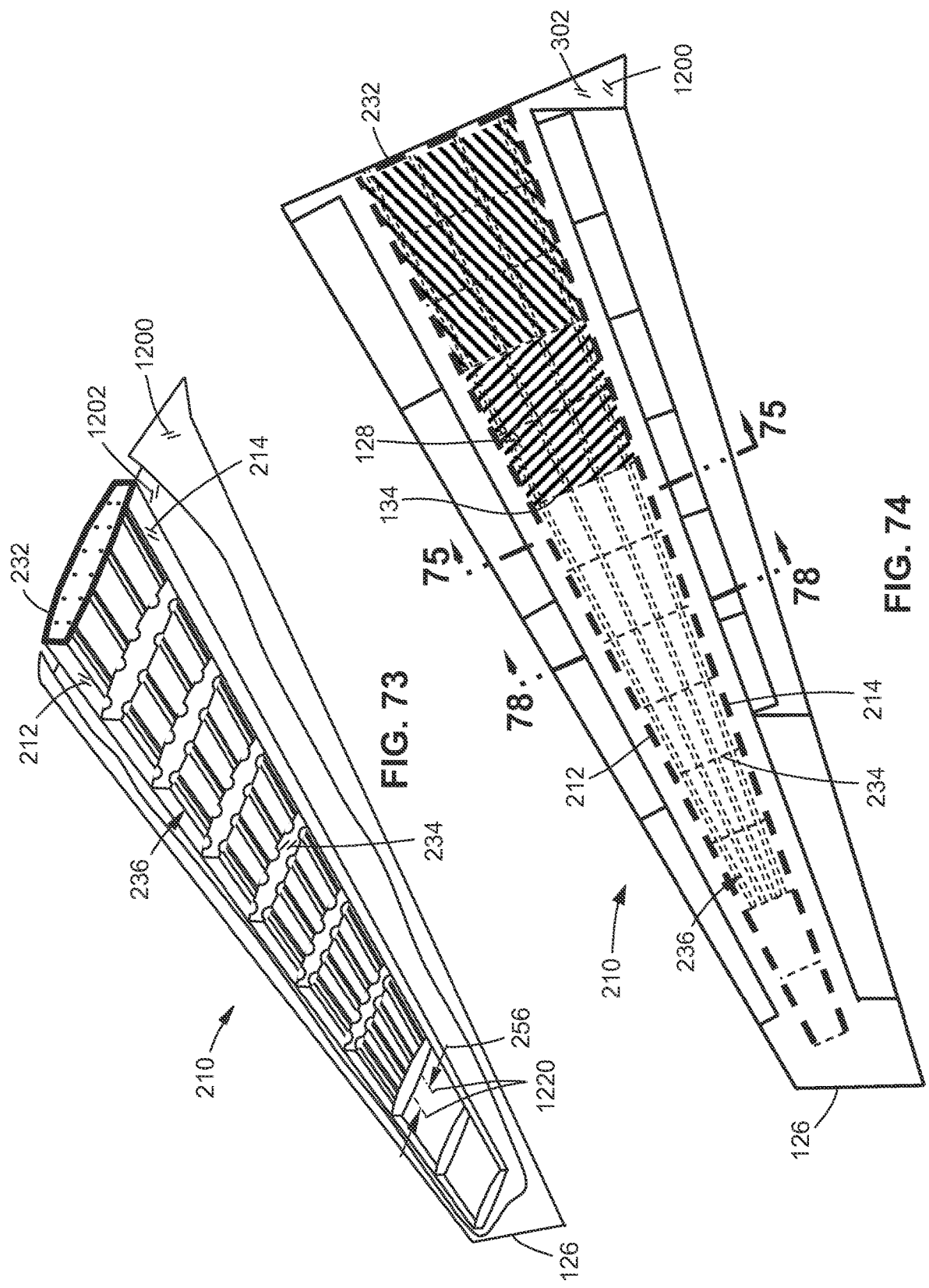

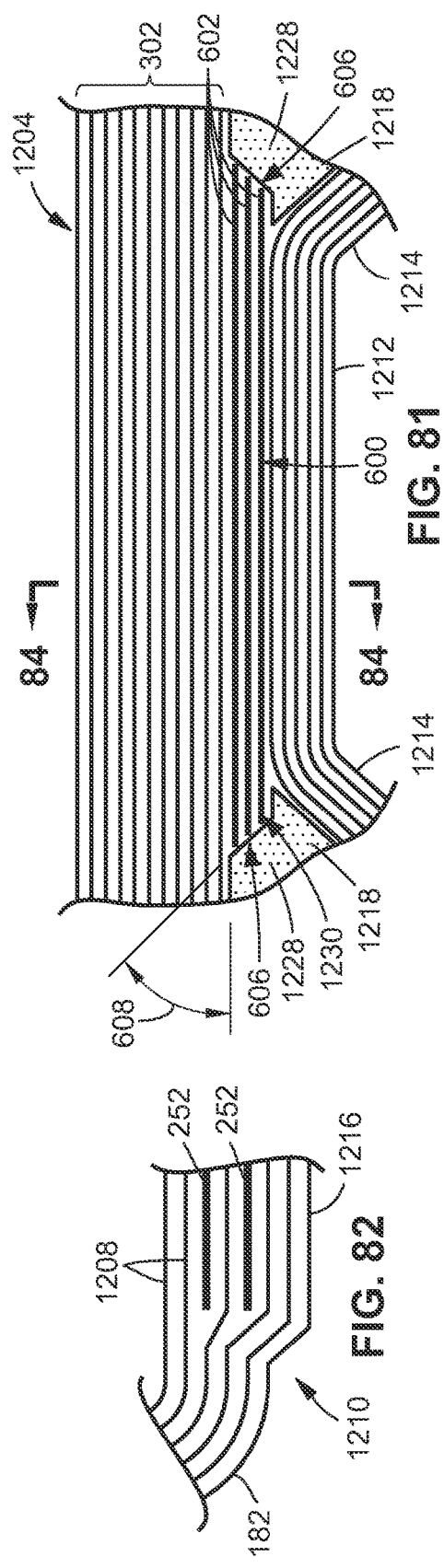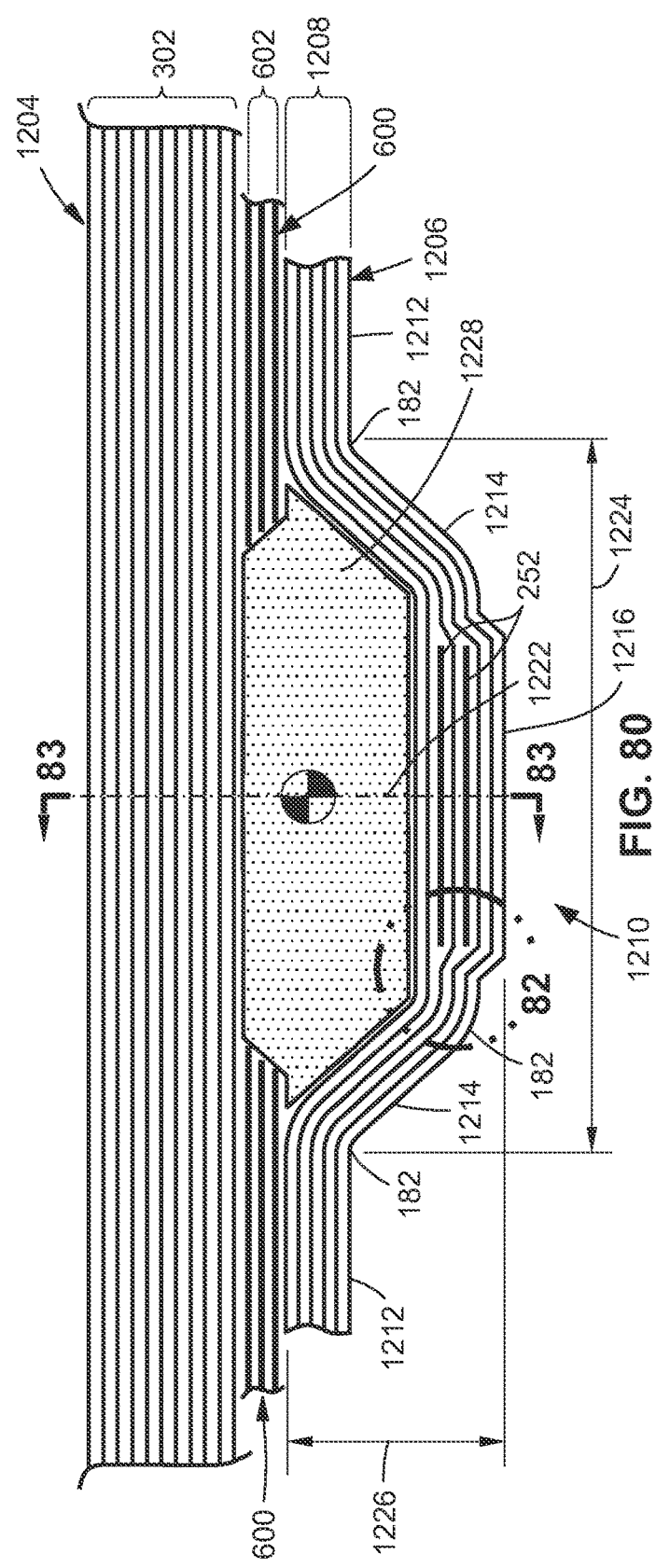

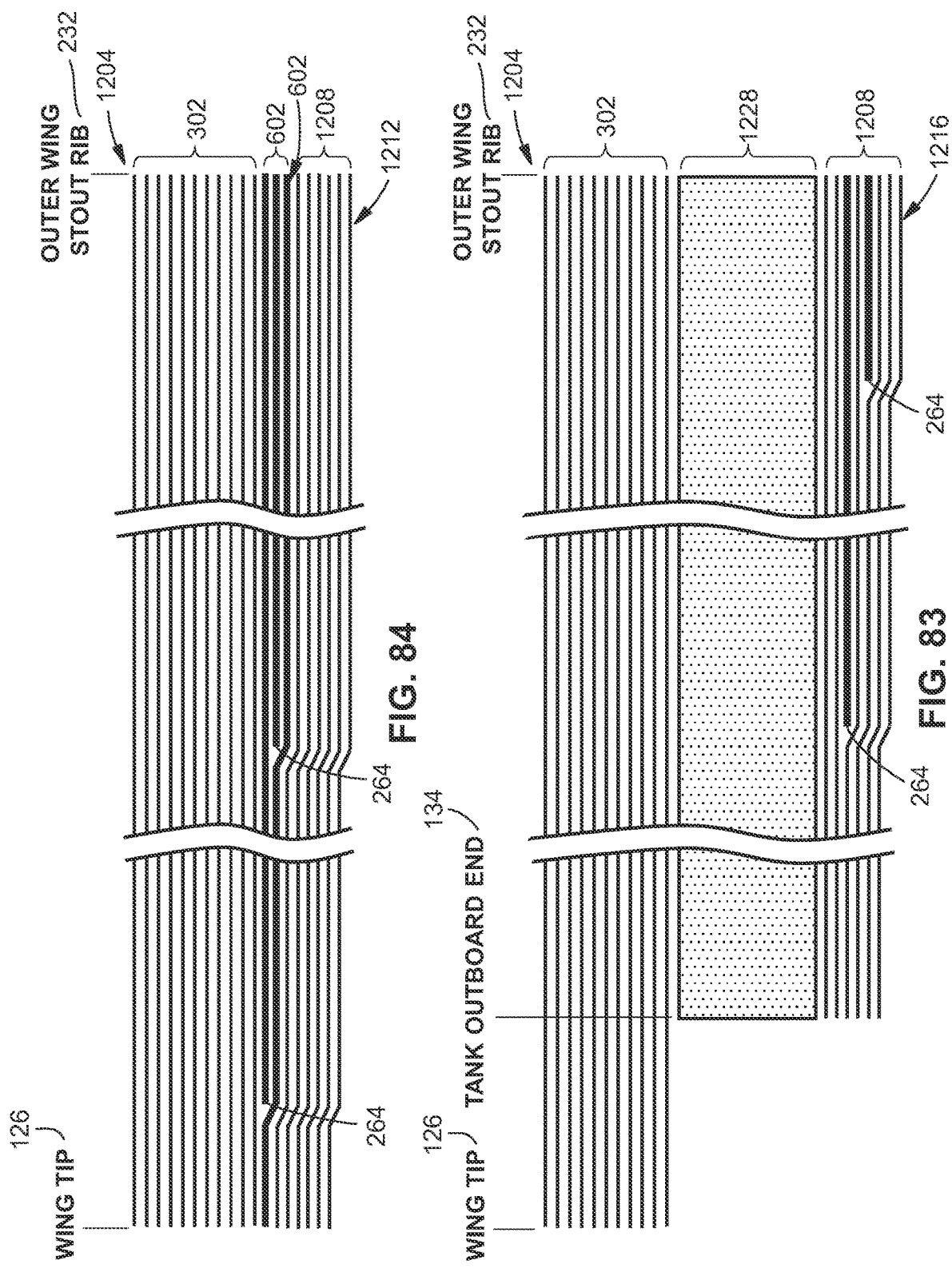

1300 ─┐

┌─ 1302
BONDING A HAT SECTION PANEL TO AN OUTER SKIN PANEL OF AT LEAST ONE OF AN OUTER WING UPPER PANEL ASSEMBLY AND AN OUTER WING LOWER PANEL ASSEMBLY, THE HAT SECTION PANEL HAVING A PLURALITY OF GENERALLY PARALLEL HAT-SHAPED SECTIONS EACH EXTENDING IN A SPANWISE DIRECTION, THE OUTER SKIN PANEL COMPRISED OF ACREAGE PLIES HAVING A PANEL THICKNESS THAT IS CONSTANT ALONG A SPANWISE DIRECTION

┌─ 1304
COUPLING THE OUTER WING UPPER PANEL ASSEMBLY AND THE OUTER WING LOWER PANEL ASSEMBLY TO AN OUTER WING FRONT SPAR AND AN OUTER WING REAR SPAR OF AN OUTER WING STRUCTURE

┌─ 1306
COUPLING AN OUTER WING FRONT AND REAR SPAR OF AN OUTER WING INBOARD END OF THE OUTER WING STRUCTURES RESPECTIVELY TO A CENTER WING FRONT AND REAR SPAR OF A CENTER WING STRUCTURE TO DEFINE A PAIR OF WING JOINTS ON OPPOSING CENTER WING OUTBOARD ENDS;

WHEREIN THE CENTER WING STRUCTURE HAS AN ENGINE MOUNTING LOCATION ON EACH OF OPPOSING SIDES OF A WING CENTERLINE, AND A SPAR TERMINAL END OF THE CENTER WING FRONT AND REAR SPAR AT EACH WING JOINT ARE LOCATED NO FURTHER INBOARD THAN AN ENGINE CENTERLINE ASSOCIATED WITH THE ENGINE MOUNTING LOCATION, AND NO FURTHER OUTBOARD OF THE ENGINE CENTERLINE THAN TEN PERCENT OF A DISTANCE BETWEEN THE ENGINE CENTERLINE AND THE WING CENTERLINE

FIG. 85

1400 — PROVIDING A WING ASSEMBLY HAVING A PAIR OF OUTER WING STRUCTURES EACH JOINED TO A CENTER WING STRUCTURE, THE CENTER WING STRUCTURE INCLUDING:

- A PAIR OF CENTER WING OUTBOARD ENDS AND A PAIR OF ENGINE MOUNTING LOCATIONS;
- A CENTER WING FRONT SPAR AND A CENTER WING REAR SPAR;

1402 — THE PAIR OF OUTER WING STRUCTURES EACH INCLUDING:

- AN OUTER WING FRONT SPAR AND AN OUTER WING REAR SPAR CONFIGURED TO BE COUPLED RESPECTIVELY TO THE CENTER WING FRONT SPAR AT A PAIR OF WING JOINTS;
- AN OUTER WING UPPER SKIN PANEL AND AN OUTER WING LOWER SKIN PANEL EACH COMPRISED OF ACREAGE PLIES HAVING A PANEL THICKNESS THAT IS CONSTANT ALONG A SPANWISE DIRECTION;
- A HAT SECTION PANEL COUPLED TO THE OUTER SKIN PANEL AND HAVING A PLURALITY OF GENERALLY PARALLEL HAT-SHAPED SECTIONS EACH EXTENDING IN A SPANWISE DIRECTION;

WHEREIN THE SPAR TERMINAL ENDS OF THE CENTER WING FRONT SPAR AND THE CENTER WING REAR SPAR AT EACH WING JOINT ARE LOCATED NO FURTHER INBOARD THAN AN ENGINE CENTERLINE, AND NO FURTHER OUTBOARD OF THE ENGINE CENTERLINE THAN TEN PERCENT OF A DISTANCE BETWEEN THE ENGINE CENTERLINE AND A WING CENTERLINE

1404 — PLACING THE WING ASSEMBLY IN A GROUND STATIC LOADING CONDITION

1406 — PLACING THE WING ASSEMBLY IN A DYNAMIC LOADING CONDITION

FIG. 86

WING ASSEMBLY HAVING WING JOINTS JOINING OUTER WING STRUCTURES TO CENTER WING STRUCTURE

CROSS-REFERENCE TO RELATED APPLICATIONS

The application claims priority to U.S. Provisional Application Ser. No. 63/057,941, filed Jul. 29, 2020, which is incorporated herein by reference in its entirety.

FIELD

The present disclosure relates generally to structural arrangements for aircraft wings and, more particularly, to a composite wing assembly having wing joints for joining outer wing structures to a center wing structure.

BACKGROUND

For many aircraft such as commercial transport aircraft formed of composite materials, the wing assembly conventionally includes a center wing box and a pair of wings. The center wing box is coupled to the fuselage. Each of the opposing sides of the center wing box has a side-of-body (SOB) joint which is located proximate the fuselage side for attaching each wing to the center wing box.

The SOB joints are structurally complex and time-consuming to manufacture. The complexity of the SOB joints is partially due to significant differences in the design criteria and loading conditions of the inboard portion of each wing vs. the design criteria and loading conditions of the outboard portion. For example, the inboard portion of each wing must be relatively stiff and must include multiple locations where the skin panels are locally thickened to accommodate highly loaded joints such as the SOB joint, the attachment of the landing gear, and the attachment of the engines. The thickened locations of the skin panels present manufacturing challenges and add to the structural mass of the aircraft. In contrast, the outboard portion of each wing typically does not have highly loaded joints and is preferably flexible to comply with aeroelasticity performance requirements.

Stringers are typically coupled to the skin panels of the wings to increase the bending stiffness of the skin panels. In conventional wing assemblies, the stringers in each wing extend continuously from the SOB joint to the wing tip. Although stringers are effective at providing a relatively high degree of stiffness in the inboard portion of each wing, the structural efficiency of stringers is reduced in the outboard portion and may result in high dynamic loads as a result of the relatively large mass and relatively high stiffness of the stringers.

As can be seen, there exists a need in the art for a composite wing assembly that avoids the above-mentioned challenges associated with the manufacturing, assembly, maintenance, and added structural mass of conventional composite wing assemblies.

SUMMARY

The above-noted needs associated with wing assemblies are specifically addressed by the present disclosure which provides a wing assembly for an aircraft. The wing assembly includes a center wing structure and a pair of outer wing structures. The center wing structure includes a pair of center wing outboard ends and a pair of engine mounting locations respectively on opposite sides of a wing centerline. In addition, the center wing structure includes a center wing front spar and a center wing rear spar each having a spar terminal end at each of the center wing outboard ends. Each one of the outer wing structures includes an outer wing front spar and an outer wing rear spar configured to be coupled respectively to the center wing front spar and the center wing rear spar to define a wing joint coupling the outer wing structure to the center wing structure. The center wing structure is configured such that the spar terminal ends of the center wing front spar and the center wing rear spar at each wing joint are located no further inboard than an engine centerline associated with the engine mounting location, and no further outboard of the engine centerline than ten percent of a distance between the engine centerline and the wing centerline.

Furthermore, disclosed is a wing assembly having a center wing structure as described above. In addition, the wing assembly includes a pair of outer wing structures, each having an outer wing front spar and an outer wing rear spar configured to be coupled respectively to the center wing front spar and the center wing rear spar to define a wing joint coupling the outer wing structure to the center wing structure. The outer wing structure also includes an outer wing upper skin panel and an outer wing lower skin panel each comprised of acreage plies having a panel thickness that is constant along a spanwise direction, and coupled to the outer wing front spar and the outer wing rear spar. Furthermore, the outer wing structure includes one or more planks bonded to an inner surface of at least one of the upper skin panel and the lower skin panel and extending in a spanwise direction. Each plank is comprised of a stack of plank plies of narrower width than the acreage plies. As described above, the center wing structure is configured such that the spar terminal ends of the center wing front spar and the center wing rear spar at each wing joint are located no further inboard than an engine centerline associated with the engine mounting location, and no further outboard of the engine centerline than ten percent of a distance between the engine centerline and the wing centerline.

In addition, disclosed is a composite wing assembly having a center wing structure as described above. In addition, the wing assembly includes a pair of outer wing structures each configured as described above except that instead of one or more planks bonded to the upper skin panel and/or the lower skin panel, the outer wing structure includes one or more outer wing stringers coupled to the outer wing upper skin panel and/or to the outer wing lower skin panel and extending in a spanwise direction and each having a hat-shaped cross section having a stringer cap containing one or more 0-degree ply strips interleaved within the stringer cap. Also disclosed is a composite wing assembly having a center wing structure as described above. In addition, the wing assembly includes a pair of outer wing structures configured as described above, except that instead of planks or outer wing stringers bonded to the outer wing upper and/or lower skin panel, each outer wing structure has an outer wing upper panel assembly and an outer wing lower panel assembly each extending along a spanwise direction and coupled to the outer wing front spar and the outer wing rear spar. Each panel assembly includes an outer skin panel comprised of acreage plies and having a panel thickness that is constant along a spanwise direction. In addition, each panel seven includes a hat section panel coupled to an inner side of the outer skin panel and having a plurality of generally parallel hat-shaped sections each extending in a spanwise direction.

In addition, disclosed is a method of manufacturing a wing assembly. The method includes coupling an outer wing inboard end of each one of a pair of outer wing structures respectively to opposing center wing outboard ends of a center wing structure to define a pair of wing joints coupling the outer wing structures to the center wing structure. As mentioned above, the center wing structure has a center wing front spar and a center wing rear spar each having a spar terminal end at each of the center wing outboard ends. The wing assembly includes engine mounting location on each of opposing sides of a wing centerline, and each of opposing spar terminal ends of the center wing front spar and the center wing rear spar at each wing joint are located no further inboard than an engine centerline associated with the engine mounting location, and no further outboard of the engine centerline than ten percent of a distance between the engine centerline and the wing centerline.

Also disclosed is a method of manufacturing a wing assembly, and which includes bonding one or more planks to an inner surface of at least one of an outer wing upper skin panel and an outer wing lower skin panel of each of a pair of outer wing structures. Each plank extends in a spanwise direction and is comprised of a stack of plank plies. The outer wing upper skin panel and the outer wing lower skin panel are each comprised of acreage plies having a panel thickness that is constant along a spanwise direction. The plank plies have a narrower width than the acreage plies. The method includes coupling the outer wing upper skin panel and the outer wing lower skin panel to an outer wing front spar and an outer wing rear spar of an outer wing structure. In addition, the method includes coupling an outer wing front spar and an outer wing rear spar of each of the outer wing structures respectively to a center wing front spar and a center wing rear spar of a center wing structure to define a pair of wing joints on opposing center wing outboard ends. As described above, the center wing structure has an engine mounting location on each of opposing sides of a wing centerline. The spar terminal end of the center wing front spar and the center wing rear spar at each wing joint are located no further inboard than an engine centerline associated with the engine mounting location, and no further outboard of the engine centerline than ten percent of a distance between the engine centerline and the wing centerline.

In addition, disclosed is a method of manufacturing a wing assembly, and which is similar to the above-described method, except that instead of bonding planks to the outer wing upper skin panel and outer wing lower skin panel, the method comprises bonding one or more outer wing stringers to the outer wing upper skin panel and/or to the outer wing lower skin panel. Each outer wing stringer extends in a spanwise direction and is comprised of a plurality of stringer plies. Each outer wing stringer has a stringer cap containing one or more 0-degree ply strips. The outer wing upper skin panel and the outer wing lower skin panel are each comprised of acreage plies having a panel thickness that is constant along a spanwise direction.

Furthermore, disclosed is a method of manufacturing a wing assembly, and which includes bonding a hat section panel to an outer skin panel of at least one of an outer wing upper panel assembly and an outer wing lower panel assembly. The hat section panel has a plurality of generally parallel hat-shaped sections each extending in a spanwise direction. The outer skin panel is comprised of acreage plies having a panel thickness that is constant along a spanwise direction. The method also includes coupling the outer wing upper panel assembly and the outer wing lower panel assembly to an outer wing front spar and an outer wing rear spar of an outer wing structure. In addition, the method includes coupling an outer wing inboard end of each one of a pair of the outer wing structures respectively to opposing center wing outboard ends of a center wing structure to define a pair of wing joints. As mentioned above, the spar terminal end of the center wing front spar and the center wing rear spar at each wing joint are located no further inboard than an engine centerline associated with the engine mounting location, and no further outboard of the engine centerline than ten percent of a distance between the engine centerline and the wing centerline.

In addition, disclosed is a method of loading a wing assembly. The method includes providing the wing assembly having a pair of outer wing structures, each joined to a center wing structure, as described above. The method further includes placing the wing assembly in a ground static loading condition, and placing the wing assembly in a dynamic loading condition.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 6 is a sectional view of the wing assembly taken along line 6-6 of FIG. 4 and illustrating a plurality of center wing stringers passing through a center wing rib of the center wing structure;

FIG. 7 is a magnified view of the portion of the wing assembly identified by reference numeral 7 of FIG. 6 and illustrating center wing stringers passing through rib cutouts formed in the center wing rib, and further illustrating the center wing rib, the center wing upper skin panel, and the center wing lower skin panel coupled to the center wing front spar;

FIG. 8 is a magnified view of the portion of the wing assembly identified by reference numeral 8 of FIG. 6 and illustrating the center wing rib, the center wing upper skin panel, and the center wing lower skin panel coupled to the central wing rear spar;

FIG. 9 is a view of an example of a hybrid configuration of the center wing front spar of FIG. 7 having a pair of L-shaped rib chords interconnected by a rib web;

FIG. 10 is a view of an example of the center wing rear spar of FIG. 8 configured similar to the center wing front spar of FIG. 9;

FIG. 11 is a sectional view taken along line 11-11 of FIG. 7 and illustrating an example of the center wing rib having upper and lower rib outer flanges respectively coupled to the center wing upper skin panel and the center wing lower skin panel;

FIG. 12 is a sectional view taken along line 12-12 of FIG. 7 and illustrating an example of center wing stringers of the center wing upper and lower skin panels passing through rib cutouts in the center wing rib;

FIG. 13 is a view of an example of the center wing rib of FIG. 11 in which the rib web and rib outer flanges are comprised of fabric plies, and the rib outer flange contains one or more 0-degree ply strips interleaved within the fabric plies;

FIG. 14 is a sectional view of the wing assembly taken along line 14-14 of FIG. 4 and illustrating an example of a hole pattern for receiving a plurality of mechanical fasteners for coupling the center wing stout rib to the outer wing stout rib;

FIG. 15 is a magnified view of the portion of the wing assembly identified by reference numeral 15 of FIG. 14 and illustrating the center wing stout rib, the center wing upper skin panel, and the center wing lower skin panel coupled to the center wing front spar;

FIG. 16 is a magnified view of the portion of the wing assembly identified by reference numeral 16 and illustrating the center wing stout rib, the center wing upper skin panel, and the center wing lower skin panel coupled to the center wing rear spar;

FIG. 28 is a partially cutaway perspective view of an example of an outer wing structure illustrating outer wing stringers for stiffening the outer wing lower skin panel in an inboard portion of the outer wing structure, and 0-degree strip sets for stiffening the outer wing lower skin panel in an outboard portion of the outer wing structure;

FIG. 29 is a top view of an example of an outer wing structure;

FIG. 30 is a sectional view taken along line 30-30 of FIG. 29 and illustrating an example of outer wing stringers passing through rib cutouts formed in an outer wing rib;

FIG. 31 is a magnified view of the portion of the wing assembly identified by reference numeral 31 of FIG. 30 and illustrating the outer wing stout rib coupled to the outer wing upper skin panel, the outer wing lower skin panel, and outer wing front spar;

FIG. 32 is a magnified view of the portion of the wing assembly identified by reference numeral 32 of FIG. 30 and illustrating the outer wing stout rib coupled to the outer wing upper skin panel, the outer wing lower skin panel and the outer wing rear spar;

FIG. 33 is a sectional view taken along line 33-33 of FIG. 29 and illustrating the termination of the outer wing stringers at an outer wing rib located proximate a tank outboard end of a fuel tank of the outer wing;

FIG. 34 is a magnified view of the portion of the wing assembly identified by reference numeral 34 of FIG. 33 and illustrating localized padup regions in the outer wing upper and lower skin panels at the termination of the outer wing stringers and at the outer wing front spar;

FIG. 35 is a magnified view of the portion wing assembly identified by reference numeral 35 of FIG. 33 and illustrating localized padup regions in the outer wing upper and lower skin panels at the termination of the outer wing stringers and at the outer wing rear spar;

FIG. 36 is a sectional view of the outer wing structure taken along line 36-36 of FIG. 34 and illustrating the termination of the outer wing stringers at the outer wing rib located proximate a tank outboard end of the fuel tank of the wing assembly;

FIG. 37 is a magnified view of the portion of the wing assembly identified by reference numeral 37 of FIG. 36 and illustrating an example of a localized padup region in the outer wing lower skin panel at the termination of an outer wing stringer;

FIG. 42 is a further example of 0-degree ply strips interleaved within the acreage plies of the outer wing upper skin panel or outer wing lower skin panel;

FIG. 43 is a spanwise sectional view of the wing assembly taken along line 43-43 of FIG. 29 and illustrating an example of ply drops in the 0-degree ply strips of the outer wing lower skin panel;

FIG. 46 is a flowchart of a method of manufacturing a wing assembly by coupling an outer wing structure to each of opposing outboard ends of a center wing structure;

FIG. 47 is a flowchart of a method of loading a wing assembly comprised of a pair of outer wing structures coupled to a center wing structure;

FIG. 48 is a partially cutaway perspective view of a further example of an outer wing structure having discrete planks for stiffening the outer wing upper and lower skin panel;

FIG. 49 is a top view of the example of the outer wing structure of FIG. 48;

FIG. 50 is a sectional view taken along line 50-50 of FIG. 49 and illustrating an example of a plurality of planks bonded to an inner surface of the upper skin panel and lower skin panel;

FIG. 51 is a magnified view of the portion of the outer wing structure identified by reference numeral 51 of FIG. 50 and illustrating on each of the outer wing upper and lower skin panels an example of a plank-skin portion cross-sectional area corresponding to a combined plank-skin portion bending stiffness of a skin panel portion and associated plank;

FIG. 55 is a sectional view of an example of a plank having a trapezoidal cross-sectional shape bonded to the outer wing lower skin panel;

FIG. 56 is a spanwise sectional view of the outer wing structure taken along line 56-56 of FIG. 49 and illustrating an example of ply drops in the plank plies of one of the planks bonded to the outer wing lower skin panel;

FIG. 57 is a flowchart of a method of manufacturing a wing assembly by coupling a plank-stiffened outer wing structure to a center wing structure;

FIG. 58 is a flowchart of a method of loading a wing assembly comprised of a pair of plank-stiffened outer wing structures coupled to a center wing structure;

FIG. 59 is a partially cutaway perspective view of a further example of an outer wing structure in which the outer wing upper and lower skin panels are stiffened by outer wing stringers each having a hat-shaped cross-section;

FIG. 60 is a top view of the example of the outer wing structure of FIG. 59;

FIG. 61 is a sectional view taken along line 61-61 of FIG. 60 and illustrating an example of the outer wing upper and lower skin panel each stiffened by outer wing stringers each having a hat-shaped cross-section;

FIG. 62 is a magnified view of the portion of the outer wing structure identified by reference numeral 62 of FIG. 61 and illustrating on each of the outer wing upper and lower skin panels an example of a stringer-skin portion cross-sectional area corresponding to a combined stringer-skin portion bending stiffness of a skin panel portion and associated outer wing stringer;

FIG. 65 is a magnified view of the portion of the outer wing structure identified by reference numeral 65 of FIG. 62 and illustrating an example of the ply stackup of the outer wing stringer and further illustrating 0-degree ply strips interleaved within the stringer cap;

FIG. 66 is a magnified view of the portion of the outer wing stringer identified by reference numeral 66 of FIG. 65 and illustrating the 0-degree ply strips in the stringer cap;

FIG. 67 is a magnified view of the portion of the skin panel and outer wing stringer identified by reference numeral 67 of FIG. 65 and illustrating 0-degree ply strips interleaved within the composite plies of the lower skin panel and the stringer base laminate;

FIG. 68 is a sectional view of an example of an outer wing stringer having a stringer base laminate comprised of 0-degree plies, and which is coupled to a lower skin panel that is devoid of 0-degree ply strips;

FIG. 69 is a sectional view of an example of an outer wing stringer in which the stringer base laminate and lower skin panel are devoid of 0-degree ply strips;

FIG. 70 is a spanwise sectional view of the outer wing structure taken along line 70-70 of FIG. 60 and illustrating ply drops in the 0-degree ply strips of the stringer cap, the stringer base laminate, and the outer wing lower skin panel;

FIG. 71 is a flowchart of a method of manufacturing a wing assembly by coupling a stringer-stiffened outer wing structure to a center wing structure;

FIG. 73 is a partially cutaway perspective view of a an example of an outer wing structure having outer wing upper and lower panel assemblies;

FIG. 74 is a top view of the example of the outer wing structure of FIG. 73;

FIG. 80 is a magnified view of the portion of the outer wing structure identified by reference numeral 80 of FIG. 76 and illustrating 0-degree ply strips interleaved in the hat section cap of a hat-shaped section, and further illustrating planks on opposite sides of the foam member;

FIG. 81 is a magnified view of the portion of the outer wing structure identified by reference numeral 81 of FIG. 76 and illustrating a plank comprised of a plurality of plank plies sandwiched between the outer skin panel and a hat section flange of the hat section panel;

FIG. 82 is a magnified view of the portion of the hat section panel identified by reference numeral 82 of FIG. 80 and illustrating 0-degree ply strips interleaved within the hat section cap of the hat-shaped section;

FIG. 83 is a transverse sectional view of the outer wing upper panel assembly taken along line 83-83 of FIG. 80 and illustrating ply drops in the 0-degree ply strips of the hat section cap;

FIG. 84 is a transverse sectional view of the outer wing upper panel assembly taken along line 84-84 of FIG. 81 and illustrating an example of ply drops in the plank plies of the plank;

FIG. 85 is a flowchart of a method of manufacturing a wing assembly by coupling a hat section panel-stiffened outer wing structure to a center wing structure;

FIG. 86 is a flowchart of a method of loading a wing assembly comprised of a pair of hat section panel-stiffened outer wing structures to a center wing structure.

DETAILED DESCRIPTION

Figure 1:
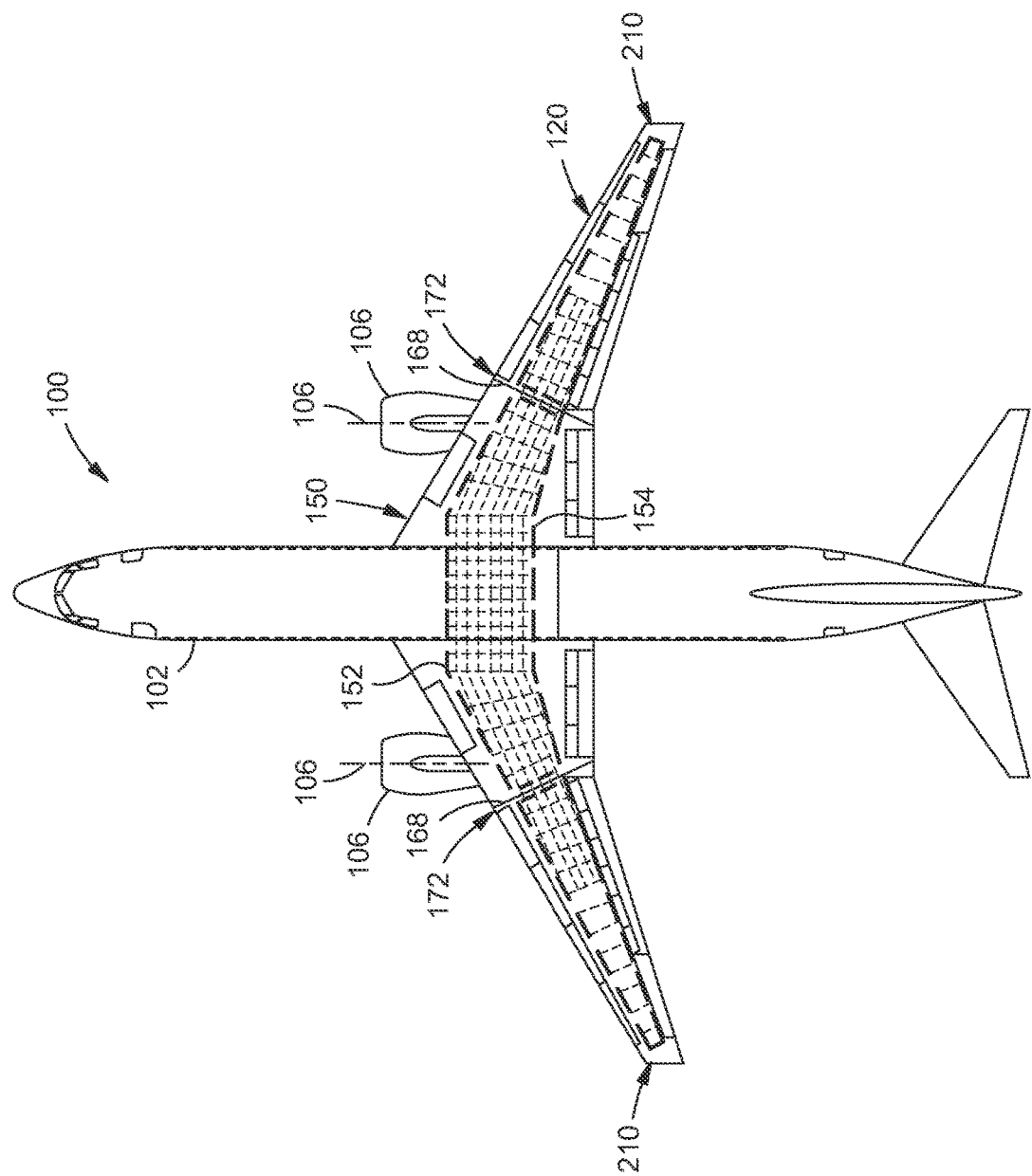
FIG. 1 is a top view of an example of an aircraft.

Referring now to the drawings which illustrate various examples of the disclosure, shown in FIG. 1 is a top view of an example of an aircraft 100. The aircraft 100 includes a fuselage 102, a wing assembly 120 coupled to the fuselage 102, and a pair of engines 104 respectively mounted to the wing assembly 120. As shown in FIGS. 1-5, the wing assembly 120 includes a center wing structure 150 and a pair of outer wing structures 210. The outer wing structures 210 are configured to be coupled to the center wing structure 150. The center wing structure 150 includes a pair of center wing outboard ends 168 and a pair of engine mounting locations respectively on opposite sides of the wing centerline 124. In addition, the center wing structure 150 includes a center wing front spar 152 and a center wing rear spar 154 each formed of composite material and having a spar terminal end 156 at each of the center wing outboard ends 168.

Each one of the outer wing structures 210 includes an outer wing front spar 212 and an outer wing rear spar 214 each formed of composite material and configured to be coupled respectively to the center wing front spar 152 and the center wing rear spar 154 to define a wing joint 172 coupling the outer wing structure 210 to the center wing structure 150. The center wing structure 150 is configured such that the spar terminal ends 156 of the center wing front spar 152 and the center wing rear spar 154 at each wing joint 172 are located no further inboard than a vertical plane (not shown) coincident with the engine centerline 106 associated with the engine mounting location, and no further outboard of the engine centerline 106 than a wing joint maximum outboard distance 110, which is defined as ten percent of the distance between the engine centerline 106 and a vertical plane (not shown) coincident with the wing centerline 124. For purposes of the present disclosure, the engine centerline 106 may be generally parallel to the wing centerline 124 when the aircraft 100 is viewed from a top-down perspective, and the distance between the engine centerline 106 and the wing centerline 124 may be measured perpendicular to the respective vertical planes.

Figure 2:
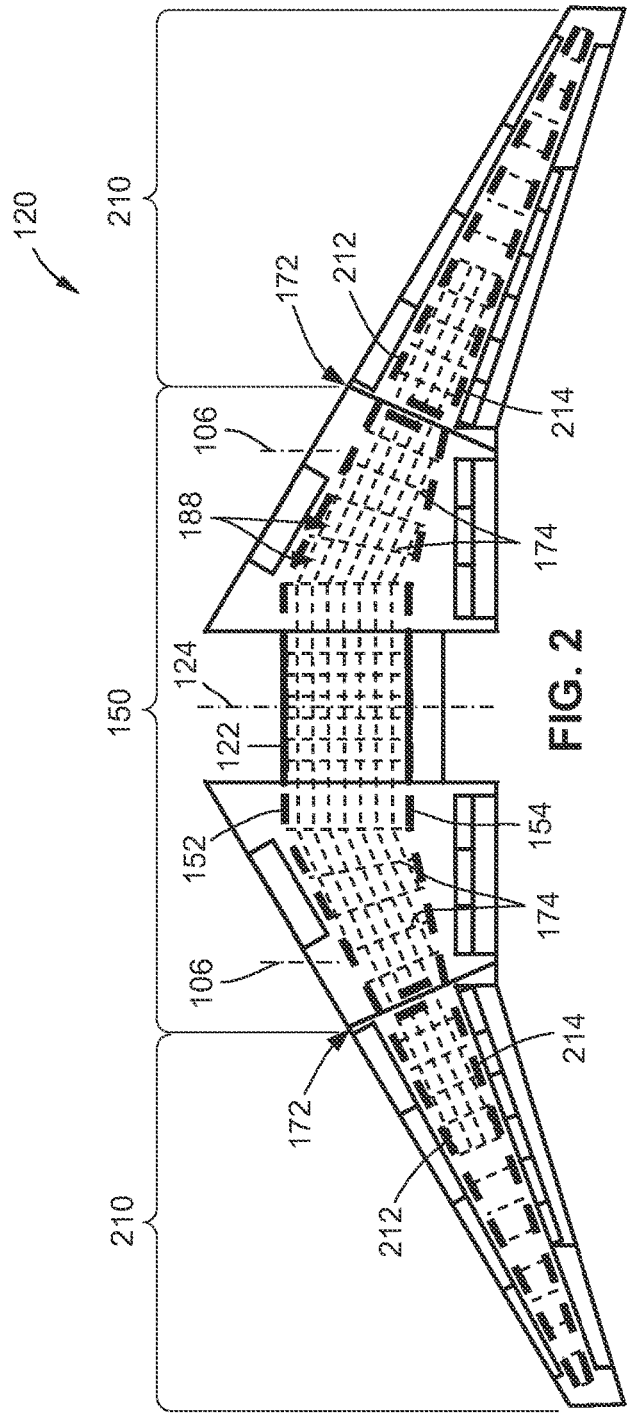
FIG. 2 is a top view of an example of a wing assembly having a center wing structure and a pair of outer wing structures each coupled to the center wing structure at a wing joint located outboard of an engine mounting location on each side of the center wing structure.
Figure 3:
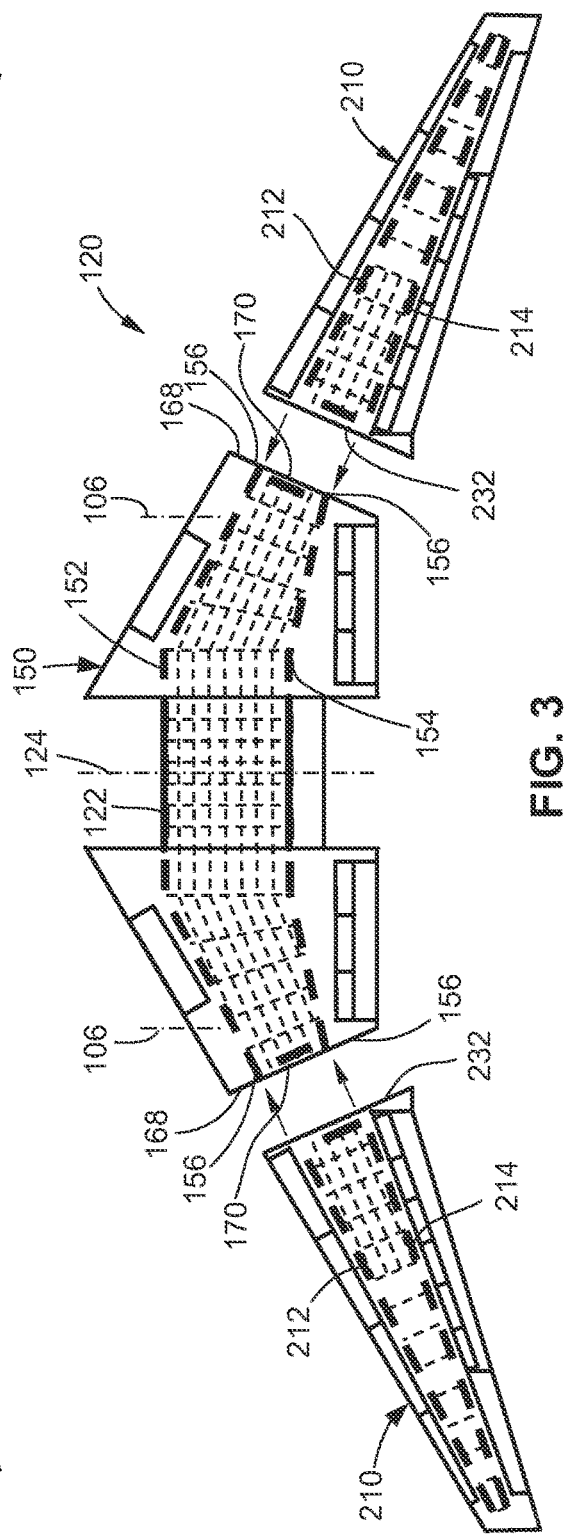
FIG. 3 is an exploded view of the wing assembly of FIG. 2 showing the outer wing structures separated away from the center wing structure.
Figure 4:
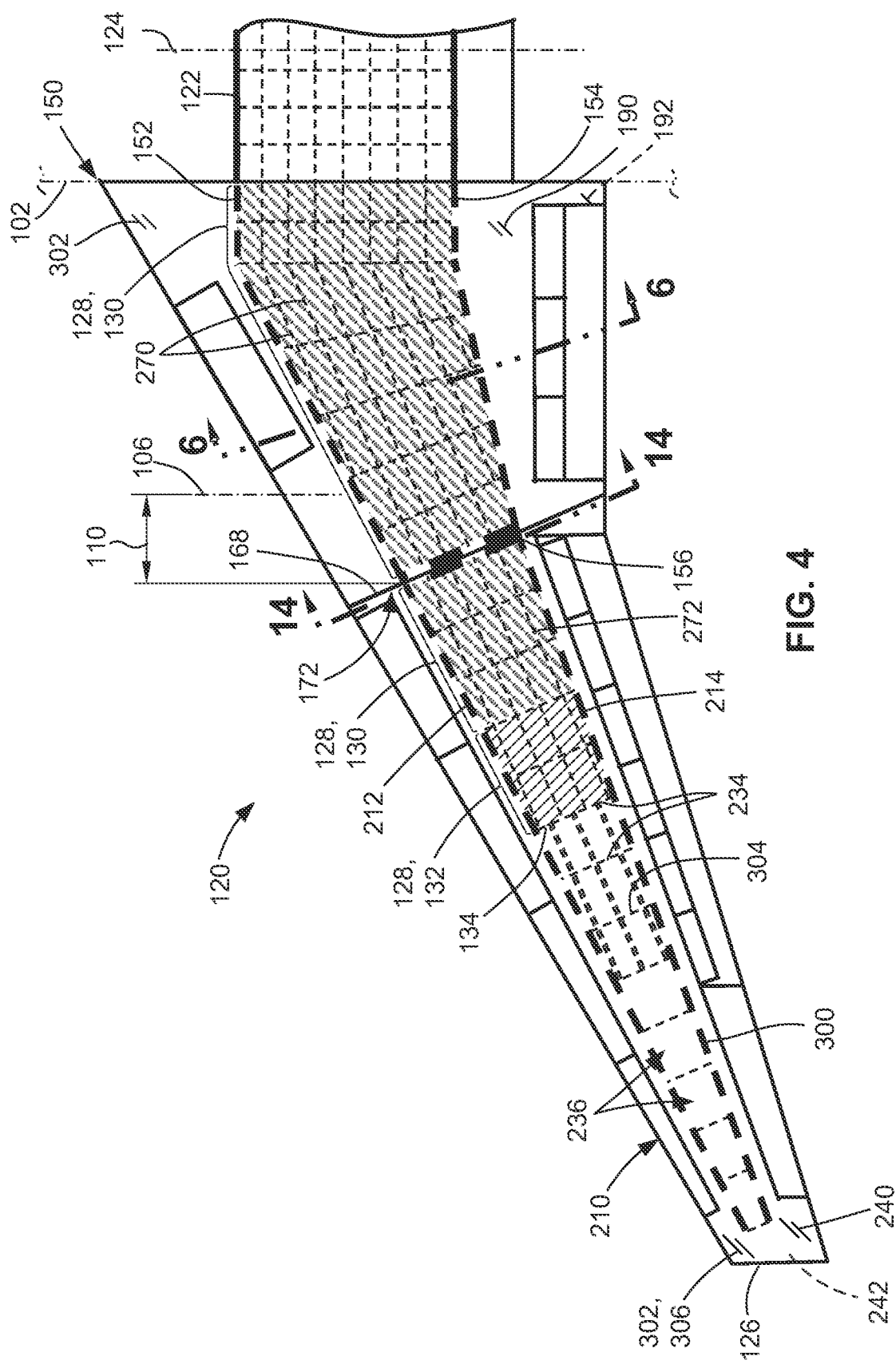
FIG. 4 is a top view of an example of one of the outer wing structures joined to the center wing structure at a wing joint and further illustrating the location of fuel tanks in the wing assembly.

As shown in FIGS. 2-4, the center wing structure 150 may be provided in a one-piece configuration, and may include a center wing box 122 for coupling the wing assembly 120 to the fuselage 102 (FIG. 1). In some examples, the center wing front spar 152 and the center wing rear spar 154 may extend continuously between the center wing outboard ends 168. Advantageously, by dividing the wing assembly 120 into three major structural components including the center wing structure 150 and the pair of outer wing structures 210, each structural component may be configured to accommodate the specific design criteria and loading conditions to which it will be subjected. For example, the center wing structure 150 may be configured as a relatively stiff structure configured to accommodate highly loaded major joints. Such major joints include the attachment of the wing assembly 120 to the fuselage 102, and the attachment of the landing gear (not shown) and the engines 104 to the wing assembly 120. In contrast, the outer wing structures 210 may not include highly loaded joints, and may therefore be configured as relatively flexible structures for accommodating the dynamic loads associated with aeroelasticity performance requirements. The relatively flexible configuration of the outer wing structures 210 may result in a reduction in the structural mass of the wing assembly 120 relative to the structural mass of conventional wings.

Referring to FIGS. 2-5, the center wing structure 150 may include a plurality of center wing ribs 174 formed of composite material and each extending between the center wing front spar 152 and the center wing rear spar 154 and located at spaced intervals along the spanwise direction of the center wing structure 150. A plurality of center wing bays 188 are respectively defined between adjacent pairs of the center wing ribs 174. The center wing ribs 174 may include a center wing stout rib 170 located at the wing joint 172 at each of the center wing outboard ends 168. As described, the center wing stout rib 170 at each wing joint 172 may be formed of metallic material to provide a strength capability that is higher than the strength capability of the remaining center wing ribs 174, and thereby allowing the center wing stout rib 170 to transfer at least a portion of the loads from the outer wing structure 210 to the center wing structure 150, as described in greater detail below.

Figure 5:
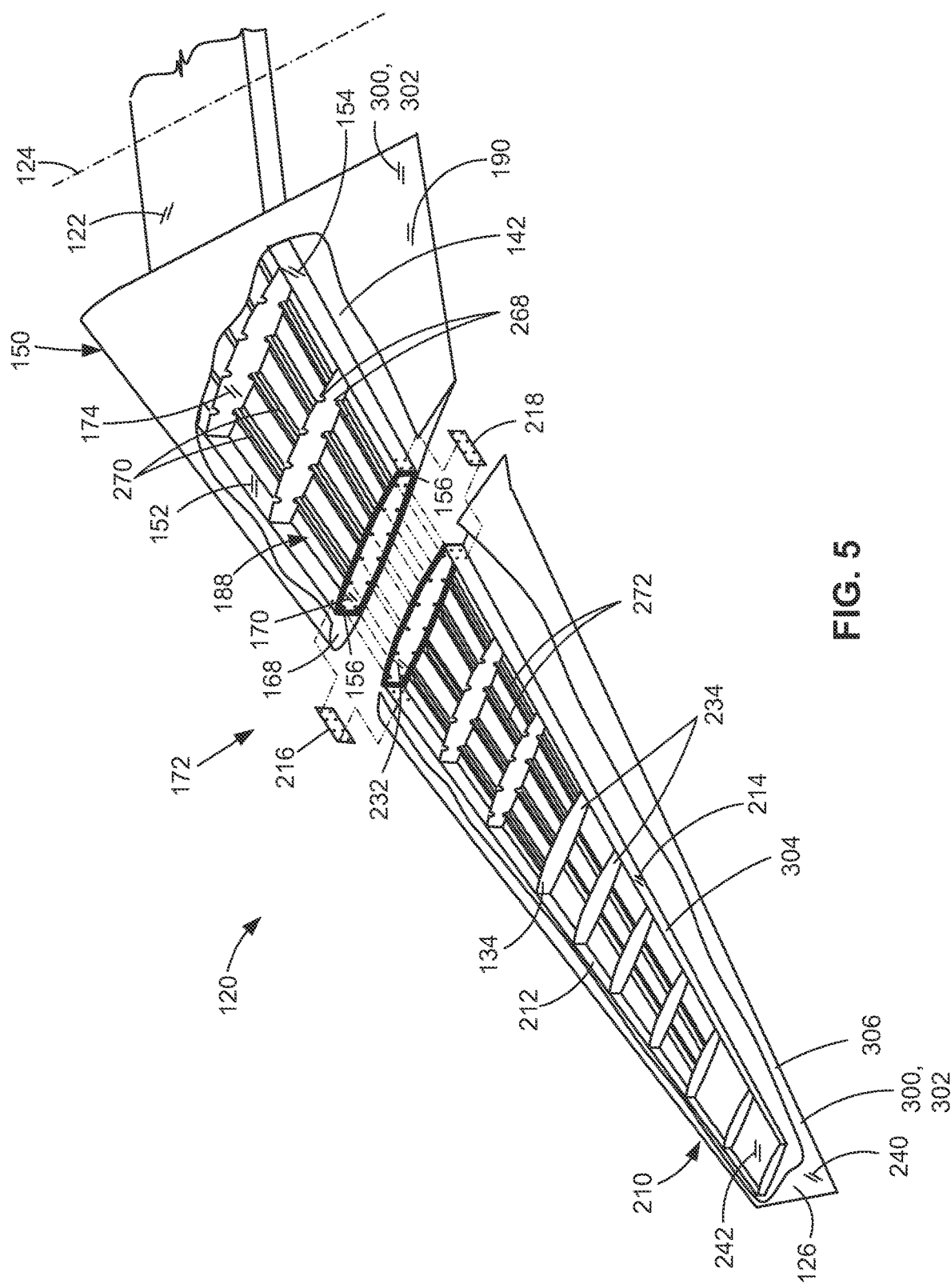
FIG. 5 is an exploded cutaway perspective view of an example of an outer wing structure having an outer wing stout rib configured to be mechanically fastened to a center wing stout rib, and further illustrating an example of a front spar splice plate configured to couple the center wing front spar to the outer wing front spar, and a rear spar splice plate configured to couple the center wing rear spar to the outer wing rear spar.

Referring to FIGS. 4-5, the center wing structure 150 may additionally include a center wing upper skin panel 190 and a center wing lower skin panel 192 each formed of composite material and coupled to the center wing front spar 152, the center wing rear spar 154, and the center wing ribs 174. The center wing upper skin panel 190 and center wing lower skin panel 192 may be comprised of acreage plies 302, which may be described as composite plies 300 that extend continuously in the chordwise direction from the center wing front spar 152 to the center wing rear spar 154, and continuously in the spanwise direction. For example, the center wing upper skin panel 190 and/or the center wing lower skin panel 192 may extend at least from the location of the fuselage 102 (FIG. 1) side to the center wing stout rib 170.

Referring to FIG. 4, the wing assembly 120 may include one or more fuel tanks 128 for supplying fuel to the engines 104 (FIG. 1). The internal structure (e.g., the spars, the wing ribs, and the skin panels) of the center wing structure 150 and/or the outer wing structures 210 may define the walls of the one or more fuel tanks 128. Alternatively, each fuel tank 128 may be a self-contained structure (not shown) that is installed within the wing assembly 120. Each wing assembly 120 may include or define multiple fuel tanks 128. In the example shown, the center wing structure 150 may include a main tank 130 (FIG. 4) on each side of the wing centerline 124. In addition, each outer wing structure 210 may include another main tank 130 (FIG. 4) and a vent tank 132 (FIG. 4) located outboard of the main tank 130. In the present disclosure, the outermost fuel tank 128 in each outer wing structure 210 has a tank outboard end 134 that may define the termination of outer wing stringers 272 that may be included with the outer wing structure 210, as described below.

As mentioned above, the components of the center wing structure 150 and the outer wing structures 210 are formed of composite material. Advantageously, structures formed of composite material have improved corrosion resistance and improved fatigue strength relative to the corrosion resistance and fatigue strength of metallic materials (e.g., aluminum) used in conventional wings. The composite material used in manufacturing the components (e.g., spars, wing ribs, skin panels) of the center wing structure 150 and the outer wing structure 210 may be comprised of composite plies 300 (e.g., prepreg) of fiber-reinforced polymer matrix material. Each composite ply 300 may have a thickness of 0.005 inch or more. The polymer matrix material may be a thermosetting resin or a thermoplastic resin. The fibers may be carbon fibers or the fibers may be formed of alternative materials such as glass, boron, aramid, ceramic or other non-metallic materials or metallic materials.

For certain components such as the upper skin panel and/or lower skin panel of the center wing structure 150 and/or outer wing structure 210, the composite plies 300 may be comprised primarily of unidirectional plies 306 each containing a plurality of generally parallel fibers oriented in a single direction. The unidirectional plies 306 may include 0-degree plies, +45-degree plies, −45-degree plies, and 90-degree plies, and/or composite plies 300 having one or more other fiber orientations. Other components such as the front spars, rear spars, and wing ribs of the center wing structure 150 and/or outer wing structure 210 may be comprised primarily of fabric plies 304. In the present disclosure, a fabric ply 304 may be defined as having multi-directional fibers. For example, a fabric ply 304 may include a woven arrangement of bi-directional fibers oriented perpendicular to each other. Advantageously, fabricating components from fabric plies 304 may reduce or avoid warpage (e.g., spring-in) and/or wrinkles that may otherwise occur if the component was formed of unidirectional plies 306.

Figure 20:
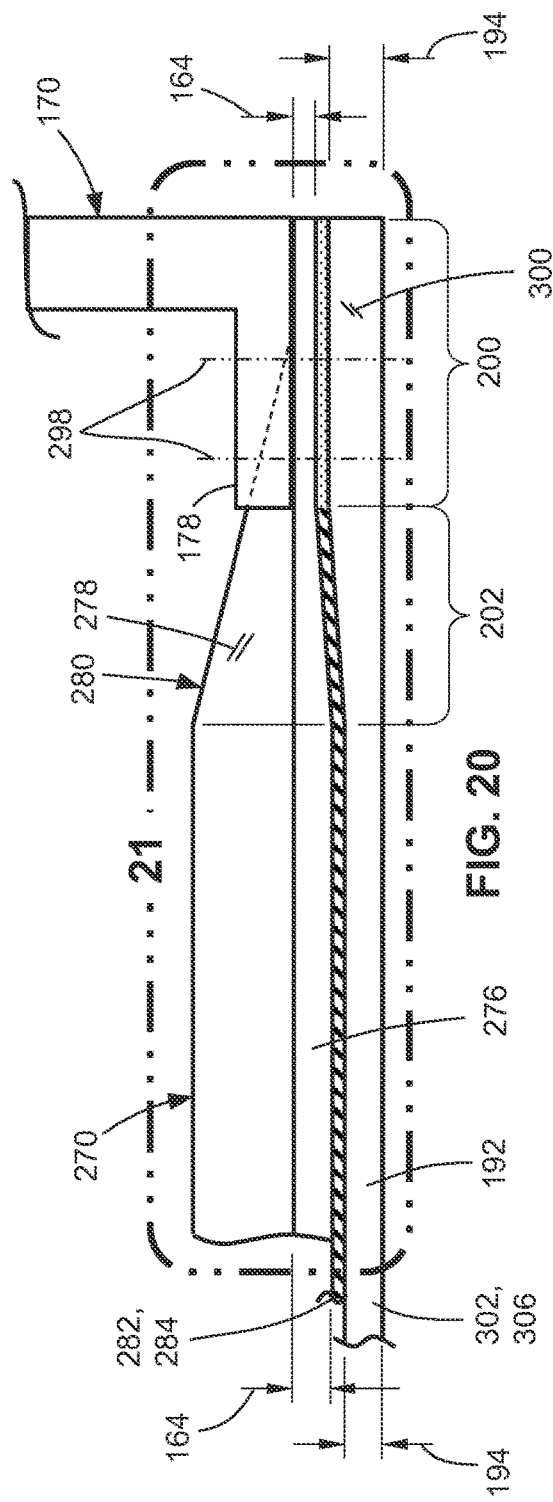
FIG. 20 is a magnified view of the portion of the center wing structure identified by reference numeral 20 of FIG. 18 and illustrating an example of a padup region in the center wing lower skin panel at the location where the center wing stringer terminates at the center wing stout rib.

In some configurations, the center wing upper skin panel 190 and/or the center wing lower skin panel 192 may include one or more localized padup regions 200 (e.g., FIG. 20). As described in greater detail below, padup regions 200 may be provided at locations where the center wing upper skin panel 190 and/or the center wing lower skin panel 192 overlay and are attached (e.g., mechanically fastened and/or bonded) to the center wing front spar 152 and center wing rear spar 154. The panel thickness 194 (FIG. 20) of the acreage plies 302 (e.g., unidirectional plies 306) in a skin panel excludes the additional thickness due to composite plies 300 that make up the padup regions 200. The panel thickness 194 of the acreage plies 302 may be substantially constant (e.g., within 20 percent of each other at any spanwise location) which may simplify manufacturing of the center wing upper skin panel 190 and/or center wing lower skin panel 192 by eliminating the need to incorporate ply drops in the acreage plies 302 as a means for gradually reducing the bending stiffness of the wing assembly 120 along the outboard direction.

Although FIGS. 1-5 show each wing joint 172 as defining a straight line from the wing leading edge to the wing trailing edge, and each wing joint 172 is shown as being substantially perpendicular (e.g., within 20 degrees) to the center wing front spar 152 and/or the center wing rear spar 154, the wing assembly 120 may be configured such that each wing joint 172 has a non-straight shape (not shown) from the wing leading edge to the wing trailing edge. For example, the portion of the wing joint 172 from the wing leading edge to the front spar may be parallel to the aircraft 100 centerline. The wing joint 172 may be described as a field joint in which each outer wing structure 210 may be removable and replaceable at a maintenance facility, as distinguished from a permanent joint manufactured at an aircraft production facility. In this regard, each wing joint 172 may be configured such that an outer wing structure 210 may be removable from the center wing structure 150 via the removal of a plurality of mechanical fasteners 298 (FIG. 17), as described below.

Referring to FIGS. 4-5, as described in greater detail below, each outer wing structure 210 may include a plurality of outer wing ribs 234 each formed of composite material (e.g., primarily fabric plies 304) and extending between the outer wing front spar 212 and the outer wing rear spar 214. The outer wing ribs 234 may be located at spaced intervals along the spanwise direction and may define a plurality of outer wing bays 236 respectively between adjacent pairs of the outer wing ribs 234. The outer wing ribs 234 may include an outer wing stout rib 232 located at the outer wing inboard end 230. The outer wing stout rib 232 (FIG. 5) may extend between the outer wing front spar 212 and the outer wing rear spar 214 and may be mechanically coupled in back-to-back arrangement with the center wing stout rib 170 (FIG. 5).

Referring still to FIGS. 4-5, the outer wing stout rib 232 may be formed of metallic material to provide a strength capability that is higher than the strength capability of the remaining outer wing ribs 234, similar to the arrangement of the center wing stout rib 170. The increased strength capability of the center wing stout rib 170 and outer wing stout rib 232 may allow the mechanically coupled stout ribs to transfer loads between the outer wing structure 210 and the center wing structure 150. The outer wing front spar 212 and the outer wing rear spar 214 may each extend continuously between the outer wing stout rib 232 and the wing tip 126, and may also be coupled (e.g., via spar splice plates 216, 218) respectively to the center wing front spar 152 and center wing rear spar 154 (i.e., at the wing joint 172) for transferring loads between the outer wing structure 210 and the center wing structure 150.

The outer wing structure 210 may include an outer wing upper skin panel 240 and an outer wing lower skin panel 242 formed of composite material and coupled (e.g., bonded and/or mechanically fastened) to the outer wing front spar 212, the outer wing rear spar 214, and the outer wing ribs 234 including the outer wing stout rib 232. Similar to the above-described skin panels of the center wing structure 150, the acreage plies 302 that make up the outer wing upper skin panel 240 and the outer wing lower skin panel 242 may be unidirectional plies 306. The acreage plies 302 may extend continuously in a chordwise direction from the outer wing front spar 212 to the outer wing rear spar 214, and continuously in a spanwise direction from the outer wing stout rib 232 toward the wing tip 126. The panel thickness 194 (FIG. 20) of the acreage plies 302 may be substantially constant which may simplify manufacturing of the outer wing upper skin panel 240 and outer wing lower skin panel 242 by eliminating the need to incorporate ply drops in the acreage plies 302 for reducing the bending stiffness along an outboard direction.

In FIGS. 4-5, the panel thickness 194 (FIG. 20) of the acreage plies 302 in the outer wing upper skin panel 240 and/or the outer wing lower skin panel 242 may be significantly thinner (e.g., at least 25 percent) than the panel thickness 194 of the acreage plies 302 in the center wing upper skin panel 190 and/or the center wing lower skin panel 192. Advantageously, the relatively thin gauge (i.e., panel thickness 194) of the outer wing upper skin panel 240 and outer wing lower skin panel 242 may improve the fatigue loading performance (i.e., durability) of the skin panels relative to the fatigue loading performance of aluminum skin panels of conventional wings. Furthermore, the relatively thin gauge may minimize or avoid the potential for interlaminar failure between the composite plies 300. The panel thickness 194 of the outer wing upper skin panel 240 and outer wing lower skin panel 242 may be selected to provide the desired level of stiffness and stability, while being resistant to aerodynamic flutter. The minimum panel thickness 194 may be dictated by flammability requirements of the Federal Aviation Administration (FAA). For example, the upper skin panel and/or lower skin panel of the center wing structure 150 and the outer wing structure 210 may each have a minimum of 32 composite plies 300, resulting in a panel thickness 194 that provides a level of structural integrity in compliance with FAA flammability requirements.

Similar to the above-described center wing upper and lower skin panels 190, 192, in any one of the outer wing structure embodiments disclosed herein, the acreage plies 302 of the outer wing upper skin panel 240 and/or the outer wing lower skin panel 242 may include 0-degree plies, +45-degree plies, −45-degree plies, and 90-degree plies. The ratio of 0-degree plies to 90-degree plies may be between 1.75 and 2.5. For example, the outer wing upper skin panel 240 and/or the outer wing lower skin panel 242 may comprise 40 percent of 0-degree plies, 40 percent of +45-degree and/or −45-degree plies, and 20 percent of 90-degree plies. In another example, the outer wing upper skin panel 240 and/or the outer wing lower skin panel 242 may comprise 38 percent of 0-degree plies, 45 percent of +45-degree and/or −45-degree plies, and 17 percent of 90-degree plies.

Referring to FIGS. 5-8, the center wing structure 150 may include one or more center wing stringers 270 for stiffening the center wing upper skin panel 190 and/or the center wing lower skin panel 192. The center wing stringers 270 may each extend in a spanwise direction. For example, one or more of the center wing stringers 270 may extend continuously from the center wing box 122 and may terminate at the center wing stout rib 170. The center wing stringers 270 may be oriented generally parallel (e.g., ±30 degrees) to each other and may be spaced apart from each other in a chordwise direction. The center wing stringers 270 may be coupled to a skin panel (the center wing upper and lower skin panels 190, 192) via stringer flanges 276. For example, the stringer flanges 276 may be bonded (e.g., co-bonded, secondary bond, etc.) and/or mechanically fastened to a skin panel.

Referring still to FIGS. 5-8, each of the center wing stringers 270 has at least one stringer flange 276 and at least one stringer web 278 extending outwardly from the stringer flange 276. As described below, each center wing stringer 270 may include a stringer runout 280 (FIG. 20) at the stringer terminal end where the stringer web 278 may gradually decrease in height as a means for tapering the stiffness of the center wing stringer 270 to reduce peel-off forces otherwise tending to separate the stringer flange 276 from the skin panel at the stringer terminal end. In the example shown, the center wing stringers 270 are configured as a blade stringer 274 having a single stringer web 278. However, the center wing stringers 270 may be provided in alternative configurations, such as a hat-section stringer (not shown) having a pair of stringer webs extending outwardly respectively from a pair of stringer flanges, and the stringer webs may be interconnected by a stringer cap.

As shown in FIGS. 6-8, the center wing ribs 174 may include a plurality of rib cutouts 268 in the rib outer flanges 178 and/or in the rib webs 184 at discrete locations along the upper edge and/or lower edge of the center wing ribs 174. The rib cutouts 268 provide clearance for the center wing stringers 270 to pass through the center wing ribs 174. The center wing ribs 174 may be coupled to the center wing upper skin panel 190 and/or center wing lower skin panel 192 via a combination of bonding and mechanical fasteners 298. In addition, the center wing ribs 174 may be coupled to the center wing front spar 152 and center wing rear spar 154 via mechanical fasteners 298.

Referring to FIGS. 7-10, the center wing front spar 152 and the center wing rear spar 154 may each have a channel-shaped cross section having a spar web 166 and an opposing pair of spar outer flanges 160 interconnected by the spar web 166. Similar to the below-described wing rib configuration shown in FIG. 13, the spar outer flanges 160 in FIGS. 9-10 may be connected to the spar web 166 by a radius portion 182. The spar web 166, the spar outer flanges 160, and the radius portion 182 may be comprised of fabric plies 304. As mentioned above, fabricating a component from fabric plies 304 may reduce or avoid warpage and/or wrinkles that may otherwise occur if the component was formed of unidirectional plies 306.

Referring to FIGS. 9-10, the spar outer flanges 160 of the center wing front spar 152 and/or the center wing rear spar 154 may include one or more 0-degree plies to increase the shear strength of the spar outer flanges 160. A 0-degree ply 308 may be described as a unidirectional ply 306 in which the fibers are oriented along a lengthwise direction of the spar outer flanges 160. In the example shown, the one or more 0-degree plies may be located at an approximate mid-plane of the spar outer flange 160. The 0-degree plies in the spar outer flanges 160 may be excluded from the radius portions 182 and from the spar web 166 to avoid the above-mentioned warpage (i.e., spring-in) of the spar outer flanges 160 that may otherwise occur during curing of the unidirectional plies in the radius portions 182. During layup, the side edges of the 0-degree plies may be maintained at a distance of no less than 0.25 inch from the radius portion 182 to avoid warpage during curing.

In FIGS. 9-10, the center wing front spar 152 and/or the center wing rear spar 154 may be provided in a multi-piece configuration to simplify manufacturing of the outer wing structure 210 (FIG. 5). For example, the center wing front spar 152 and/or the center wing rear spar 154 may each include a pair of spar chords 158 each having an L-shaped configuration including a spar inner flange 162 and a spar outer flange 160 interconnected by a radius portion 182. The spar inner flange 162 of each spar chord 158 may be mechanically coupled to the spar web 166 such as via a double row of mechanical fasteners 298 extended through the spar inner flange 162 and spar web 166. The spar outer flange 160 of each spar chord 158 may be coupled to a skin panel (e.g., the center wing upper skin panel 190 or the center wing lower skin panel 192—FIGS. 7-8) via bonding (e.g., co-bonding) and/or mechanical fastening, such as via a double row of mechanical fasteners 298 (FIGS. 7-8. As mentioned above, the spar outer flanges 160 of each of the spar chords 158 may include one or more 0-degree plies for increasing the shear strength of the spar outer flanges 160. Although the figures illustrate a multi-piece configuration for the center wing front spar 152 and the center wing rear spar 154, such spars may be provided in a single-piece configuration (not shown) consisting of a pair of spar outer flanges 160 interconnected by a spar web 166, similar to the below-described configuration of the wing rib shown in FIG. 13.

Referring to FIGS. 4 and 9-10, the center wing rear spar 154 (and outer wing rear spar 214) may be configured to handle higher bending loads than the center wing front spar 152 (and outer wing front spar to 12). For example, the center wing rear spar 154 (and outer wing rear spar 214) may include a greater quantity of composite plies 300 resulting in a thicker cross section and larger structural mass to provide a correspondingly higher strength capability (e.g., transverse shear strength, bending strength) and higher bending stiffness than the center wing front spar 152 (and outer wing front spar to 12). The center wing stringers 270 near the center wing rear spar 154 may also be larger in mass than the center wing stringers 270 near the center wing front spar 152. The chordwise difference in the strength capability of the center wing stringers 270 may be gradual or stepwise. For example, the forward 50 percent of the center wing stringers 270 (i.e., near the center wing front spar 152) may have one cross-sectional size, and the aft 50 percent of the center wing stringers 270 (i.e., near the center wing rear spar 154) may have a smaller cross-sectional size.

Referring to FIGS. 11-13, shown in FIG. 11 is an example of a center wing rib 174 coupled to the center wing upper skin panel 190 and center wing lower skin panel 192. FIG. 12 shows the center wing stringers 270 on the center wing upper skin panel 190 and center wing lower skin panel 192 passing through the rib cutouts 268 in the center wing ribs 174. FIG. 13 shows an example of a channel-shaped cross-section of the center wing rib 174 which may include opposing rib outer flanges 178 interconnected by a rib web 184. Each of the rib outer flanges 178 may be connected to the rib web 184 by a radius portion 182. As mentioned above, the center wing ribs 174 may be fabricated from fabric plies 304 to reduce or avoid warpage and/or wrinkling during curing.

The rib outer flanges 178 may include one or more 0-degree plies located at an approximate midplane of the rib outer flanges 178 for increasing the shear strength of the rib outer flanges 178. Similar to the above-described arrangement of the center wing front spar 152 (FIG. 9) and center wing rear spar 154 (FIG. 10), the 0-degree plies in the center wing ribs 174 may be excluded from the radius portion 182 and rib web 184 as a means to avoid or reduce warpage (i.e., spring-in). Although shown in a single-piece configuration, the center wing ribs 174 may be provided in a multi-piece configuration (not shown) in which each of the rib outer flanges 178 is respectively part of a pair of rib chords 176 (e.g., an upper rib chord and a lower rib chord) interconnected by a rib web 184, similar to the multipiece configuration of the center wing front spar 152 (FIG. 9) or center wing rear spar 154 (FIG. 10). Although not shown, the rib web 184 of the center wing ribs 174 may each include discrete stiffeners to prevent out-of-plane buckling of the center wing ribs 174.

Referring to FIGS. 14-16, shown in FIG. 14 is a sectional view of the center wing structure 150 at the center wing stout rib 170. The center wing upper skin panel 190 and the center wing lower skin panel 192 are coupled to the center wing stout rib 170 in a manner similar to the arrangement shown in FIGS. 6-8. FIG. 15 shows a portion of the center wing stout rib 170 coupled to the center wing front spar 152. FIG. 16 shows a portion of the center wing stout rib 170 coupled to the center wing rear spar 154. As mentioned above, the center wing stout rib 170 and the outer wing stout rib 232 (FIG. 5) may have increased strength capability relative to the remaining center wing ribs 174 and the remaining outer wing ribs 234 (FIG. 5) to accommodate the termination of the center wing stringers 270 and the termination of the outer wing stringers 272 respectively at the center wing stout rib 170 and the outer wing stout rib 232. The center wing stout rib 170 and the outer wing stout rib 232 may also provide a load path across the wing joint 172 from the outer wing structure 210 to the center wing structure 150, in addition to the load path provided by the below-described spar splice plates (e.g., FIGS. 422-25) joining the spars of the outer wing structure 210 to the spars of the center wing structure 150.

Referring still to FIGS. 14-16, the center wing stout rib 170 and outer wing stout rib 232 may additionally accommodate differences in the bending stiffness of the outer wing structure 210 relative to the bending stiffness of the center wing structure 150. For example, in the case of an aircraft 100 (FIG. 1) with high-aspect-ratio wings that are relatively shallow and having a short average wing chord, the outer wing structure 210 (FIG. 1) may be moderately loaded and structurally sized based on dynamic loads which are a function of mass and stiffness. The outer wing structure 210 may be generally flat and straight and may have less bending stiffness than the center wing structure 150 to allow more flexibility for the outer wing structure 210 for complying with aeroelastic performance requirements. In contrast, the center wing structure 150 may be highly-contoured and may include several highly-loaded joints for the attachment of heavy components, including the attachment of the wing assembly 120 to the fuselage 102, and the mounting of the engines 104 (FIG. 1) and landing gear (not shown) to the wing assembly 120, as mentioned above.

Figure 17:
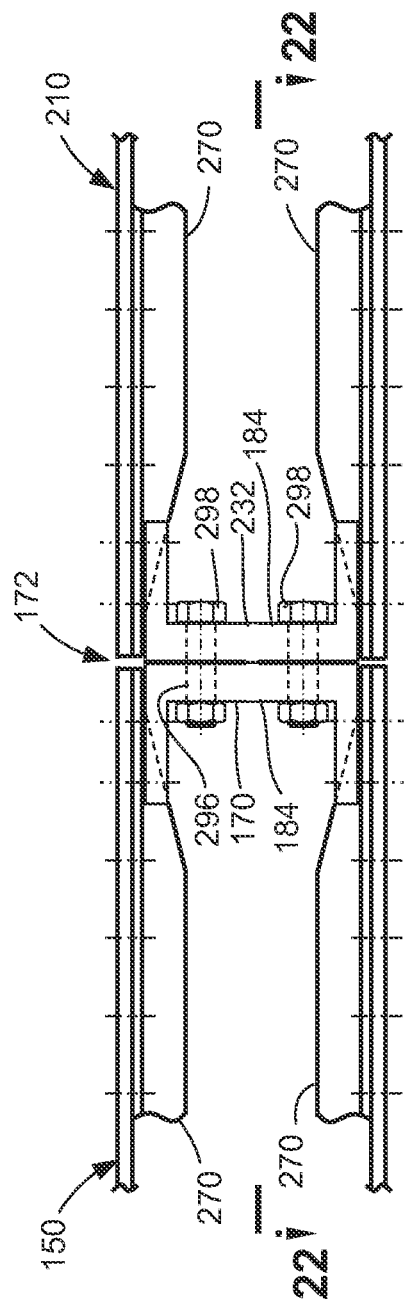
FIG. 17 is a sectional view of the wing assembly taken along line 17-17 of FIG. 15 and illustrating an example of the wing joint illustrating the center wing stout rib and the outer wing stout rib fastened together in back-to-back arrangement.
Figure 18:
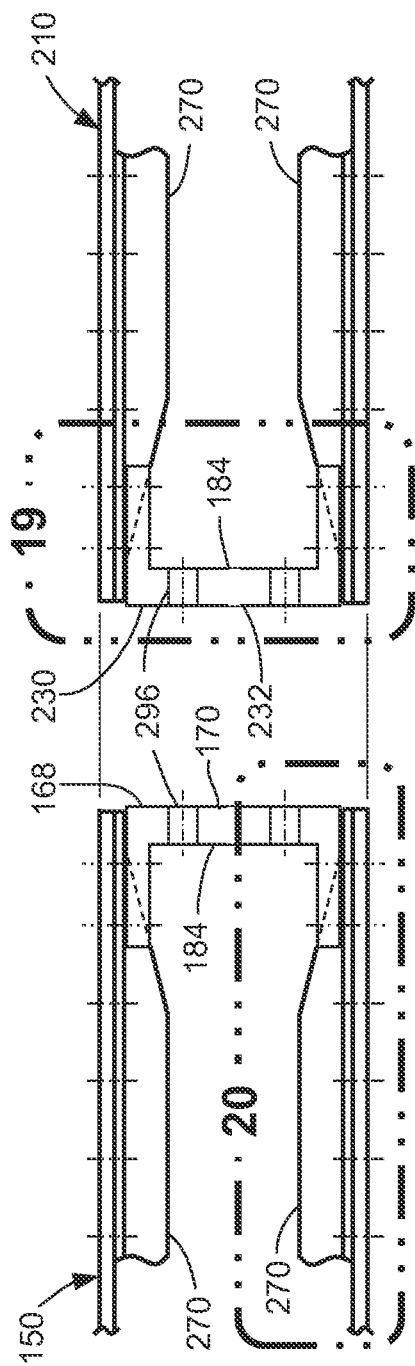
FIG. 18 is an exploded view of the wing joint of FIG. 17.
Figure 19:
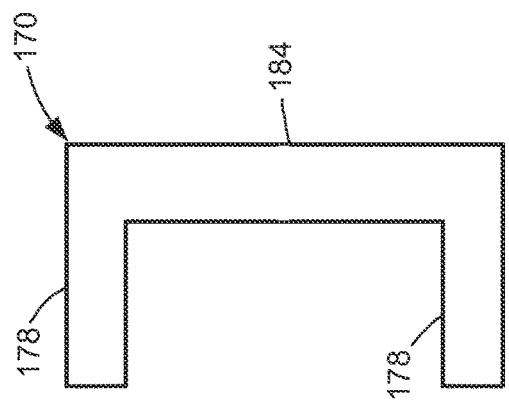
FIG. 19 is a sectional view of an example of the outer wing stout rib of FIG. 18.

Referring to FIGS. 17-19, shown in FIGS. 17-18 is an example of the wing joint 172 illustrating the center wing stout rib 170 and the outer wing stout rib 232 in an assembled configuration (FIG. 17) and a disassembled configuration (FIG. 18). As mentioned above, the center wing structure 150 may include a center wing stout rib 170 at each of the center wing outboard ends 168. Each of the outer wing structures 210 may include an outer wing stout rib 232 at the outer wing inboard end 230. At each wing joint 172, the outer wing stout rib 232 and the center wing stout rib 170 may be configured to be positioned in back-to-back arrangement and mechanically fastened to each other. In the example of FIG. 19, the center wing stout rib 170 and the outer wing stout rib 232 may each have a channel-shaped cross-section including a rib web 184 interconnecting a pair of rib outer flanges 178. However, the center wing stout rib 170 and/or the outer wing stout rib 232 may have alternative cross-sectional shapes.

As shown in FIG. 17, when placed in back-to-back arrangement, the rib webs 184 of the center wing stout rib 170 and outer wing stout rib 232 may be in direct physical contact with each other. The rib webs 184 of the outer wing stout rib 232 and center wing stout rib 170 may include a matching hole pattern 296 (FIG. 14) of fasteners holes configured to receive a corresponding plurality of mechanical fasteners 298 (e.g., tension fasteners) for securing together the outer wing stout rib 232 and center wing stout rib 170. As mentioned above, the center wing stout rib 170 and outer wing stout rib 232 may have a higher strength capability than the remaining wing ribs, and may be comprised of metallic material such as steel or titanium or other high-strength alloy that is compatible with the above-described composite material that make up the spars, wing ribs, and stringers of the center wing structure 150 and outer wing structure 210. However, the center wing stout rib 170 and/or the outer wing stout rib 232 may be formed primarily of fabric plies (not shown) to limit the occurrence of warpage during curing.

Referring to FIGS. 15-18 and 20, the center wing upper skin panel 190 and the center wing lower skin panel 192 may include localized padup regions 200 (FIGS. 15-16 and 20) at the chordwise locations of the center wing stringers 270 at the spanwise location of the center wing stout rib 170 (FIGS. 17-18). Each of the padup regions 200 is comprised of composite plies 300 (FIG. 20) on top of the acreage plies 302 (FIG. 20) that make up the center wing upper skin panel 190 and the center wing lower skin panel 192. Although not shown, the outer wing upper skin panel 240 and the outer wing lower skin panel 242 may also include localized padup regions 200 at locations where the optional outer wing stringers 272 terminate at the outer wing stout rib 232 (FIGS. 17-18). As described in greater detail below, each padup region 200 causes the skin panel to carry a greater portion of the load otherwise carried by the stringers at the stringer runouts 280 (FIG. 20), and which thereby reduces peel-off forces on the edges of the stringer flanges 276.

Referring to FIG. 20, shown is an example of the termination of the center wing stringers 270 at the center wing stout rib 170. As mentioned above, each one of the center wing stringers 270 has a stringer flange 276 and at least one stringer web 278 extending outwardly from the stringer flange 276. In addition, each center wing stringer 270 has a stringer runout 280 at the stringer terminal end at the center wing stout rib 170. As shown in FIG. 20, the stringer web 278 may gradually decrease in height along the stringer runout 280 at the terminal end. The gradual decrease in the height of the stringer web 278 result in a tapering of the stiffness of the stringer, which advantageously reduces peel-off forces that otherwise tend to pull the stringer flange 276 away from the skin panel at the stringer terminal end.

In FIG. 20, the panel thickness 194 of the center wing lower skin panel 192 (and the center wing upper skin panel 190) may gradually increase within a ramp region 202 toward the full thickness of the padup region 200. The start of the ramp region 202 made be coincident with the start of the taper in stringer height at the stringer runout 280. Within the ramp region, the panel thickness 194 may increase at a length-to-height ratio of no less than 2:1 to preferably provide for a shallow ramp angle of the ramp region 202. The stringer flange 276 has a flange thickness 164 that may decrease with the increase in panel thickness 194 within the ramp region 202. For example, the flange thickness 164 may decrease in direct proportion to the increase in panel thickness 194 within the ramp region, such that a combined thickness of the skin panel and the stringer flange 276 is constant within the ramp region 202.

The padup region 200 is preferably at full thickness at least within the width of the rib outer flange 178 of the center wing stout rib 170. The increase in panel thickness 194 in the ramp region 202 and the corresponding decrease in flange thickness 164 of the rib outer flanges 178 may facilitate the transfer of bending loads from the outer wing structure 210 (FIG. 17) to the center wing structure 150 (FIG. 17) at the wing joint 172 (FIG. 17). Although not shown, the outer wing stringers 272 may also include stringer runouts 280 at the outer wing stout rib 232. The stringer runouts 280 of the outer wing stringers 272 may be configured in a manner similar to the termination of the center wing stringers 270 in FIG. 20. Although not shown, the outer wing upper skin panel 240 and outer wing lower skin panel 242 may include padup regions 200 (and ramp regions 202) at locations complementary to the terminations of the outer wing stringers 272. Such padup regions 200 in the outer wing upper and lower skin panels 240, 242 may be configured in a manner similar to the above-described padup regions 200 in the center wing upper and lower skin panels 190, 192.

Referring still to FIG. 20, the stringer flange 276 of each center wing stringer 270 may be coupled to the center wing upper skin panel 190 (not shown) or the center wing lower skin panel 192 via bonding. The bonded interface between the stringer flanges 276 and the skin panels may be described as a bondline 282. The center wing stringers 270 may be bonded to the center wing upper skin panel 190 and center wing lower skin panel 192 via co-bonding of an uncured stringer to a cured skin panel. Alternatively, bonding may comprise the secondary bonding of a cured stringer to a cured skin panel via an adhesive layer 284. In a still further example, bonding may comprise co-curing an uncured stringer with an uncured skin panel. In addition to bonding, the wing assembly 120 may include mechanical fasteners 298 to assist in securing the stringer flanges 276 to the skin panels.

Figure 21:
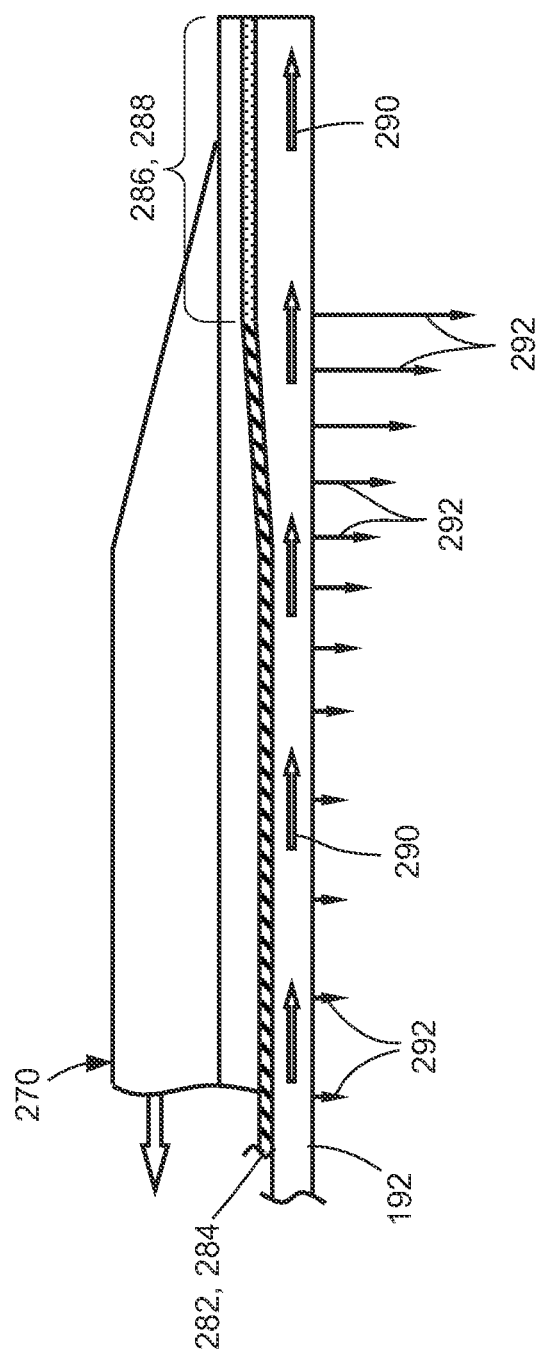
FIG. 21 is a magnified view of the portion of the wing assembly identified by reference numeral 21 of FIG. 20 and illustrating the distribution of shear stresses and pulloff stresses in the bondline coupling the center wing stringer to the center wing lower skin panel.

Referring to FIG. 21, the bondline 282 (e.g., the adhesive layer 284) between the center wing lower skin panel 192 and the stringer flanges 276 of the center wing stringer 270 may be terminated at a distance of no more than 0.50 inch from the stringer terminal end. The termination of the bondline 282 at a spaced distance from the stringer terminal end may result in a flange-skin gap 286 between the stringer flange 276 and the skin panel. Within the flange-skin gap 286, the stringer flange 276 may be non-bonded to the skin panel. The flange-skin gap 286 may be filled with a non-adhesive gap filler 288 such as a layer of fiberglass or other material that is non-binding to the stringer flange 276 and/or non-binding to the skin panel. By terminating the bondline 282 at a distance from the tip of the stringer terminal end, high shear stresses 290 in the bondline 282 due to wing bending may be directed away from the stringer terminal end. For example, FIG. 21 shows shear stresses 290 and pulloff stresses 292 in the bondline 282. The relative magnitude of the pulloff stresses 292 is represented by the different lengths of the arrows. As shown, the highest magnitude of pulloff stresses 292 is maintained at a distance from the tip of the stringer terminal end. By maintaining the high pulloff stresses 292 at a distance from the tip of the stringer terminal end, creep or shear stresses 290 in the bondline 282 between the stringer and the skin panel may be minimized, which may mitigate or eliminate the initiation of cracks in the bondline 282 that may otherwise propagate along the length of the center wing stringer 270.

Figure 22:
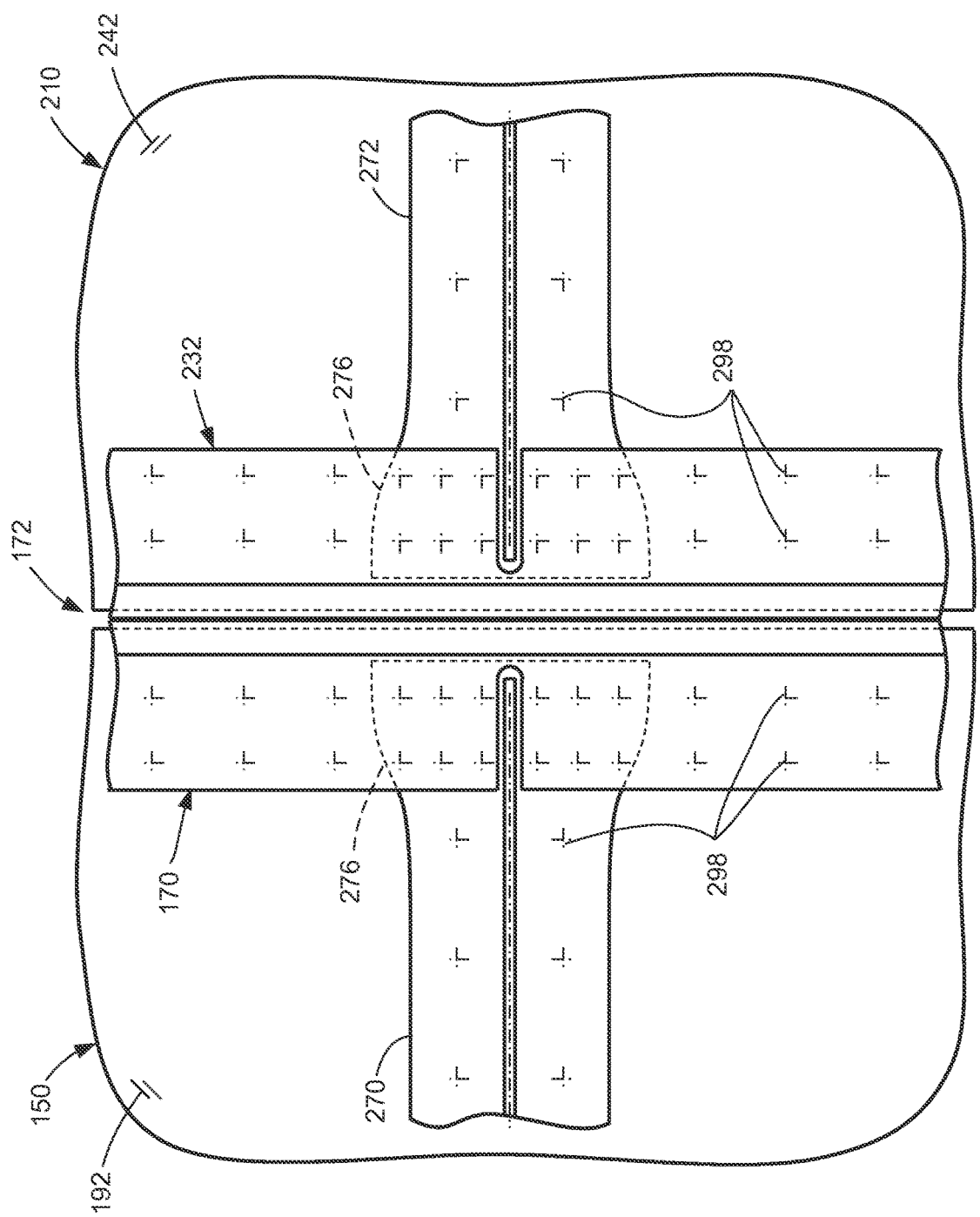
FIG. 22 is a top view of the wing assembly taken along line 22-22 of FIG. 17 and illustrating the wing joint and the termination of a center wing stringer and an outer wing stringer respectively on opposite sides of the wing joint.

Referring to FIG. 22, shown is a top view of the center wing lower skin panel 192 and outer wing lower skin panel 242 at the wing joint 172. On one side of the wing joint 172, a center wing stringer 270 is mounted to the center wing lower skin panel 192 and terminates at the center wing stout rib 170. On an opposite side of the wing joint 172, and outer wing stringer 272 is mounted to the outer wing lower skin panel 242 and terminates at the outer wing stout rib 232. The stringer flanges 276 of the center wing stringer 270 and outer wing stringer 272 may be flared at the terminal ends as a means for improving the distribution of stringer loads into the respective skin panels, thereby reducing peel-off forces in the bondline 282 (FIG. 21) between the stringer flanges 276 and the skin panels. Although the outer wing stringers 272 are shown as being aligned with the center wing stringers 270, in an example not shown, the outer wing stringers 272 may be non-aligned with the center wing stringers 270. In such an example, the padup regions 200 (FIG. 20) on each side of the wing joint 172 may provide a conduit for transferring loads from the outer wing structure 210, through the outer wing stout rib 232 and center wing stout rib 170, and into the center wing structure 150.

Figure 23:
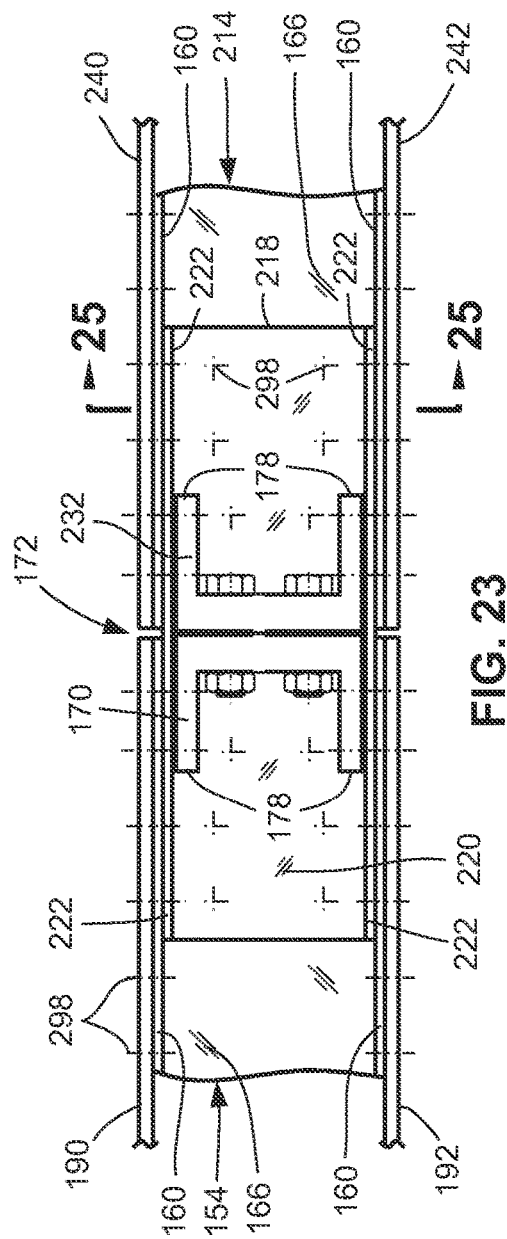
FIG. 23 is a sectional view taken along line 23-23 of FIG. 16 and illustrating an example of a rear spar splice plate interconnecting the center wing rear spar to the outer wing rear spar at the wing joint.
Figure 24:
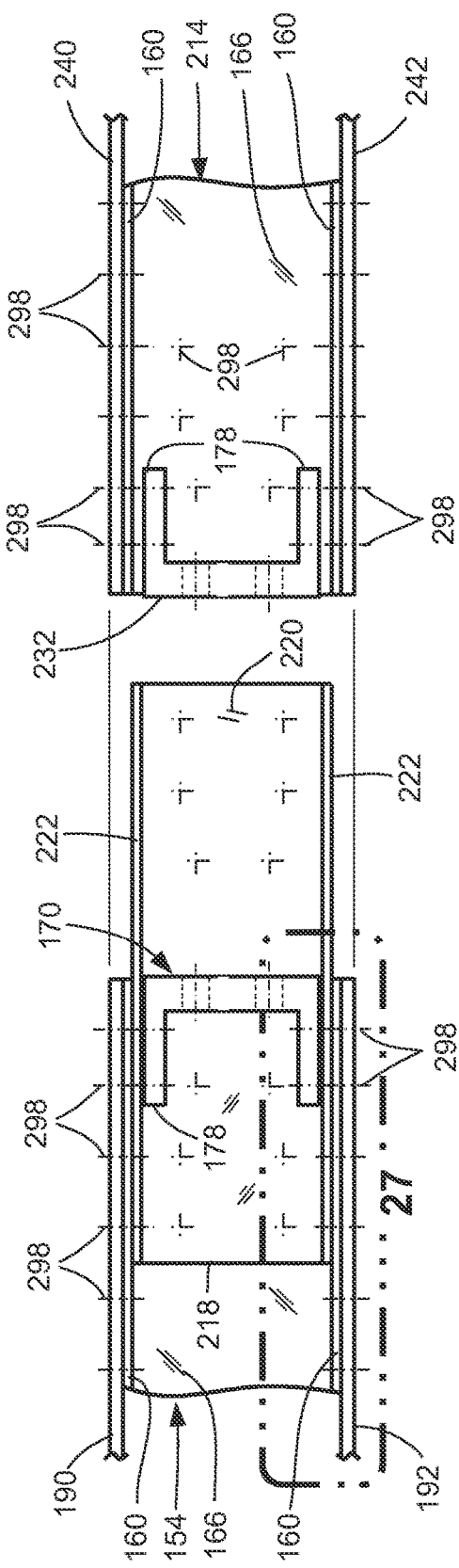
FIG. 24 is a partially exploded view of the wing joint of FIG. 23.
Figure 26:
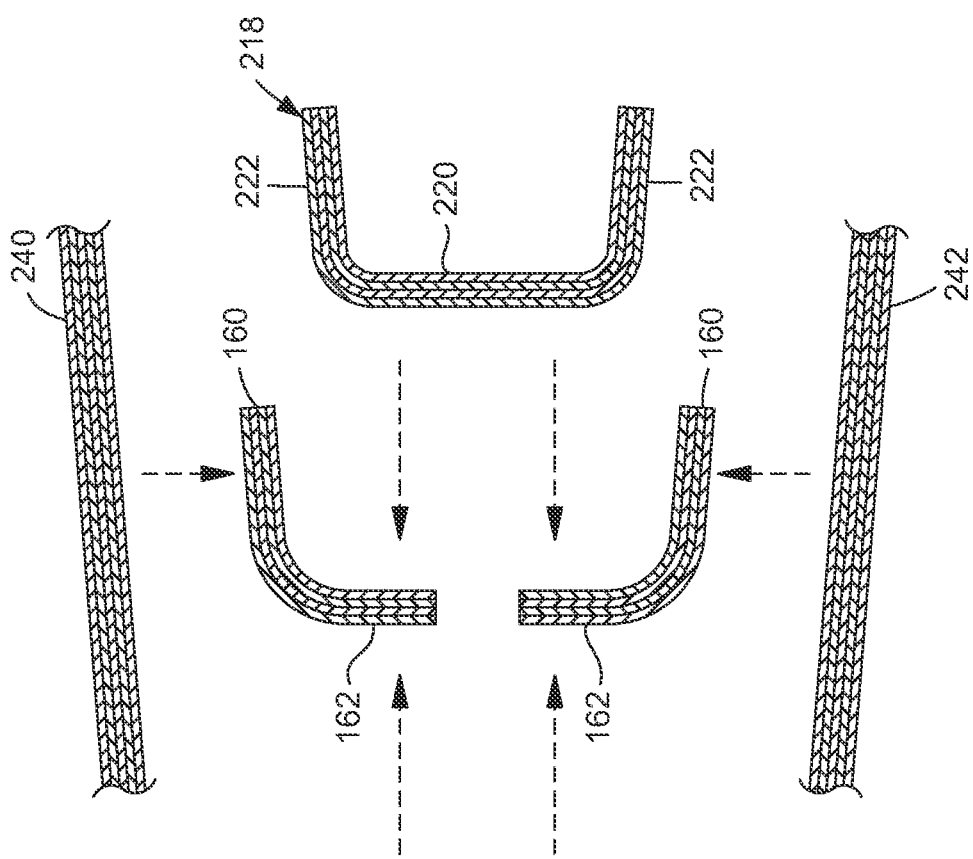
FIG. 26 is an exploded view of FIG. 25.
Figure 25:
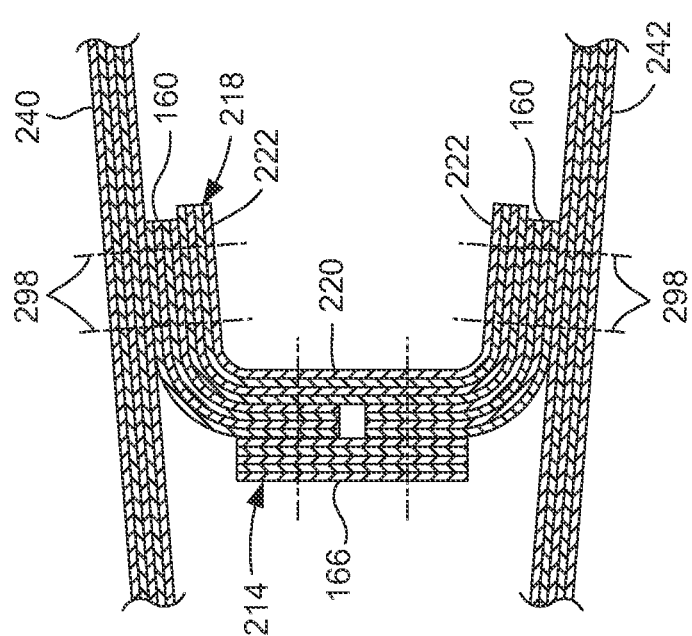
FIG. 25 is a sectional view taken of the wing assembly taken along line 25-25 of FIG. 23 and illustrating an example of a rear spar splice plate for interconnecting the center wing rear spar with the outer wing rear spar.

Referring to FIGS. 23-26, shown is an example of a splice configuration for coupling the center wing rear spar 154 to the outer wing rear spar 214 at the wing joint 172. The wing assembly 120 may include a rear spar splice plate 218 interconnecting the spar terminal end 156 of the center wing rear spar 154 to the spar terminal end 156 of the outer wing rear spar 214 at each wing joint 172. As shown in FIGS. 25-26, the rear spar splice plate 218 may have a channel-shaped cross section having a splice web 220 interconnecting an opposing pair of splice outer flanges 222. The channel-shaped cross section of the rear spar splice plate 218 may be configured to nest inside the channel-shaped cross section of the center wing rear spar 154 and outer wing rear spar 214. The splice web 220 of the rear spar splice plate 218 may be horizontally oriented, and may be placed in contact with the spar web 166 (FIGS. 23-24) or the spar inner flanges 162 (FIG. 25) of both the center wing rear spar 154 and the outer wing rear spar 214. The splice outer flanges 222 on the upper and lower sides of the rear spar splice plate 218 may be placed in contact with the spar outer flanges 160 of the center wing rear spar 154 and outer wing rear spar 214, and with the rib outer flanges 178 of the center wing stout rib 170 and outer wing stout rib 232 on the upper and lower sides of the center wing rear spar 154 and the outer wing rear spar 214.

However, in other examples not shown, the rear spar splice plate 218 may be coupled to only the spar webs 166 of the center wing rear spar 154 and the outer wing rear spar 214. In a still further example, instead of being nested inside the channel-shaped cross-section of the center wing rear spar 154 and the outer wing rear spar 214, the splice plate 218 may be mounted on the outside of the center wing rear spar 154 and the outer wing rear spar 214, which may be nested inside the rear spar splice plate 218. Even further, instead of the splice plate 218 being a unitary structure, the splice plate 218 may have a multi-piece configuration, including a web splice plate (not shown) for interconnecting only the spar webs 166 of the center wing rear spar 154 and the outer wing rear spar 214, a set of upper flange splice straps (not shown) for interconnecting the upper spar flanges of the center wing rear spar 154 and the outer wing rear spar 214, and a set of lower flange splice straps (not shown) for interconnecting the lower spar flanges of the center wing rear spar 154 and the outer wing rear spar 214.

In the example of FIGS. 23-25, two rows of mechanical fasteners 298 may be extended through the skin panels 190, 192, 240, 242, the splice outer flanges 222, and the rib outer flanges 178 of the outer wing stout rib 232 and center wing stout rib 170. In addition, mechanical fasteners 298 may be extended through the splice web 220 and spar webs 166 of the outer wing rear spar 214 and center wing rear spar 154. Although not shown, the wing assembly 120 may include a front spar splice plate 216 configured to couple the spar terminal end 156 of the center wing front spar 152 to the spar terminal end 156 of the outer wing front spar 212 in a manner similar to the above-described configuration of the rear spar splice plate 218 for joining the center wing rear spar 154 to the outer wing rear spar 214. Advantageously, each wing joint 172 is configured to allow for field removal and replacement of an outer wing structure 210 from the center wing structure 150 by removing the front and rear spar splice plates 216, 218 and decoupling the outer wing stout rib 232 from the center wing stout rib 170.

Figure 27:
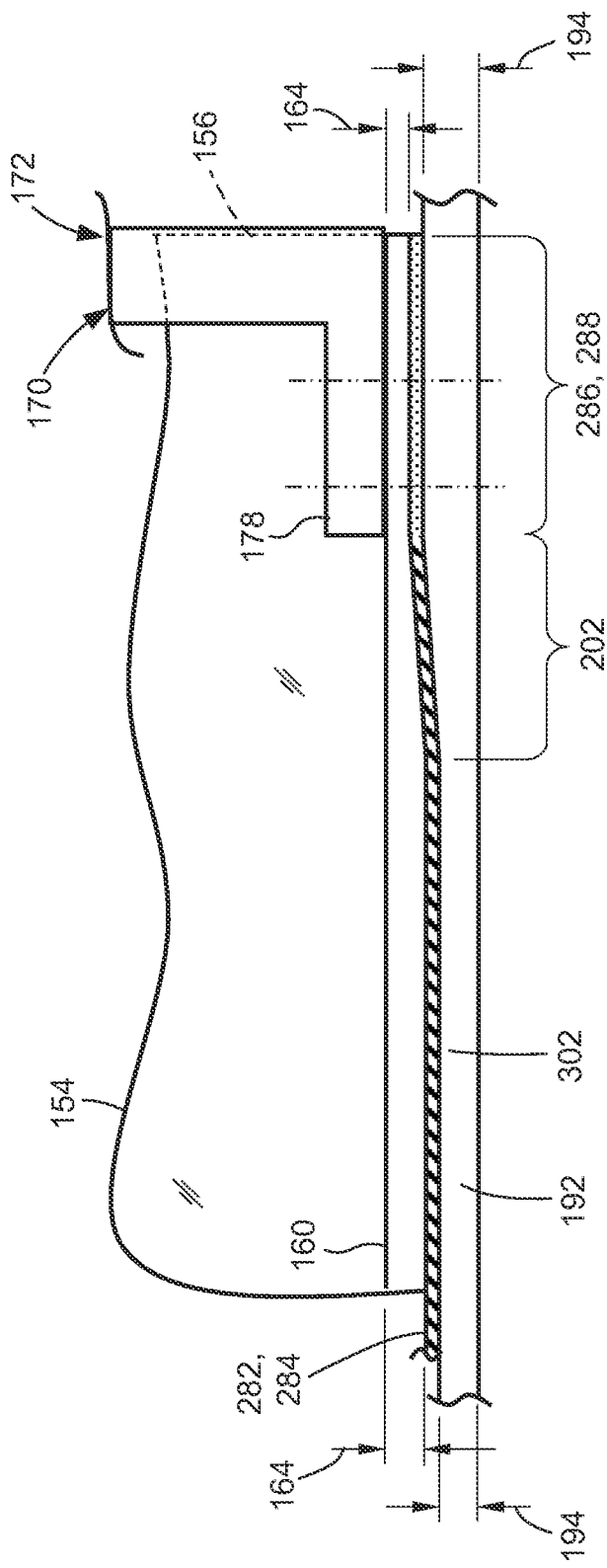
FIG. 27 is a magnified view of the portion of the wing assembly identified by reference numeral 27 of FIG. 24 and illustrating an example of a padup region in the center wing lower skin panel at the location where the center wing rear spar terminates at the center wing stout rib.

Referring to FIG. 27, the spar outer flanges 160 of the center wing front spar 152 and center wing rear spar 154 may be coupled to the center wing upper skin panel 190 and center wing lower skin panel 192 via bonding along the length of the spars, in addition to one or more rows of mechanical fasteners 298 (e.g., two rows) that may extend along the length of each spar outer flange 160. Bonding of the spar outer flanges 160 to the skin panels may comprise co-bonding of an uncured spar to a cured skin panel. Alternatively, bonding may comprise secondary bonding of a cured spar to a cured skin panel via an adhesive layer 284 (FIG. 20). In a still further example, bonding may comprise co-curing an uncured spar with an uncured skin panel.

The bondline 282 (e.g., the adhesive layer 284) between the skin panels and the spar outer flanges 160 may be terminated at a distance of no more than 0.50 inch from the spar terminal end 156, similar to the above-described arrangement shown in FIG. 21. The termination of the bondline 282 at a spaced distance from the spar terminal end 156 may result in a flange-skin gap 286 (e.g., FIG. 27) which may be filled with a non-adhesive gap filler 288 (e.g., fiberglass). By terminating each bondline 282 at a distance from the tip of the spar terminal end 156, high shear stresses 290 (FIG. 21) in the bondline 282 due to wing bending may be directed away from the spar terminal ends 156, which may mitigate or eliminate the initiation of cracks in the bondline 282 that may otherwise propagate along the length of the spar outer flanges 160.

Referring still to FIG. 27, shown is an example of a padup region 200 that may be included with the center wing lower skin panel 192 at the wing joint 172 for the spar terminal end 156 of the center wing rear spar 154. A similar padup region 200 may be included with the center wing upper skin panel 190, the outer wing upper skin panel 240, and the outer wing lower skin panels 242 for the spar terminal ends 156 of the front spars and rear spars of the center wing structure 150 and outer wing structure 210. The padup regions 200 for the spar terminal ends 156 may be configured similar to the above-described padup regions 200 for the center wing stringers 270 (and optional outer wing stringers 272). For example, each padup region 200 may include a ramp region 202 within which the panel thickness 194 of the skin panel locally increases along the spanwise direction toward the full thickness at the padup region 200. The spar outer flanges 160 have a flange thickness 164 that may decrease with the increase in panel thickness 194 within the ramp region 202 such that a combined thickness of the skin panel and the spar outer flange 160 is constant within the ramp region 202.

Referring still to FIG. 27, each padup region 200 is preferably at full thickness at least within the width of the rib outer flanges 178 respectively of the center wing stout rib 170 and the outer wing stout rib 232 (not shown). The increase in panel thickness 194 within the ramp region 202 and the corresponding decrease in flange thickness 164 of the spar outer flanges 160 may facilitate the transfer of bending loads from the outer wing structure 210 to the center wing structure 150 at the wing joint 172. Each padup region 200 causes the skin panel to carry a greater portion of the load otherwise carried by the spar at the spar terminal end 156, and which thereby reduces the magnitude of the shear force in the adhesive layer 284 that can otherwise result in crack initiation in the adhesive layer 284, as mentioned above.

Referring to FIGS. 28-29, shown is an example of an outer wing structure 210. As described above, the outer wing structure 210 includes an outer wing front spar 212, and outer wing rear spar 214, a plurality of outer wing ribs 234 including an outer wing stout rib 232, and an outer wing upper skin panel 240 and outer wing lower skin panel 242. The above-mentioned components (i.e., spars, wing ribs, skin panels) of the outer wing structure 210 may define the walls of one or more fuel tanks 128. In the example shown, the fuel tanks 128 in the outer wing structure 210 include a main tank 130 and a vent tank 132 located outboard of the main tank 130.

As mentioned above, the panel thickness 194 (FIG. 27) of the acreage plies 302 (FIG. 27) of the outer wing upper skin panel 240 and outer wing lower skin panel 242 may be substantially constant which may simplify manufacturing by eliminating ply drops 264 in the acreage plies 302. In addition, the panel thickness 194 of the outer wing upper skin panel 240 and outer wing lower skin panel 242 may be significantly thinner than the panel thickness 194 of the center wing upper skin panel 190 and/or center wing lower skin panel 192. The relatively thin gauge of the outer wing upper skin panel 240 and outer wing lower skin panel 242 may improve the fatigue loading performance of the skin panels relative to conventional aluminum skin panels. As described in greater detail below, the outer wing upper skin panel 240 and/or the outer wing lower skin panel 242 may be stiffened by a plurality of outer wing stringers 272 and/or by a plurality of 0-degree ply strips 252 (e.g., FIGS. 40-43) interleaved within the acreage plies 302.

Referring to FIGS. 30-32, shown are sectional views of an example of an outer wing structure 210, illustrating an outer wing rib 234 and a plurality of outer wing stringers 272 coupled to the outer wing upper skin panel 240 and the outer wing lower skin panel 242. The outer wing rib 234 extends between the outer wing front spar to 12 and the outer wing rear spar 214, and may include rib cutouts 268 to allow passage of the outer wing stringers 272 which may extend in a spanwise direction from the outer wing stout rib 232 (FIGS. 28-29). The outer wing stringers 272 may extend no further outboard than the tank outboard end 134 (FIGS. 20-29) of the outermost fuel tank 128 (i.e., the vent tank 132) due to a reduced stiffness requirement for the portion of the outer wing outboard of the vent tank 132 due to reduced inertial loads outboard of the fuel tank 128. However, in an example not shown, the outer wing structure 210 may be devoid of outer wing stringers 272, and the outer wing upper skin panel 240 and the outer wing lower skin panel 242 may each have a panel thickness 194 that is configured to provide the required bending stiffness for the outer wing structure 210. In still further examples, the outer wing upper skin panel 240 and/or the outer wing lower skin panel 242 may include only 0-degree strip sets 250, and no outer wing stringers 272.

Referring to FIGS. 33-35, shown is a chordwise sectional view of the outer wing structure showing an outer wing rib 234 at the tank outboard end 134 (FIGS. 28-29) of the outermost fuel tank 128 (e.g., vent tank 132). Also shown are optional outer wing stringers 272 which may terminate at the outer wing rib 234 at the tank outboard end 134. FIG. 34-35 show localized padup regions 200 for each outer wing stringer 272 at the outer wing rib 234 at the tank outboard end 134. Also shown are localized padup regions 200 for the outer wing front spar to 12 and outer wing rear spar 214 at the outer wing rib 234.

Referring to FIGS. 36-37, shown is a spanwise sectional view of a portion of the outer wing structure 210 at the tank outboard end 134. As can be seen, the outer wing rib 234 at the tank outboard end 134 may have a larger cross-sectional area (e.g., a thicker rib outer flange 178 and/or a thicker rib web 184) than the remaining outer wing ribs 234 to provide a higher strength capability to facilitate the transfer of bending loads between the outer wing rib 234 (e.g., at the outboard tank end) and the outer wing stringers 272.

As shown in FIG. 37, the outer wing lower skin panel 242 (and outer wing upper skin panel 240) may include a localized padup region 200 for each stringer runout 280 at the outer wing rib 234 at the tank outboard end 134. The padup region 200 shown in FIG. 37 may be configured similar to the above-described padup region 200 for each center wing stringer 270 shown in FIG. 20. In this regard, the termination of the outer wing stringers 272 at the tank outboard end 134 may be similar to the above-described termination of the center wing stringers 270 at the center wing stout rib 170 (FIG. 20). For example, the stringer runout 280 of each outer wing stringer 272 at the tank outboard end 134 may include a gradually reducing stringer web 278 height as a means for gradually reducing the stiffness of the outer wing stringer 272 to reduce or avoid high peel forces that may otherwise occur in the bondline 282 between the stringer flange 276 and the skin panel at the stringer terminal end.

In addition, the stringer flange 276 for each outer wing stringer 272 may include a gradually decreasing flange thickness 164 complementary to the gradually increasing panel thickness 194 in the ramp region 202. Similar to the above-described arrangement shown in FIG. 21, the bondline 282 (e.g., the adhesive layer 284) between the skin panels and the spar outer flanges 160 in FIG. 37 may be terminated at a distance (e.g., no more than 0.50 inch) from the stringer terminal end, resulting in a flange-skin gap 286 that may be filled with a non-adhesive gap filler 288 (e.g., fiberglass). As described above, the flange-skin gap 286 may minimize creep or shear stresses 290 (FIG. 21) in the bondline 282 between the outer wing stringer 272 and the skin panel, which may mitigate or eliminate the initiation of cracks in the bondline 282 that may otherwise propagate along the length of the outer wing stringer 272.

Figure 38:
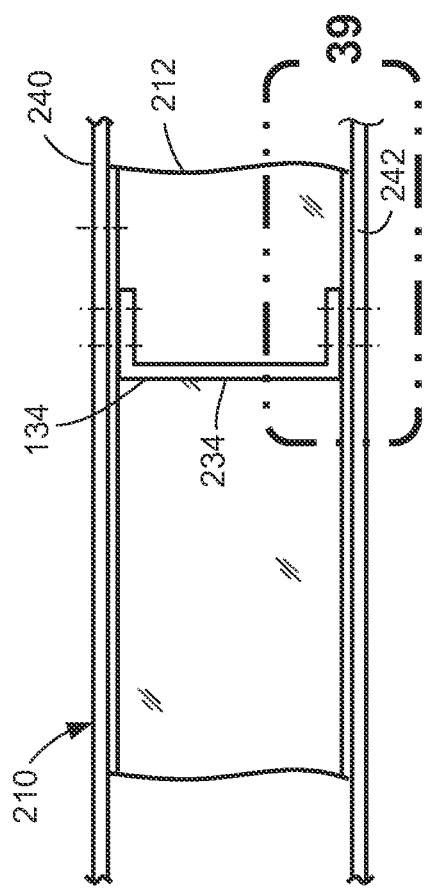
FIG. 38 is a sectional view taken along line 38-38 of FIG. 34 and illustrating the outer wing front spar extending past the outer wing rib located proximate the tank outboard end of a fuel tank of the wing assembly.
Figure 39:
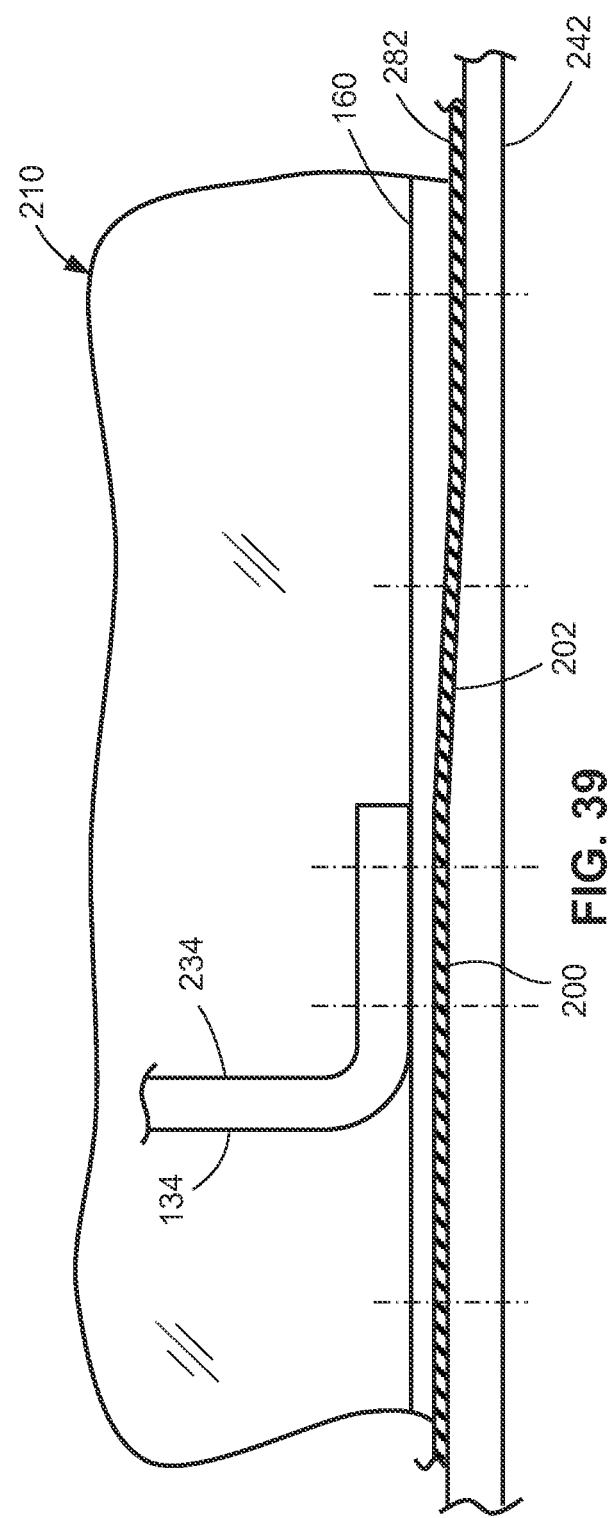
FIG. 39 is a magnified view of the portion of the outer wing structure identified by reference numeral 39 of FIG. 38 and illustrating a localized padup region in the outer wing lower skin panel at the location of the outer wing rib located proximate the tank outboard end.

Referring to FIGS. 38-39, shown is a sectional view of a portion of the outer wing structure 210 illustrating the outer wing front spar 212 at the outer wing rib 234 at the tank outboard end 134. FIG. 39 shows a padup region 200 and ramp region 202 in the outer wing lower skin panel 242 at the chordwise location of the outer wing front spar 212 at the tank outboard end 134. The padup region 200 underneath the spar outer flanges 160 may extend continuously (i.e., at a constant thickness) along the spanwise direction from the outer wing rib 234 at the tank outboard end 134 to the wing tip 126. A similar padup region 200 may be included in the outer wing upper skin panel 240. The outer wing structure 210 may include padup regions 200 in the outer wing upper and lower skin panel 240, 242 for the outer wing rear spar 214 at the outer wing rib 234 located at the tank outboard end 134. The flange thickness 164 of the spar outer flange 160 may decrease its in correspondence with the increase in panel thickness 194 of the skin panel within the ramp region 202 in a manner similar to the above-described arrangement shown in FIGS. 20 and 37. The bondline 282 between the spar outer flanges 160 and the skin panels may be continuous along the length of the outer wing front spar 212 (and outer wing rear spar 214).

Referring to FIGS. 40-43, shown is a sectional view of the outer wing structure 210 showing an example of 0-degree strip sets 250 incorporated into the outer wing upper skin panel 240 and/or the outer wing lower skin panel 242. Each of the 0-degree strip sets 250 extends in a spanwise direction. Each of the 0-degree strip sets 250 includes one or more 0-degree ply strips 252 interleaved within the acreage plies 302. Each of the 0-degree ply strips 252 comprises a relatively narrow strip of a 0-degree ply. The fibers in each of the 0-degree ply strips 252 are aligned with the spanwise direction. In some examples, one or more of the 0-degree strip sets 250 may extend continuously from the outer wing stout rib 232 (FIG. 29) to the wing tip 126 (FIG. 29). In other examples, one or more of the 0-degree strip sets 250 may extend from the outer wing stout rib 232 to the tank outboard end 134, or to a spanwise location beyond the tank outboard end. For example, as shown in FIGS. 28-29, the two outermost outer wing bays 236 of the outer wing structure 210 may be devoid of 0-degree strip sets 250 due to a relatively low stiffness requirement for the outermost outer wing bays 236.

Figure 40:
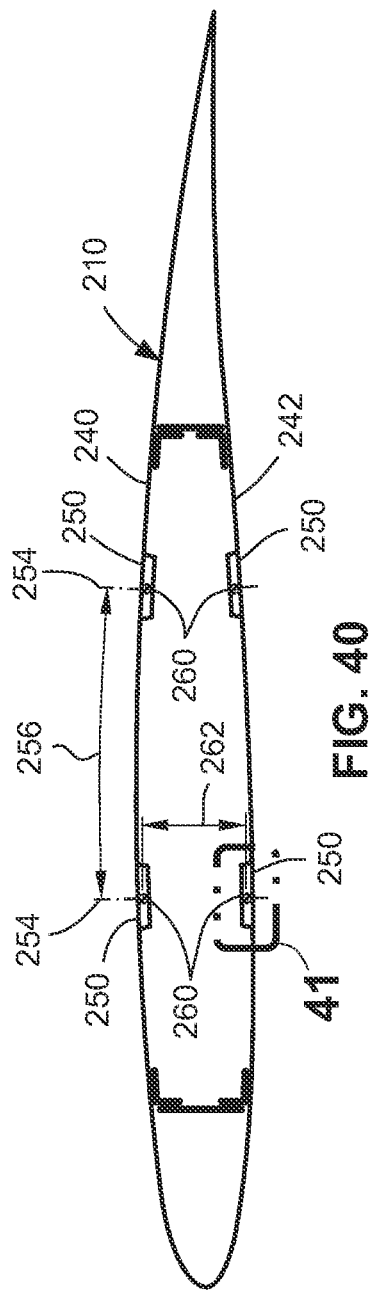
FIG. 40 is a sectional view taken along line 40-40 of FIG. 29 and illustrating the outer wing upper skin panel and the outer wing lower skin panel each having one or more 0-degree strip sets each extending in a spanwise direction for stiffening the skin panels.

Referring to FIGS. 28 and 40, each 0-degree strip set 250 has a strip centerline 254 (FIG. 28) extending along a lengthwise direction of the 0-degree strip set 250. The 0-degree strip sets 250 are spaced apart from each other such that the strip centerlines 254 of adjacent 0-degree strip sets 250 are at a chordwise spacing 256 of 6-11 inches between strip centerlines 254 and, more perfectly, at a chordwise spacing 256 of 8-10 inches between strip centerlines 254. The chordwise spacing 256 between the 0-degree strip sets 250 of a skin panel are preferably uniform as a means to maintain a uniform chordwise mass distribution of the outer wing structure 210.

Figure 41:
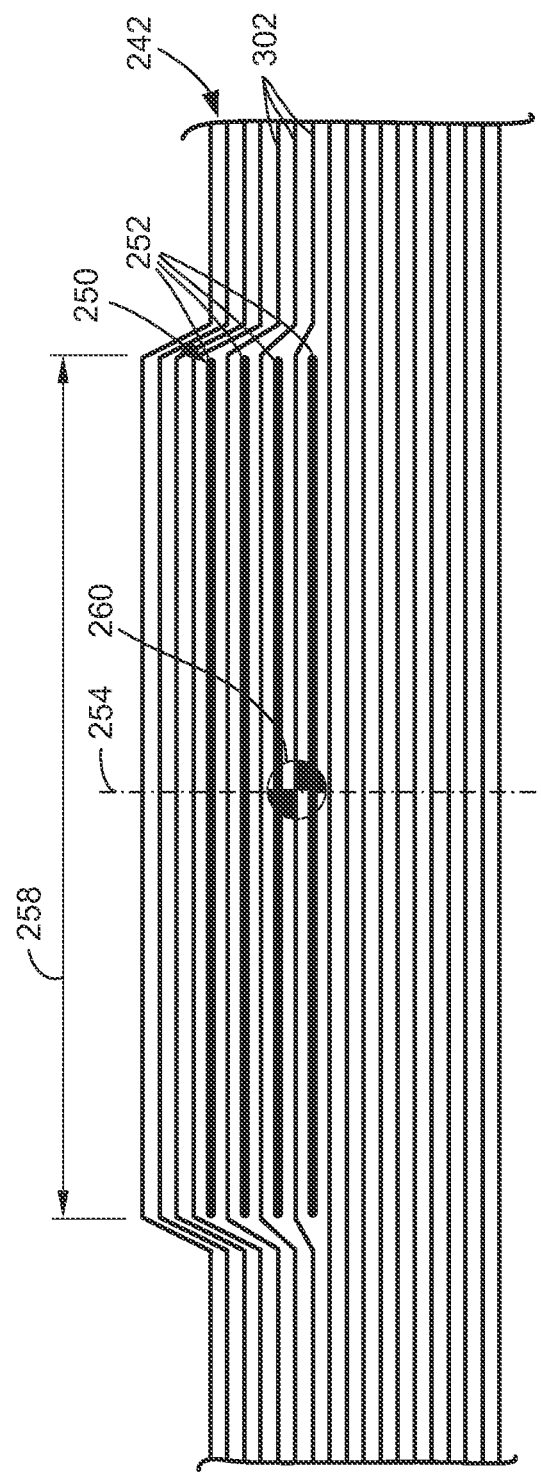
FIG. 41 is a magnified view of a portion of the outer wing lower skin panel identified by reference numeral 41 of FIG. 40 and illustrating an example of a 0-degree strip set containing 0-degree ply strips interleaved within the acreage plies that make up the outer wing lower skin panel.

Referring to FIGS. 41-42, shown are examples of a 0-degree strip set 250 incorporated into the outer wing lower skin panel 242. As mentioned above, each 0-degree strip set 250 comprises one or more 0-degree ply strips 252 interleaved within the acreage plies 302 of a skin panel. FIG. 41 shows an example of a 0-degree strip set 250 having four 0-degree ply strips 252 interleaved within the acreage plies 302. However, a 0-degree strip set 250 may include any number of 0-degree ply strips 252. For example, a 0-degree strip set 250 may include from 1 to 70 of the 0-degree ply strips 252. The number of 0-degree ply strips 252 in a 0-degree strip set 250 may dictated by the stiffness requirements at the spanwise location.

To avoid or reduce the risk of a ply-splitting failure mode in the outer wing upper skin panel 240 or in the outer wing lower skin panel 242, one or more of the 0-degree ply strips 252 of a 0-degree strip set 250 are preferably positioned between a pair of the acreage plies 302. However, to prevent resin cracking, no more than four 0-degree ply strips 252 are stacked on top of each other. Although none of the 0-degree ply strips 252 define the inner surface of a skin panel, the 0-degree ply strips 252 may be biased toward the inner surface of each skin panels.

Referring to FIGS. 40-42, each 0-degree ply strip 252 may have a strip width 258 that ranges from 3-8 inches and, more preferably, from 5-6 inches. However, a 0-degree ply strip 252 may have a strip width 258 of less than 3 inches or greater than 8 inches. FIG. 41 shows an example of a 0-degree strip set 250 in which all of the 0-degree ply strips 252 have the same strip width 258, which may simplify manufacturing. As mentioned above, the 0-degree ply strips 252 may be biased toward the inner surface of a skin panel, and which may result in an increase in the effective wing thickness 262 (FIG. 40) between the area centroids of the 0-degree strip sets 250 relative to the effective wing thickness of a conventional wing that utilizes conventional stringers (e.g., hat-section stiffeners) for stiffening the skin panels.

FIG. 42 shows an example of a 0-degree strip set 250 in which the 0-degree ply strips 252 have different strip widths 258, with the widest 0-degree ply strips 252 being located within the interior (i.e., approximate midplane) of the skin panel, and the 0-degree ply strips 252 that are narrower in width being located proximate the inner surface of the skin panel. The arrangement of the 0-degree strip set 250 in FIG. 42 may result in improved strength or stiffness characteristics with a slight increase in manufacturing complexity. Although not shown, the outer wing upper skin panel 240 may include one or more 0-degree strip sets 250 configured similar to the above-described arrangement of 0-degree strip sets 250 of the outer wing lower skin panel 242. As may be appreciated, the 0-degree strip sets 250 may be provided in any one of a variety of different cross-sectional configurations, geometries, and widths, and are not limited to the example shown in FIGS. 41-42.

Referring to FIG. 43, shown is an example of a 0-degree strip set 250 in the outer wing lower skin panel 242. The 0-degree strip set 250 includes ply drops 264 of the 0-degree ply strips 252 to accommodate different bending stiffness requirements at different spanwise locations of the outer wing lower skin panel 242. Although not shown, the outer wing upper skin panel 240 may also include one or more 0-degree strip sets 250 having ply drops 264. As shown in FIG. 43, the ply drops 264 are exclusively in the 0-degree ply strips 252, while the acreage plies 302 are continuous (no ply drops), which simplifies manufacturing. Although FIG. 43 shows ply drops 264 in the 0-degree ply strips 252, an outer wing structure 210 may include one or more 0-degree strip set 250 without any ply drops 264 in the 0-degree ply strips 252.

The configuration of the 0-degree strip sets 250 in the outer wing upper skin panel 240 may be different than in the outer wing lower skin panel 242 to accommodate different design criteria and loading conditions. For example, in the outer wing upper skin panel 240, the 0-degree strip sets 250 may be interleaved for the purpose of stabilizing the outer wing upper skin panel 240 under maximum bending load which places the outer wing upper skin panel 240 in compression. In contrast, in the outer wing lower skin panel 242, the 0-degree strip sets 250 may be interleaved for the purpose of preventing panel splitting under tension during wing bending. As a result, the spanwise length, chordwise spacing 256, strip width 258, and/or strip quantity may be larger for the 0-degree strip sets 250 in the outer wing upper skin panel 240 relative to the spanwise length, chordwise spacing 256, strip width 258, and/or ply strip quantity in the 0-degree strip sets 250 in the outer wing lower skin panel 242.

Figure 44:
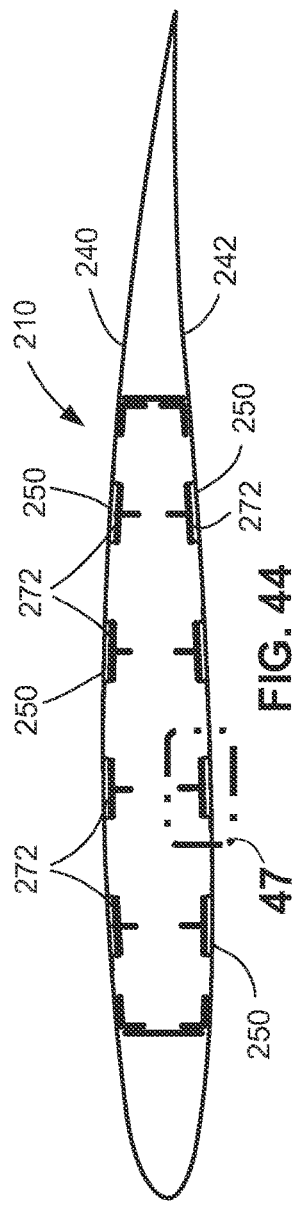
FIG. 44 is a sectional view taken along line 44-44 of FIG. 29 and illustrating an example of 0-degree ply strips interleaved within the outer wing lower skin panel at the chordwise location directly below the outer wing stringers.
Figure 45:
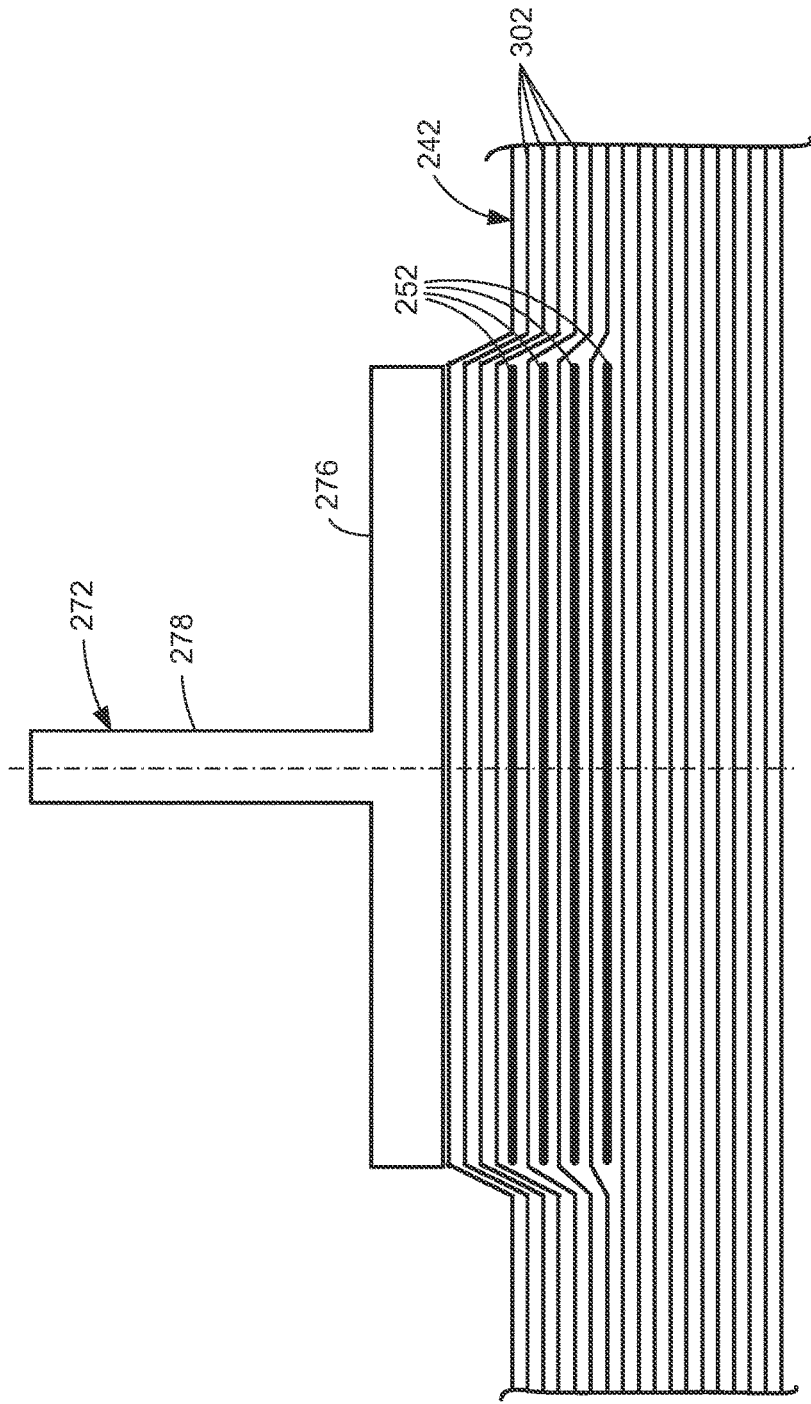
FIG. 45 is a magnified view of the portion of the outer wing lower skin panel identified by reference numeral 45 of FIG. 44 and illustrating an outer wing stringer positioned directly over a 0-degree ply strips interleaved within the acreage plies of the outer wing lower skin panel.

Referring to FIGS. 44-45, shown is a sectional view of an example of an outer wing structure 210 in the outer wing upper and lower skin panels 240, 242 each have outer wing stringers 272 mounted over a corresponding quantity of 0-degree strip sets 250. As mentioned above, in one example, the outer wing stringers 272 may extend from the outer wing stout rib 232 to the outer wing rib 234 defining the tank outboard end 134 of the outermost fuel tank 128 in the outer wing structure 210. The 0-degree strip sets 250 may also extend from the outer wing stout rib 232, and may extend beyond the tank outboard end 134 toward the wing tip 126. The outer wing stringers 272 may be more flexible in the spanwise direction than the center wing stringers 270. In this regard, the stringer webs and/or stringer flanges of the center wing stringers 270 may be larger or thicker than the stringer webs and/or stringer flanges of the outer wing stringers 272 to enable the center wing structure 150 to accommodate the larger static loads and higher stiffness requirements of the center wing structure 150 relative to the more moderately loaded and more flexible outer wing structure 210.

FIG. 46 is a flowchart of a method 500 of manufacturing a wing assembly 120. Step 502 of the method 500 includes coupling an outer wing inboard end 230 of each one of a pair of outer wing structures 210 respectively to opposing center wing outboard ends 168 of a center wing structure 150 to define a pair of wing joints 172 coupling the outer wing structures 210 to the center wing structure 150. As described above, the center wing structure 150 has an engine mounting location on each of opposing sides of a wing centerline 124. The spar terminal ends 156 of the center wing front spar 152 and the center wing rear spar 154 at each wing joint 172 are located no further inboard than an engine centerline 106 associated with the engine mounting location, and no further outboard of the engine centerline 106 than ten percent of a distance between the engine centerline 106 and the wing centerline 124.

Step 502 of coupling each outer wing structure 210 to the center wing structure 150 may include coupling an outer wing stout rib 232 on the outer wing inboard end 230 of the outer wing structure 210, to a center wing stout rib 170 on the center wing outboard end 168 of the center wing structure 150 such that the outer wing stout rib 232 and the center wing stout rib 170 are in back-to-back arrangement. The rib webs 184 of the center wing stout rib 170 and outer wing stout rib 232 may be placed in direct physical contact with each other. Mechanical fasteners 298 may be installed in fastener holes in the rib webs 184 of the center wing stout rib 170 and outer wing stout rib 232 for securing the rib webs 184 together.

Step 502 of coupling each outer wing structure 210 to the center wing structure 150 may also include coupling, using a front spar splice plate 216, the spar terminal end 156 of the center wing front spar 152 to the spar terminal end 156 of the outer wing front spar 212 via mechanical fasteners 298. In addition, the method 500 may include coupling, using a rear spar splice plate 218, the spar terminal end 156 of the center wing rear spar 154 to the spar terminal end 156 of the outer wing rear spar 214 via mechanical fasteners 298. As described above, each spar splice plate may have a channel-shaped cross section that may be nested inside a channel-shaped cross section of the front spar and the rear spar. Mechanical fasteners 298 may be installed in fastener holes extending through the splice web 220 of each splice plate and through the spar webs 166 of the center wing spar and outer wing spar. Mechanical fasteners 298 may also be installed in fastener holes extending through the skin panels, the spar outer flanges 160, and the splice outer flanges 222 for securing the outer wing spar to the center wing spar.

The method 500 may further include manufacturing the center wing structure 150, which may include laying up a plurality of acreage plies 302 to result in the center wing upper skin panel 190 and/or center wing lower skin panel 192. As described above, the acreage plies 302 may comprise unidirectional plies 306 including 0-degree plies, +45-degree plies, −45-degree plies, 90-degree plies, and no fabric plies 304. The acreage plies 302 may be laid up such that the panel thickness 194 is substantially constant between the center wing front spar 152 and center wing rear spar 154, and along a spanwise direction at least from the fuselage 102 side to the center wing stout rib 170. The method 500 may additionally include coupling the center wing upper skin panel 190 and the center wing lower skin panel 192 to the center wing front spar 152, the center wing rear spar 154, and the center wing ribs 174.

The method 500 may further include manufacturing each outer wing structure 210. The manufacturing of each outer wing structure 210 may include laying up a plurality of acreage plies 302 to result in the outer wing upper skin panel 240 and/or outer wing lower skin panel 242 in a manner similar to the laying up of the center wing upper skin panel 190 and center wing lower skin panel 192. For example, the acreage plies 302 may be laid up such that the panel thickness 194 is constant between the outer wing front spar 212 and the outer wing rear spar 214, and along a spanwise direction from the outer wing stout rib 232 to the wing tip 126.

The method 500 may additionally include interleaving one or more 0-degree ply strips 252 of one or more 0-degree strip sets 250 within the acreage plies 302 of the outer wing upper skin panel 240 and/or outer wing lower skin panel 242 as a means for stiffening the outer wing structure 210, as described above. After completing the outer wing structure 210, the method 500 may include coupling the outer wing upper skin panel 240 and the outer wing lower skin panel 242 to the outer wing front spar 212, the outer wing rear spar 214, and the outer wing ribs 234.

The step of laying up the skin panels of the outer wing structure 210 or center wing structure 150 may include laying up one or more localized padup regions 200 on the inner surface of the skin panels. For example, in the center wing structure 150, padup regions 200 may be laid up on the skin panels at the location of the center wing stout rib 170 for accommodating the termination of the center wing stringers 270, and for accommodating the center wing front spar 152 and center wing rear spar 154 at the location of the center wing stout rib 170. In each outer wing structure 210, padup regions 200 may be laid up at the location of the initiation of each outer wing stringer 272 at the outer wing stout rib 232, and at the termination of each outer wing stringer 272 at the outer wing rib 234 located at the tank outboard end 134. The laying up of any one of the padup regions 200 may include a ramp region 202 on one or more sides of each padup region 200. In addition, the flange thickness 164 of the stringer flanges 276 and/or spar outer flanges 160 may be tapered in correspondence with the increase in panel thickness 194 within the ramp regions 202.

To minimize peel forces in the bondline 282 bonding the wing stringers to the skin panels, the method may include terminating the bondline 282 (e.g., adhesive layer 284) at a distance of no more than 0.50 inch from the stringer terminal end in a manner to create in a stringer-skin gap between the stringer flange 276 and the skin panel. The method 500 may further include filling the flange-skin gap 286 with a non-adhesive gap filler 288 (e.g., a layer of fiberglass) to prevent bonding between the stringer flange 276 and the skin panel at the stringer terminal end. A similar process may be performed at the spar terminal ends 156 at the wing joints 172.

The method 500 may further include manufacturing the wing ribs of the center wing structure 150 and/or outer wing structure 210 by laying up the wing ribs with a channel-shaped cross section having a rib web 184 and an opposing pair of rib outer flanges 178. As described above, the rib web 184 and the rib outer flanges 178 of each wing rib may be comprised of a stack of fabric plies 304. The method 500 may include interleaving one or more 0-degree plies into the fabric plies 304 of the rib outer flanges 178 for improving the shear strength of the rib outer flanges 178. The method 500 may additionally include manufacturing the front spar and/or rear spar of the center wing structure 150 and/or the outer wing structure 210 in a similar manner.

The step of manufacturing the wing ribs may include manufacturing each wing rib in a multi-piece configuration. For example, the method may include laying up a pair of rib chords 176 (i.e., an upper rib chord and a lower rib chord) each having an L-shaped configuration having a rib outer flange 178 and a rib inner flange 180 interconnected by a radius portion 182. The method may further include laying up a generally planar rib web 184. The method 500 may then include bonding (e.g., co-bonding) and/or mechanical fastening the rib outer flange 178 of the pair of rib chords 176 respectively to an upper skin panel and a lower skin panel of the center wing structure 150 or outer wing structure 210. The method 500 may then include positioning the upper skin panel (and rib chord) in relation to the lower skin panel (and rib chord) in an assembly fixture (not shown), and interconnecting the pair of rib chords 176 via the rib web 184 by coupling (e.g., via mechanical fasteners 298) the rib inner flange 180 of each rib chord 176 to the rib web 184.

The manufacturing of the front spar and forward/or rear spar of the center wing structure 150 and/or the outer wing structure 210 may include manufacturing each spar in a multi-piece configuration by laying up a pair of spar chords 158 (i.e., an upper spar chords and a lower spar chord) each having a spar outer flange 160 and a spar inner flange 162 interconnected by a radius portion 182. The method 500 may include laying up a generally planar spar web 166. In addition, the method may include bonding and/or mechanically fastening the spar outer flange 160 of the pair of spar chords 158 respectively to an upper skin panel and a lower skin panel of the center wing structure 150 or outer wing structure 210. The method 500 may further include positioning the upper skin panel (and spar chord) in relation to the lower skin panel (and spar chord) in an assembly fixture (not shown), and interconnecting the pair of spar chords 158 via the spar web 166 by extending mechanical fasteners 298 through the spar inner flanges 162 of each spar chord 158 into the spar web 166.

FIG. 47 is a flowchart of a method 550 of loading a wing assembly 120 having a pair of outer wing structures 210 coupled to a center wing structure 150. Step 552 of the method includes providing a wing assembly 120 having a pair of outer wing structures 210 each joined to a center wing structure 150. As described above, the center wing structure 150 includes a pair of center wing outboard ends 168 and a pair of engine mounting locations respectively on opposite sides of a wing centerline 124. In addition, the center wing structure 150 includes a center wing front spar 152 and a center wing rear spar 154 each having a spar terminal end 156 at each of the center wing outboard ends 168. The pair of outer wing structures 210 each include an outer wing front spar 212 and an outer wing rear spar 214 coupled respectively to the center wing front spar 152 and the center wing rear spar 154 to define a wing joint 172 coupling the outer wing structure 210 to the center wing structure 150. As described above, the spar terminal ends 156 of the center wing front spar 152 and the center wing rear spar 154 at each wing joint 172 are located no further inboard than an engine centerline 106 associated with the engine mounting location, and no further outboard of the engine centerline 106 than ten percent of a distance between the engine centerline 106 and the wing centerline 124.

The method 550 additionally includes step 554 of placing the wing assembly 120 in a ground static loading condition wherein the aircraft 100 may be substantially non-moving (e.g., parked at a gate of an airport) and/or may be under a ground static loading in which the wing assembly 120 is subjected to gravitational force due to the structural mass of the wing assembly 120. The method 550 additionally includes step 556 of placing the wing assembly 120 in a dynamic loading condition wherein the aircraft 100 may be in motion and the wing assembly 120 is subjected to one or more dynamic loads. For example, the aircraft 100 in motion may be subjected to gravitational force and inertial force due to the structural mass of the wing assembly 120, aerodynamic loads on the wing assembly 120 when aircraft 100 is in flight, and/or control surface loads on the wing assembly 120 as a result of in-flight deflection of one or more flight control surfaces such as ailerons, flaps, and/or other control surfaces.

Figure 52:
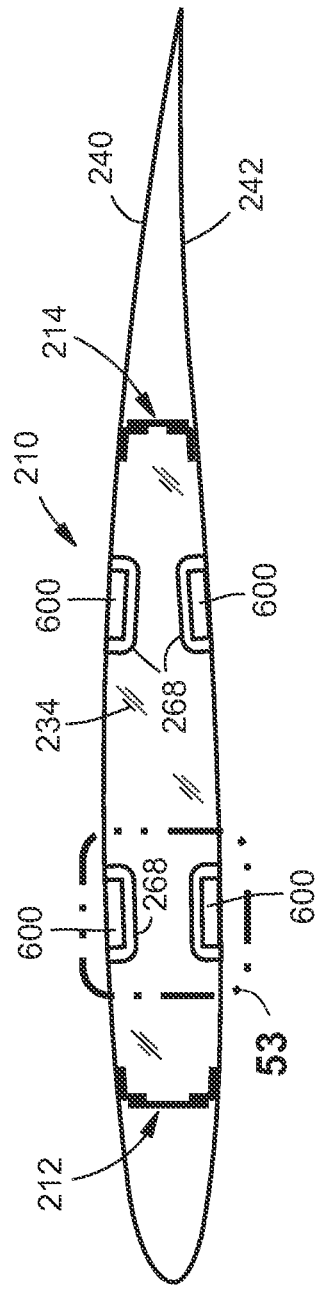
FIG. 52 is a sectional view taken along line 52-52 of FIG. 49 and illustrating an example of planks passing through rib cutouts formed in an outer wing rib.
Figure 53:
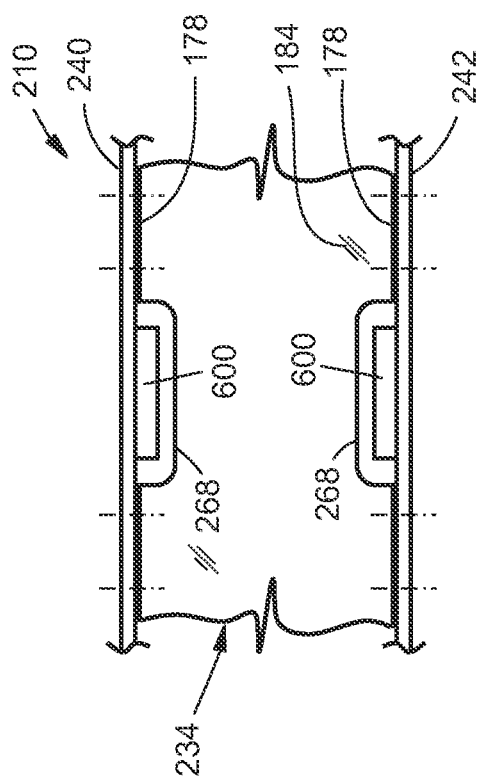
FIG. 53 is a magnified view of the portion of the outer wing structure identified by reference numeral 53 of FIG. 52 and illustrating the rib cutouts formed in the outer wing rib.
Figure 54:
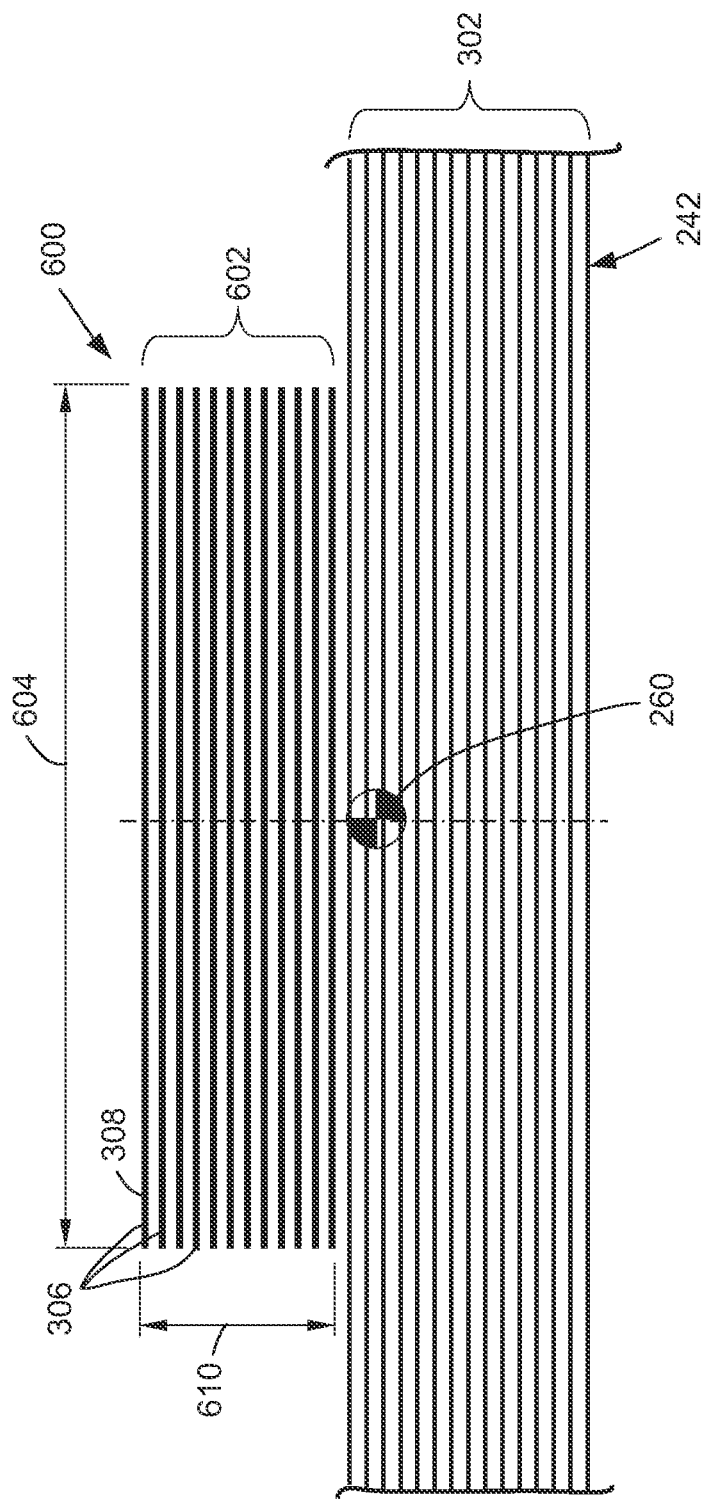
FIG. 54 is a magnified view of the portion of the outer wing structure identified by reference numeral 54 of FIG. 51 and illustrating an example of a plank comprised of a stack of plank plies of narrower width than the acreage plies of the outer wing upper and lower skin panel.

Referring now to FIGS. 48-58, shown is an example of an outer wing structure 210 in which the outer wing upper skin panel 240 and outer wing lower skin panel 242 are stiffened by discrete planks 600 as an alternative to the above-described 0-degree strip sets 250. As shown in FIGS. 54-55 and described below, each plank 600 is comprised of a stack of planks plies 602 that are of narrower width than the acreage plies 302 of the outer wing upper and lower skin panels 240, 242. With the exception of the planks 600, the outer wing structure 210 shown in FIGS. 48-56 is configured similar to the above-described outer wing structure 210 shown in FIGS. 28-39. For example, the outer wing structure 210 of FIGS. 48-56 includes an outer wing front spar 212 and an outer wing rear spar 214 configured to be coupled respectively to the center wing front spar 152 (FIG. 5) and the center wing rear spar 154 (FIG. 5) to define a wing joint 172 (FIG. 5) coupling the outer wing structure 210 to the center wing structure 150 (FIG. 5).

The wing joint 172 may include a front spar splice plate 216 (FIG. 5) and a rear spar splice plate 218 (FIG. 5) for respectively coupling the front and rear spars 212, 214 of the outer wing structure 210 to the front and rear spars 152, 154 of the center wing structure 150, as described above. In addition, the outer wing structure 210 includes an outer wing stout rib 232 for coupling to the center wing stout rib 170 as described above. The outer wing upper skin panel 240 and the outer wing lower skin panel 242 are each comprised of acreage plies 302 having a panel thickness that is constant along a spanwise direction, and which is coupled to the outer wing front spar 212, the outer wing rear spar 214, and the outer wing ribs 234. As described above, the acreage plies 302 of the outer wing upper skin panel 240 and the outer wing lower skin panel 242 include 0-degree plies and 90-degree plies. In some examples, the ratio of 0-degree plies to 90-degree plies is between 1.75 and 2.5.

As shown in FIGS. 50-51, a plurality of planks 600 are bonded to the inner surface of the outer wing upper and lower skin panel 240, 242. The planks 600 extend in a spanwise direction. For example, each plank 600 may extend from the outer wing stout rib 232 (FIGS. 48-49) toward the wing tip 126 (FIGS. 48-49). The planks 600 may extend extending continuously across one or more outer wing bays 236 (FIGS. 48-49). For examples of the outer wing structure 210 that have a fuel tank 128, the planks 600 may terminate at the tank outboard end 134 (FIG. 49). In this regard, the outer wing structure 210 may be devoid of planks 600 outboard of the fuel tank 128.

As shown in FIGS. 48-50, each plank 600 has a plank centerline 612 extending along a lengthwise direction of the plank 600. The planks 600 may be spaced apart from each other at a chordwise spacing 256 of from 6-11 inches between plank centerlines 612. More preferably, the planks 600 may be separated at a chordwise spacing 256 of 8-10 inches. Similar to the chordwise spacing 256 between the 0-degree strip sets 250 (FIG. 40), the chordwise spacing 256 between the planks 600 may be uniform to maintain a substantially uniform chordwise mass distribution in the outer wing structure 210. The planks 600 in the outer wing structure 210 may be aligned respectively with the center wing stringers 270 (FIG. 5) of the center wing structure 150 (FIG. 5). However, in other examples, the planks 600 in the outer wing structure 210 may be non-aligned with the center wing stringers 270.

Referring to FIG. 51, the planks 600 each have a relatively low-profile or relatively small plank thickness 610 (FIG. 54) which results in the planks 600 and associated skin panel (i.e., the plank-skin panel assembly 616) having a combined area centroid 260 that is nearer to the skin panel 240, 242 inner surface than the combined area centroid of conventional stringers (e.g., hat-section stringers—not shown) and associated skin panel 240, 242. Although the plank-skin area centroid 260 of a plank-skin panel assembly 616 is based on the cross-sectional area of all of the planks 600 (on a skin panel) combined with the cross-sectional area of the skin panel 240, 242 between the front spar and rear spar 212, 214, in FIG. 51 for purposes of the present discussion, the plank-skin area centroid 260 of each plank-skin panel assembly 616 is represented by the plank-skin portion cross-sectional area 620, which includes the cross-sectional area of a single plank 600 (i.e., the cross-hatched portion) combined with the cross-sectional area of a skin panel portion 614 of the skin panel 240, 242 extending outwardly from each side of the cross-hatched plank 600. The width of the skin panel portion 614 extends between the midpoints 622 respectively located between the cross-hatched plank 600 and the planks 600 on immediately opposite sides of the cross-hatched plank 600. The result of the plank-skin area centroid 260 being near the inner surface of the skin panel 240, 242 is a larger effective wing thickness 262 than the effective wing thickness of a wing structure that uses conventional stringers for stiffening the skin panels. A larger effective wing thickness 262 translates to an increase in the bending load-carrying efficiency of the outer wing structure 210. The increased bending load-carrying efficiency corresponds to a reduction in structural mass of the outer wing structure 210.

Referring to FIG. 51, each of the planks 600 may be configured to have a plank bending stiffness (i.e., in the spanwise direction) that is less than a combined plank-skin portion bending stiffness (i.e., in the spanwise direction) of the plank 600 and the skin panel portion 614 (i.e., of the upper or lower skin panel 240, 242) that is directly attached to and supported by the plank 600. Toward this end, each plank 600 may have a plank bending stiffness that is approximately 40-60 percent of the combined plank-skin portion bending stiffness. More preferably, the plank bending stiffness of each plank 600 is approximately 45-55 percent of the combined plank-skin portion bending stiffness. The plank bending stiffness may be the bending stiffness of the plank 600 at a spanwise location of maximum plank thickness 610 (i.e., providing maximum plank stiffness). However, the plank bending stiffness of a plank 600 may be measured at any spanwise location along the plank 600. The combined plank-skin portion bending stiffness is the combined stiffness of the plank 600 and the associated skin panel portion 614 as measured at the same spanwise location as where the plank bending stiffness is measured.

Maintaining the plank bending stiffness at between 40-60 percent of the combined plank-skin portion bending stiffness limits the magnitude of peel-off forces in the bondline (not shown) between the planks 600 and the skin panel 240, 242 to a level that prevents separation of the perimeter edges of the planks 600 from the inner surface of the skin panel 240, 242, while also preventing buckling of the unsupported segment of the skin panel 240, 242 between adjacent pairs of planks 600 when the outer wing structure 210 is at limit load (i.e., the maximum load expected during service). The chordwise spacing 256 (FIG. 51) between the planks 600 may be set at a distance such that buckling in the unsupported segment of the skin panel 240, 242 between adjacent planks 600 occurs at or above limit load.

Referring still to FIG. 51, as mentioned above, each plank 600 may have a plank bending stiffness that is approximately 40-60 percent of the combined plank-skin portion bending stiffness. As noted above, the cross-sectional area of one of the planks 600 and associated skin panel portion 614 is represented by the cross-hatched area in the upper skin panel and lower skin panel 240, 242 in FIG. 51, and identified as the plank-skin portion cross-sectional area 620. For planks 600 that are located between a pair of planks 600, the skin panel portion 614 has a panel portion width 618 that extends between midpoints 622 respectively located on opposite sides of the plank 600. Each midpoint 622 is located midway between the edges of adjacent planks 600, as shown in the upper skin panel 240 of FIG. 51. For planks 600 that are located between a spar (e.g., the outer wing front spar 212 or the outer wing rear spar 214) and another plank 600, the panel portion width 618 extends between the side edge of the spar outer flange 160 on one side of the plank 600 and, on an opposite side of the plank 600, the midpoint 622 between the edges of the adjacent planks 600, as shown in the lower skin panel 242 of FIG. 51. In each example, the panel portion width 618 of the skin panel portion 614 is centered on the plank 600.

The magnitude of the bending stiffness of a skin panel portion 614 may be dictated at least in part by the ply composition, ply quantity, and ply stacking sequence of the composite plies 300 that make up the skin panel 240, 242, and by the plank-skin portion cross-sectional area 620, which may be a function of the panel thickness 194 and the panel portion width 618 and/or chordwise spacing 256 (FIG. 48). Similarly, the magnitude of the plank bending stiffness of a plank 600 may be dictated at least in part by the ply composition, ply quantity, and ply stacking sequence of the planks plies 602 that make up the plank 600, and also by the size (e.g., plank width 604, plank thickness 610) of the plank 600.

As mentioned above, the planks 600 and the upper and lower skin panels 240, 242 may be configured to provide the outer wing structure 210 with a reduced amount of bending stiffness compared to an increased amount of bending stiffness of the center wing structure 150. The higher flexibility of the outer wing structure 210 may accommodate aeroelasticity performance requirements of the outer wing structure 210. Furthermore, the increased flexibility of the outer wing structure 210 allows for a lighter weight wing assembly 120.

Referring to FIGS. 52-53, shown is a sectional view of the outer wing structure 210 showing an outer wing rib 234. The outer wing ribs 234 may have rib cutouts 268 in the rib web 184 and/or rib outer flange 178 to provide clearance for the planks 600 to pass through the outer wing ribs 234. Alternatively, the rib outer flanges 178 of the outer wing ribs 234 may be locally contoured (not shown) to match the cross-sectional contour of each plank 600. As described above, the outer wing rib 234 may be mechanically fastened and/or bonded to the outer wing upper and lower skin panels 240, 242 and/or to the outer wing front spar 212 and outer wing rear spar 214.

Referring to FIGS. 54-55, shown is a cross-sectional view of an example of a plank 600 bonded to the outer wing lower skin panel 242. As described below, each plank 600 may be laid up and secondary bonded to the inner surface of the skin panel 240, 242. Alternatively, the planks 600 may be co-bonded or co-cured with the skin panel 240, 242. Each plank 600 may be comprised of 1-70 planks plies 602 and, more preferably, each plank 600 may comprise 10-70 planks plies 602, and which define the plank thickness 610. The maximum number of planks plies 602 in a plank 600 may be dictated by the above-described 40-60 percent bending stiffness ratio of the plank bending stiffness to the combined plank-skin portion bending stiffness. The planks plies 602 may be unidirectional plies 306, which may include a combination of 0-degree plies and non-0-degree plies. Preferably, the 0-degree plies comprise the largest percentage of the planks plies 602 in each plank 600. The non-0-degree plies may include 90-degree plies, +45-degree plies, −45-degree plies, or other ply orientations. The 0-degree plies have fibers oriented parallel to a lengthwise direction of the plank 600.

Each one of the planks 600 may have a plank width 604 of between 3-6 inches. More preferably, each plank 600 may have a plank width 604 of between 4-5 inches. However, a plank 600 may have a plank width 604 of less than 3 inches or greater than 6 inches. In the example of FIG. 54, the planks plies 602 within the plank 600 have the same plank width 604, resulting in a rectangular cross-sectional shape for the plank 600. However, the planks plies 602 in a plank 600 may have different plank widths 604 and which may result in a non-rectangular cross-sectional shape. For example, a plank 600 may have a trapezoidal cross-sectional shape as shown in FIG. 55. In such an arrangement, each plank 600 may have opposing plank side edges 606 that are tapered at an edge taper angle 608. In some examples, the edge taper angle 608 may be no greater than 30 degrees relative to the inner surface of the skin panel 240, 242.

Referring to FIG. 56, shown is a spanwise sectional view of the outer wing structure 210 illustrating an example of ply drops 264 in the planks plies 602 of a plank 600. As mentioned above, each plank 600 has a plank thickness 610 (FIG. 54). In the example shown, the plank thickness 610 of one or more of the planks 600 in the outer wing structure 210 may be tapered in the spanwise direction as a means for gradually reducing the plank stiffness in the spanwise direction. Toward this end, the planks 600 in the outer wing structure 210 may include a ply drop 264 in one or more of the planks plies 602. The spanwise locations of the ply drops 264 may be selected according to a desired bending stiffness profile of the skin panel 240, 242 along the spanwise direction, and may be based on a predicted aerodynamic wing loading on the outer wing structure 210 during flight. Alternatively, an outer wing structure 210 may be configured such that the planks 600 have a plank thickness 610 that is constant along the lengthwise direction of the plank 600. Preferably, the planks 600 within each outer wing structure 210 have the same configuration (e.g., same width, same cross-sectional shape, same ply stackup, and/or same material composition) to simplify manufacturing. In addition, each plank 600 within the outer wing structure 210 preferably has the same configuration as a means to maintain the chordwise mass distribution of the planks 600 to within 10 percent of each other.

FIG. 57 is a flowchart of a method 700 of manufacturing a wing assembly 120 having outer wing structures 210 as shown in the above-described FIGS. 48-56. The method 700 includes step 702 of bonding one or more planks 600 to an inner surface of at least one of an outer wing upper skin panel 240 and an outer wing lower skin panel 242 of the outer wing structure 210. As described above, each plank 600 extends in a spanwise direction and is comprised of a stack of planks plies 602. As also described above, the outer wing upper skin panel 240 and the outer wing lower skin panel 242 are each comprised of acreage plies 302 having a panel thickness that is constant along a spanwise direction. The planks plies 602 have a narrower width than the acreage plies 302.

The method 700 of manufacturing a wing assembly 120 having the above-described outer wing structure 210 shown in FIGS. 48-56 may include any one or more of the above-described steps of method 500 of manufacturing a wing assembly 120 having the outer wing structure 210 as shown in FIGS. 28-45, except that instead of interleaving 0-degree strip sets 250 into the skin panels 240, 242 of the outer wing structure 210 as shown in FIGS. 41-45, the method 700 involves bonding planks 600 to the skin panels 240, 242 of the outer wing structure 210 as shown in FIGS. 48-56.

Prior to bonding the planks 600 to the skin panels 240, 242, the method 700 may include laying up a plurality of 0-degree plies and non-0-degree plies to result in a plank 600. The 0-degree plies may comprise the largest percentage of the planks plies 602 in at least one of the planks 600. Each plank 600 may include between 1-70 planks plies 602 and, more preferably, between 10-70 planks plies 602, as described above. The method 700 may include laying up the planks plies 602 to result in at least some of the planks 600 having a plank width 604 of between 3-6 inches and, more preferably, between 4-5 inches. The method 700 may also include laying up the planks plies 602 to result in at least some of the planks 600 having a rectangular cross section as shown in FIG. 54, as described above.

However, in other examples, the method 700 may include laying up a planks plies 602 to result in at least some of the planks 600 having opposing plank side edges 606 oriented at an edge taper angle 608 of no greater than 30 degrees relative to the inner surface of the corresponding upper or lower skin panel 240, 242, and resulting in a trapezoidal cross section for the planks 600 as shown in FIG. 55. More preferably, the planks plies 602 may be laid up to form each plank side edge 606 at an edge taper angle 608 of between 15-30 degrees to minimize stress concentrations in the skin panels 240, 242 due to the plank side edges 606.

The method 700 may include positioning the planks 600 on each of the outer wing upper and lower skin panels 240, 242 at a chordwise spacing 256 of from 6-11 inches between plank centerlines 612. As described above, each plank 600 has a plank centerline 612 extending along a lengthwise direction of the plank 600. In some examples, the planks 600 may be positioned on the outer wing upper and lower skin panels 240, 242 such that the planks 600 are aligned respectively with the center wing stringers 270 of the center wing structure 150 when the outer wing structure 210 is coupled to the center wing structure 150. However, the planks 600 may be positioned such that the planks 600 are non-aligned with the center wing stringers 270.

The method 700 may further include laying up each plank 600 to have a plank bending stiffness that is approximately 40-60 percent of a combined plank-skin portion bending stiffness of the plank 600 and a skin panel portion, as described above with regard FIG. 51. More preferably, the planks 600 may be laid up to have a plank bending stiffness that is approximately 45-55 percent of the combined plank-skin portion bending stiffness. The method 700 may further comprise including at least one ply drop 264 in one or more of the planks plies 602 as shown in FIG. 56. As described above, including one or more ply drops 264 in the planks plies 602 may gradually reduce the plank bending stiffness in the spanwise direction. The spanwise locations of the ply drops 264 may be selected to create a desired bending stiffness profile of the skin panel 240, 242 along the spanwise direction, and may be based on a predicted aerodynamic wing loading on the outer wing structures 210 during flight.

The method 700 may additionally include laying up the outer wing upper skin panel 240 and associated planks 600 in a manner to have a combined axial stiffness in the spanwise direction that is higher than the combined axial stiffness of the outer wing lower skin panel 242 and associated planks 600. The higher axial stiffness of the upper skin panel 240 may accommodate relatively high compression loads in the upper skin panel 240 during upward bending of the outer wing structure 210. In contrast, the lower skin panel 242 may require a lower axial stiffness due to the higher tensile strength of composite structures due to the high tensile capability of the fibers.

The method 700 may additionally include laying up the planks 600 to a length such that when bonded to the outer wing upper skin panel 240 or the outer wing lower skin panel 242, each plank 600 terminates at a location no further outboard than the tank outboard end 134 of a fuel tank 128 that may be included in the outer wing structure 210. As mentioned above, the planks 600 may extend continuously from the outer wing stout rib 232 toward the wing tip 126. As described above, the stiffness requirements in the outer wing bays 236 outboard of the fuel tank 128 may be relatively low compared to the bending stiffness requirements inboard of the tank outboard end 134 due to the reduced inertial loads (i.e., due to reduced mass) at locations outboard of the fuel tank 128.

The step of bonding the planks 600 to the inner surface of a skin panel 240, 242 may include separately laying up and curing each of the planks 600, followed by bonding each plank 600 to a skin panel 240, 242 via an adhesive layer (not shown). Alternatively, the planks 600 (in the cured state or uncured state) may be separately laid up and co-bonded with a skin panel 240, 242 in the uncured state or cured state. In still further examples, the planks 600 may be separately laid up and co-cured with a skin panel 240, 242 in a single cure cycle.

In addition to laying up planks plies 602 to form planks 600, the method 700 may include providing a plurality of outer wing ribs 234 having rib cutouts 268 to provide clearance for the planks 600 to pass through the outer wing ribs 234. As described above, the outer wing ribs 234 may be laid up (of composite plies 300) into a channel-shaped cross section. The method may include coupling the outer wing ribs 234 to the outer wing front spar 212 and the outer wing rear spar 214.

Step 704 of the method 700 includes coupling the outer wing upper skin panel 240 and the outer wing lower skin panel 242 to the outer wing front spar 212, the outer wing rear spar 214, and the outer wing ribs 234 including the outer wing stout rib 232 of the outer wing structure 210. As described above, the outer wing upper and lower skin panels 240, 242 may be bonded and/or mechanically fastened to the outer wing front and rear spar and outer wing ribs 234.

Step 706 of the method 700 is substantially similar to the above-described step 502 of the method 500. Step 706 includes coupling an outer wing inboard end 230 of each one of a pair of the outer wing structures 210 respectively to the opposing center wing outboard ends 168 of the center wing structure 150 to define a pair of wing joints 172. As described above and shown in FIG. 4, the center wing structure 150 has an engine mounting location on each of opposing sides of the wing centerline 124. The spar terminal ends 156 of the center wing front spar 152 and the center wing rear spar 154 at each wing joint 172 are located no further inboard than an engine centerline 106 associated with the engine mounting location, and no further outboard of the engine centerline 106 than ten percent of a distance between the engine centerline 106 and the wing centerline 124.

In addition, step 706 may include any one or more of the above-described alternative or additional steps associated with step 502. For example, step 706 may include coupling the outer wing stout rib 232 on the outer wing inboard end 230 of the outer wing structure 210, to a center wing stout rib 170 on the center wing outboard end 168 of the center wing structure 150 such that the outer wing stout rib 232 and the center wing stout rib 170 are in back-to-back arrangement as shown in FIG. 17 and described above. Step 706 may also include coupling, using a front spar splice plate 216, the spar terminal end 156 of the center wing front spar 152 to the spar terminal end 156 of the outer wing front spar 212 via mechanical fasteners, and coupling, using a rear spar splice plate 218, the spar terminal end 156 of the center wing rear spar 154 to the spar terminal end 156 of the outer wing rear spar 214 via mechanical fasteners as shown in FIG. 5 and described above.

FIG. 58 is a flowchart of a method 800 of loading a composite wing assembly 120 having outer wing structures 210 as shown in the above-described FIGS. 48-56. The method includes step 802 of providing a wing assembly 120 having a pair of outer wing structures 210 each joined to a center wing structure 150. As described above, the center wing structure 150 includes a pair of center wing outboard ends 168 and a pair of engine mounting locations respectively on opposite sides of a wing centerline 124. In addition, the center wing structure 150 includes a center wing front spar 152 and a center wing rear spar 154 each having a spar terminal end 156 at each of the center wing outboard ends 168.

The above-described outer wing structure 210 of FIGS. 48-56 includes an outer wing front spar 212 and an outer wing rear spar 214 configured to be coupled respectively to the center wing front spar 152 and the center wing rear spar 154 to define a wing joint 172 coupling the outer wing structure 210 to the center wing structure 150. In addition, the outer wing structure 210 includes an outer wing upper skin panel 240 and an outer wing lower skin panel 242 each comprised of acreage plies 302 having a panel thickness that is constant along a spanwise direction, and which is coupled to the outer wing front spar 212, the outer wing rear spar 214, the outer wing upper skin panel 240 and the outer wing lower skin panel 242. As described above, the outer wing upper skin panel 240 and/or the outer wing lower skin panel 242 includes one or more planks 600 bonded to an inner surface of the skin panel 240, 242. Each plank 600 extends in a spanwise direction, and is comprised of a stack of planks plies 602 of narrower width than the acreage plies 302 of the skin panel 240, 242. As described above, the center wing structure 150 is configured such that the spar terminal ends 156 of the center wing front spar 152 and the center wing rear spar 154 at each wing joint 172 are located no further inboard than an engine centerline 106 associated with the engine mounting location, and no further outboard of the engine centerline 106 than ten percent of a distance between the engine centerline 106 and the wing centerline 124.

Step 804 of the method 800 includes placing the wing assembly 120 in a ground static loading condition in a manner similar to the process described above in step 554 of method 550. Step 806 of the method 800 includes placing the wing assembly 120 in a dynamic loading condition. As described above with regard to the method 550, the ground static loading condition is associated with the aircraft 100 substantially non-moving and under a ground static loading in which the wing assembly 120 is subjected to gravitational force due to the structural mass of the wing assembly 120. The dynamic loading condition is associated with the aircraft 100 in motion and the wing assembly 120 subjected to one of the following: gravitational force due to the structural mass of the wing assembly 120, inertial force due to the structural mass of the wing assembly 120, aerodynamic loads on the wing assembly 120, and/or control surface loads on the wing assembly 120.

Referring now to FIGS. 59-72, shown is an example of an outer wing structure 210 in which the outer wing upper skin panel 240 and outer wing lower skin panel 242 are stiffened by outer wing stringers 272, as an alternative to the above-described planks 600 of FIGS. 48-56, and as an alternative to the above-described 0-degree strip sets 250 of FIGS. 28-43. As shown in FIGS. 61-62 and described below, the outer wing structure 210 includes one or more outer wing stringers 272 coupled to the outer wing upper skin panel 240 and/or to the outer wing lower skin panel 242. The outer wing stringers 272 each extend in a spanwise direction and have a hat-shaped cross section 900. Each outer wing stringer 272 has a pair of stringer flanges 276, a pair of stringer webs 278, and a stringer cap 910. The stringer cap 910 contains one or more 0-degree ply strips 252 (FIGS. 65-66) interleaved within the stringer plies 908 of the stringer cap 910. With the exception of the outer wing stringers 272, the outer wing structure 210 shown in FIGS. 59-70 is configured similar to the above-described outer wing structure 210 of FIGS. 48-56 and the above-described outer wing structure 210 of FIGS. 28-43.

FIGS. 59-62 show a plurality of outer wing stringers 272 bonded to the inner surface of the outer wing upper and lower skin panel 240, 242. Each outer wing stringer 272 extends continuously in a spanwise direction from the outer wing stout rib 232 toward the wing tip 126. For outer wing structures 210 that include a fuel tank 128, the outer wing stringers 272 may terminate at the tank outboard end 134. However, in other examples, one or more the outer wing stringers 272 may extend continuously across multiple outer wing bays 236 from the outer wing stout rib 232 beyond the fuel tank 128 to the wing tip 126.

As shown in FIGS. 59 and 61, each outer wing stringer 272 has a stringer centerline 912 extending along a lengthwise direction of the outer wing stringer 272. The outer wing stringers 272 may be spaced apart from each other at a chordwise spacing 256 of from 6-11 inches between stringer centerlines 912. As described above with regard to the chordwise spacing 256 of the 0-degree strip sets 250 and the chordwise spacing 256 of the planks 600, the chordwise spacing 256 of the outer wing stringers 272 may be uniform to maintain a uniform chordwise mass distribution in the outer wing structure 210. The outer wing stringers 272 may optionally be aligned with the center wing stringers 270 (FIG. 5) of the center wing structure 150 (FIG. 5). Alternatively, the outer wing stringers 272 may be positioned in non-alignment with the center wing stringers 270.

Referring to FIG. 62, shown is a portion of the outer wing structure 210 illustrating an example of outer wing stringers 272 coupled to the outer wing upper and lower skin panel 240, 242. As shown, the outer wing stringer 272 has a relatively low stringer height 914 that results in an area centroid 260 that is nearer to the skin panel 240, 242 than the area centroid 260 of a conventional larger hat stringer. The low-profile outer wing stringers 272 and associated skin panel (i.e., the stringer-skin panel assembly) have a combined area centroid 260 that is nearer to the skin panel 240, 242 inner surface than the combined area centroid of conventional stringers and associated skin panel. Although the stringer-skin area centroid 260 of a stringer-skin panel assembly is based on the cross-sectional area of all the outer wing stringers 272 (on a skin panel) combined with the cross-sectional area of the skin panel 240, 242 between the front spar and rear spar 212, 214, in FIG. 62 for purposes of the present discussion, the stringer-skin area centroid 260 of each stringer-skin panel assembly is represented by the stringer-skin portion cross-sectional area 920, which includes the cross-sectional area of a single outer wing stringer 272 (i.e., the cross-attached portion) combined with the cross-sectional area of a skin panel portion 614 of the skin panel 240, 242 extending from each side of the cross-hatched outer wing stringer 272. The width of the cross-hatched skin panel portion 614 extends between the midpoints 622 respectively located between the cross-hatched outer wing stringer 272 and the outer wing stringer 272 on immediately opposite sides of the cross-hatched outer wing stringer 272. The result of the stringer-skin area centroid 260 being near the inner surface of the skin panel 240, 242 is a larger effective wing thickness 262 than the effective wing thickness of a wing that uses conventional stringers for stiffening skin panels. A larger effective wing thickness 262 translates to an increase in bending load-carrying efficiency of the outer wing structure 210, and which may result in a reduction in structural mass of the wing assembly 120.

Referring still to FIG. 62, similar to the above-described bending stiffness ratio associated with the planks 600 of FIGS. 48-58, the outer wing stringers 272 may be provided with a stringer bending stiffness that is lower than the combined stringer-skin portion bending stiffness of the outer wing stringer 272 and the skin panel portion 614 directly supported by the outer wing stringer 272. In this regard, each outer wing stringer 272 of FIGS. 59-70 may have a stringer bending stiffness that is approximately 40-60 percent (more preferably, 45-55 percent) of the combined stringer-skin portion bending stiffness as described above. The stringer bending stiffness may be the bending stiffness of the outer wing stringer 272 at a spanwise location of maximum stringer bending stiffness. However, the stringer bending stiffness of an outer wing stringer 272 may be at any spanwise location along the outer wing stringer 272. The combined stringer-skin portion bending stiffness is the combined stiffness of the outer wing stringer 272 and the associated skin panel portion 614 as measured at the same spanwise location as where the stringer bending stiffness is measured.

As described above with regard to the outer wing structure 210 of FIGS. 28-43 and the outer wing structure 210 of FIGS. 48-56, maintaining the stringer bending stiffness of each outer wing stringer 272 at between 40-60 percent of the combined stringer-skin portion bending stiffness limits the magnitude of peel-off forces in the bondline between the outer wing stringers 272 and the skin panel 240, 242 to a level that prevents separation of the perimeter edges of the outer wing stringers 272 from the inner surface of the skin panel 240, 242, while also preventing buckling of the unsupported segment of the skin panel 240, 242 between adjacent pairs of outer wing stringers 272 when the outer wing structure 210 is at limit load. The chordwise spacing 256 (FIG. 59) between the outer wing stringers 272 may be such that buckling in the unsupported segment of the skin panel 240, 242 between adjacent outer wing stringers 272 occurs at or above limit load.

Referring still to FIG. 62, as mentioned above, the cross-sectional area of one of the outer wing stringers 272 and associated skin panel portion 614 is represented by above-mentioned stringer-skin portion cross-sectional area 920. For outer wing stringers 272 located between a pair of outer wing stringers 272 as shown in the upper skin panel 240 of FIG. 62, the skin panel portion 614 has a panel portion width 618 that extends between midpoints 622 respectively located on opposite sides of the outer wing stringer 272. As described above, each midpoint 622 is located midway between the edges of adjacent outer wing stringers 272. For outer wing stringers 272 located between a spar 212, 214 and another outer wing stringer 272 as shown in the lower skin panel 242 of FIG. 62, the panel portion width 618 extends between the spar outer flange 160 of the outer wing front or rear spar 212, 214 on one side of the outer wing stringer 272 and, on an opposite side of the outer wing stringer 272, the midpoint 622 between the edges of the adjacent outer wing stringers 272. In each example, the panel portion width 618 of each skin panel portion 614 is centered on the outer wing stringer 272.

As described above with regard to the outer wing stringer 272 configurations of FIGS. 28-43 and FIGS. 48-56, the magnitude of the bending stiffness of a skin panel portion 614 in FIG. 62 may be a function of the ply composition, ply quantity, and ply stacking sequence of the composite plies 300 of the skin panel 240, 242, and by the stringer-skin portion cross-sectional area, which may be a function of the panel thickness 194, the panel portion width 618, and/or chordwise spacing 256 (FIG. 61) between the outer wing stringers 272. Similarly, the magnitude of the stringer bending stiffness of an outer wing stringer 272 may be a function of the ply composition, ply quantity, and ply stacking sequence of the stringer plies 908 that make up the outer wing stringer 272, and also by the size (e.g., stringer width 918, stringer height 914—FIG. 65) of the outer wing stringer 272.

Figure 63:
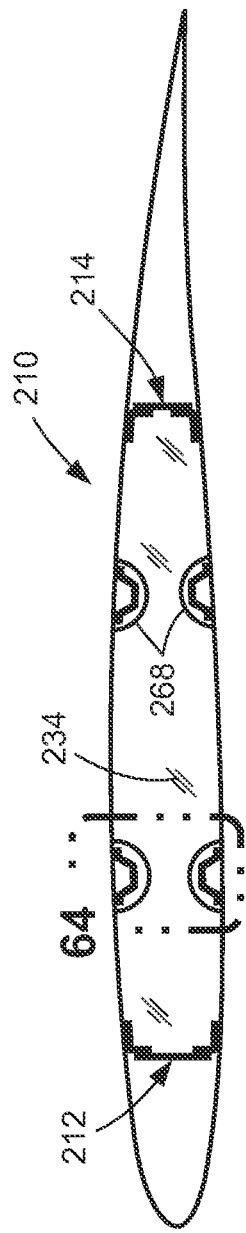
FIG. 63 is a sectional view taken along line 63-63 of FIG. 60 and illustrating an example of outer wing stringers passing through rib cutouts formed in the outer wing rib.
Figure 64:
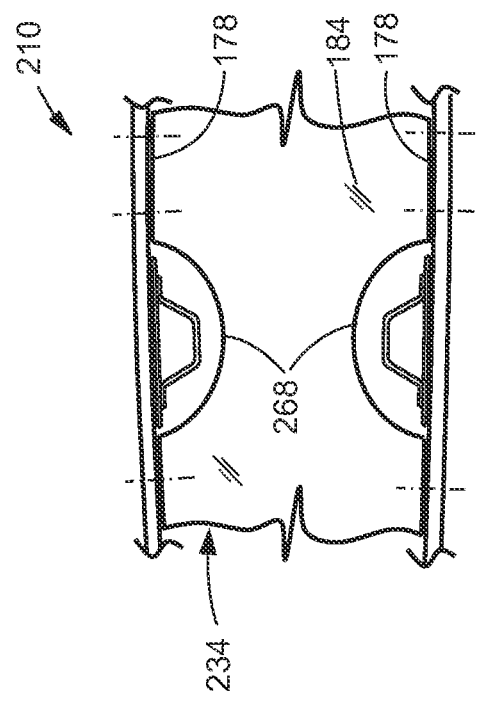
FIG. 64 is a magnified view of the portion of the outer wing structure identified by reference numeral 64 of FIG. 63 and illustrating rib cutouts formed in the outer wing rib for passage of the outer wing stringers.

Referring to FIGS. 63-64, shown is a sectional view of the outer wing structure 210 showing an outer wing rib 234 extending between the outer wing front spar 212 and rear spar 214. One or more of the outer wing ribs 234 may have one or more rib cutouts 268 in the rib web 184 and/or rib outer flange 178 to provide clearance for the outer wing stringers 272 to pass through the outer wing ribs 234. Alternatively, the rib outer flanges 178 of the outer wing ribs 234 may be locally contoured to match the contour of each outer wing stringer 272.

Referring to FIGS. 65-66, shown in FIG. 65 is a cross-sectional view of an example of an outer wing stringer 272 bonded to the outer wing lower skin panel 242. The outer wing stringers 272 may be laid up and secondary bonded to the inner surface of the skin panel 240, 242. Alternatively, the outer wing stringers 272 may be co-bonded or co-cured with the skin panel 240, 242. As indicated above, each outer wing stringer 272 may include a pair of stringer flanges 276, a pair of stringer webs 278, and a stringer cap 910 interconnected to the stringer webs 278. Each stringer flange 276 may be interconnected to a stringer web 278 by a radius portion 182. Similarly, each stringer web 278 may be interconnected to the stringer by a radius portion 182. As described below, the stringer flanges 276, the stringer webs 278, and the stringer cap 910 may be comprised of stringer plies 908. The stringer plies 908 may be fabric plies 304. The outer wing stringer 272 may exclude the use of unidirectional plies 306 as a means to avoid warpage otherwise associated with the unidirectional plies 306 in a composite structure having a non-planar shape.

Referring still to FIGS. 65-66, to increase the bending stiffness of the outer wing stringer 272, the stringer cap 910 contains one or more 0-degree ply strips 252 interleaved within the stringer plies 908. Each 0-degree ply strip 252 in the stringer cap 910 may extend across the full width of the stringer cap 910. However, to avoid warpage of the outer wing stringer 272 during curing, each 0-degree ply strip 252 is confined to the stringer cap 910, and is excluded from the radius portion 182 on either side of the stringer cap 910. Although FIG. 65 shows an example of a stringer cap 910 having three 0-degree ply strips 252, a stringer cap 910 may include any number of 0-degree ply strips 252. For example, a stringer cap 910 may include from 1-10 or more of the 0-degree ply strips 252, as may be required to accommodate bending stiffness requirements. To prevent resin cracking, no more than four 0-degree ply strips 252 may be stacked directly on top of each other in the stringer cap 910.

Each outer wing stringer 272 may have a stringer width 918 of up to 4 inches. The stringer width 918 may be measured between the intersections of the stringer flange 276 and the stringer web 278 on each side of the stringer vertical axis 916. Each outer wing stringer 272 may have a stringer height 914 of no greater than 3 inches, which may advantageously result in the area centroid 260 being near the inner surface of the skin panel 240, 242, and which may result in a relatively large effective wing thickness 262, as described above and shown in FIG. 62. In some examples of the outer wing stringer 272, the stringer flanges 276 may each have a flange side edge 906 that is tapered at an edge taper angle 608 of no greater than 30 degrees relative to the inner surface of the corresponding upper or lower skin panel 240, 242 to which the outer wing stringer 272 is bonded. Preferably, the edge taper angle 608 is between approximately 15-30 degrees to reduce or prevent mark-off (i.e., indentation) in the skin panel 240, 242.

Referring to FIGS. 65 and 67, the outer wing stringer 272 may include a stringer base laminate 902. The stringer base laminate 902 may be comprised of unidirectional plies 306, and may be positioned between the stringer flanges 276 of each outer wing stringer 272 and the outer wing upper skin panel 240 or the outer wing lower skin panel 242. The stringer base laminate 902 may include one or more 0-degree ply strips 252. To prevent resin cracking, no more than four 0-degree ply strips 252 may be stacked directly on top of each other in the stringer base laminate 902. The stringer base laminate 902 may have a width that is at least as wide as the width across the flange side edges 906 of the outer wing stringer 272.

Referring to FIG. 67, the stringer base laminate 902 has laminate side edges 904 that may be tapered at an edge taper angle 608 of no greater than 30 degrees relative to the inner surface of the corresponding upper or lower skin panel 240, 242 to which the stringer base laminate 902 is directly or indirectly coupled. Preferably the edge taper angle 608 is between approximately 15-30 degrees to reduce mark-off in the skin panel 240, 242 as mentioned above.

Referring to FIG. 65, the outer wing upper skin panel 240 and/or the outer wing lower skin panel 242 may each one or more 0-degree ply strips 252 interleaved in the acreage plies 302 of the skin panels 240, 242 at one or more of the mounting locations of the outer wing stringers 272. Each one of the 0-degree ply strips 252 may have a width that is at least as wide as the stringer base laminate 902 or the width across the stringer flanges 276, whichever is larger.

As shown in FIG. 65, the 0-degree ply strips 252 may be biased toward the inner surface of the skin panel 240, 242. However, the 0-degree ply strips 252 may be located within the stack of acreage plies 302 such that a 0-degree ply strip 252 does not define the inner surface of the skin panel 240, 242. Instead, one of the acreage plies 302 preferably defines the inner surface of the skin panel 240, 242. Although FIG. 65 shows an example of a skin panel 240, 242 having three 0-degree ply strips 252 interleaved within the acreage plies 302 directly below a stringer mounting location, a skin panel 240, 242 may include any number of 0-degree ply strips 252 at each stringer mounting location. For example, a skin panel 240, 242 may include from 1-10 of the 0-degree ply strips 252 at each stringer mounting location. As noted below, the number of 0-degree ply strips 252 at each stringer mounting location may be dictated by the bending stiffness requirements at a spanwise location of the outer wing structure 210. The 0-degree ply strips 252 interleaved within the acreage plies 302 may be of constant width along the spanwise direction.

Referring to FIGS. 68-69, shown are alternative configurations of the outer wing stringer 272. FIG. 68 shows an example of an outer wing stringer 272 having a stringer base laminate 902 comprised exclusively of 0-degree ply strips 252, and which is coupled to a lower skin panel 242 that is devoid of 0-degree ply strips 252. FIG. 69 shows an example of an outer wing stringer 272 in which the stringer base laminate 902 and the lower skin panel 242 are devoid of 0-degree ply strips 252. In each example, the stringer cap 910 includes interleaved 0-degree ply strips 252 to increase the bending stiffness of the outer wing stringer 272.

Referring to FIG. 70, wing shown is a spanwise sectional view of an example of a portion of an outer wing structure 210 illustrating ply drops 264 in the 0-degree ply strips 252 of the stringer cap 910. In some examples, the stringer plies 908 that make up the outer wing stringer 272 and the stringer base laminate 902 may be continuous and constant along the spanwise direction from the outer wing stout rib 232 toward the wing tip 126. Although the outer wing stringers 272 may each be of constant cross-sectional shape and cross-sectional size, the spanwise locations of the ply drops 264 in the 0-degree ply strips 252 of the stringer cap 910 may be selected to create a desired bending stiffness profile of the outer wing stringer 272 along the spanwise direction. The location of the ply drops 264 may be a function of the predicted aerodynamic wing loading on the outer wing structure 210 during flight.

Also shown in FIG. 70 are ply drops 264 in the 0-degree ply strips 252 optionally included in the stringer base laminate 902. In addition, shown are ply drops 264 in the 0-degree ply strips 252 optionally interleaved within the outer wing lower skin panel 242 or outer wing upper skin panel 240. As mentioned above, the acreage plies 302 that make up each skin panel 240, 242 are continuous and constant along the spanwise direction, resulting in the skin panels 240, 242 being constant thickness which simplifies manufacturing. Advantageously, the 0-degree ply strips 252 optionally included with the skin panels 240, 242 may have one or more ply drops 264 to facilitate a gradual spanwise reduction in the bending stiffness of the outer wing structure 210.

In regard to the outer wing structure 210 configuration shown in FIGS. 28-43 and FIGS. 48-56, the outer wing structure 210 of FIGS. 59-70 may be configured such that the combination of the upper skin panel 240 and associated outer wing stringers 272 has a higher axial stiffness in the spanwise direction than the axial stiffness of the combination of the lower skin panel 242 and associated outer wing stringers 272. The higher axial stiffness of the upper skin panel 240 (relative to the lower skin panel 242) may accommodate compression loading of the upper skin panel 240 during upward bending of the outer wing structure 210.

FIG. 71 is a flowchart of a method 1000 of manufacturing a wing assembly 120 having outer wing structures 210 as shown in FIGS. 59-70. The method 1000 includes step 1002 of bonding one or more outer wing stringers 272 to the outer wing upper skin panel 240 and/or the outer wing lower skin panel 242 of the outer wing structure 210. As described above, each outer wing stringer 272 extends in a spanwise direction and is comprised of stringer plies 908. Each outer wing stringer 272 has a hat-shaped cross section 900 and is comprised of a pair of stringer flanges 276, a pair of stringer webs 278, and a stringer cap 910. The stringer cap 910 contains one or more 0-degree ply strips 252 interleaved within the stringer cap 910.

The method 1000 of manufacturing the wing assembly 120 having the above-described outer wing structure 210 shown in FIGS. 59-70 may include any one or more of the above-described steps of method 500 (FIG. 46) or method 800 (FIG. 58), except that instead of interleaving 0-degree strip sets 250 into the skin panels 240, 242 of the outer wing structure 210 (e.g., FIGS. 41-45) or bonding planks 600 to the skin panels 240, 242 of the outer wing structure 210 (e.g., FIGS. 54-55), the method 1000 involves bonding outer wing stringers 272 to the skin panels 240, 242 of the outer wing structure 210 as shown in FIGS. 59-70.

Prior to bonding the outer wing stringers 272 to the skin panels 240, 242, the method 1000 may include laying up a plurality of fabric plies 304 to result in the outer wing stringers 272. Each outer wing stringer 272 has a hat-shaped cross-section. Each outer wing stringer 272 may be laid up with only fabric plies 304, and may be devoid of unidirectional plies 306 except for the 0-degree ply strips 252 in the stringer cap 910 and/or in the stringer base laminate 902. The stringer plies 908 (excluding the 0-degree ply strips 252) may be constant (i.e., no ply drops 264) from the outer wing stout rib 232 toward the wing tip 126.

The step of laying up the outer wing stringers 272 may include interleaving one or more 0-degree ply strips 252 within the stringer plies 908 of the stringer cap 910. Although FIG. 65 shows an example of a stringer cap 910 having four 0-degree ply strips 252, a stringer cap 910 may include any number of 0-degree ply strips 252. For example, a stringer cap 910 may include anywhere from 1-10 of the 0-degree ply strips 252. The quantity of the 0-degree ply strips 252 may be dictated by the bending stiffness requirement of the skin panel 240, 242. As shown in FIGS. 65-66 and described above, each one of the 0-degree ply strips 252 may be confined to the stringer cap 910, and may be excluded from the radius portions 182 and stringer webs 278 on opposite sides of the stringer cap 910. The step of interleaving 0-degree ply strips 252 within the stringer cap 910 may include incorporating one or more ply drops 264 in the 0-degree ply strips 252 of the stringer cap 910 to reduce the bending stiffness of the outer wing structure 210 along the spanwise direction. As described below, the location of the ply drops 264 may be dictated by the bending stiffness requirement at different spanwise locations along the outer wing structure 210.

Preferably, the outer wing stringers 272 on each of the outer wing upper skin panel 240 and/or outer wing lower skin panel 242 have the same configuration. For example, the outer wing stringers 272 on the outer wing lower skin panel 242 may all have the same cross-sectional size, same cross-sectional shape, same ply stacking sequence, and/or the same composite material. In this regard, with the exception of the length of the outer wing stringers 272, there may be no difference in the configuration of the outer wing stringers 272 on each skin panel 240, 242, which may simplify manufacturing, and may also maintain the chordwise mass distribution of the outer wing stringers 272 within 10 percent of each other. The outer wing stringers 272 on the outer wing upper skin panel 240 may have the same arrangement as the outer wing stringers 272 on the outer wing lower skin panel 242.

In some examples, step 1002 of bonding the outer wing stringers 272 to the outer wing upper skin panel 240 and the outer wing lower skin panel 242 may include bonding a stringer base laminate 902 to the outer wing upper skin panel 240 and/or the outer wing lower skin panel 242 such that the stringer flanges 276 of each outer wing stringer 272 are mounted on a stringer base laminate 902. As shown in FIGS. 65, 68 and 69, the stringer base laminate 902 may be positioned between the stringer flanges 276 and a skin panel (i.e., the outer wing upper skin panel 240 and/or the outer wing lower skin panel 242). The stringer base laminate 902 may include one or more 0-degree ply strips 252 interleaved within the stringer plies 908 of the stringer base laminate 902. Each stringer base laminate 902 having a width that is at least as wide as the width across the flange side edges 906. To prevent resin cracking, a stringer base laminate 902 may include no more than four 0-degree ply strips 252 stacked directly on top of each other.

The stringer base laminate 902 may include unidirectional plies 306, and may be devoid of fabric plies 304. As mentioned above, the unidirectional plies 306 of the stringer base laminate 902 may comprise 0-degree plies and non-0-degree plies. The non-0-degree plies may include 90-degree plies, +45-degree, and −45-degree plies, or unidirectional plies 306 having other fiber orientations. As indicated above, the 0-degree plies have fibers oriented parallel to a lengthwise direction of the outer wing stringer 272. The 90-degree plies have fibers oriented perpendicular to the lengthwise direction of the outer wing stringer 272. The +45-degree plies have fibers oriented 45 degrees to the lengthwise direction of the outer wing stringer 272.

The method 1000 may include forming each of opposing laminate side edges 904 of the stringer base laminate 902 at an edge taper angle 608 of no greater than 30 degrees relative to the inner surface of the corresponding upper or lower skin panel 240, 242 to which the stringer base laminate 902 is bonded. Preferably, the edge taper angle 608 is between approximately 15-30 degrees. The shallow edge taper angle 608 in the base laminate may reduce or prevent the occurrence of mark-off on the inner surface of a skin panel 240, 242 during bonding of the stringer base laminate 902 to the skin panel 240, 242. Further in this regard, the method 1000 may include forming the flange side edges 906 of each of the outer wing stringers 272 at an edge taper angle 608 of no greater than 30 degrees (e.g., preferably between 15-30 degrees) to prevent mark-off in the stringer base laminate 902 or, for examples where the stringer base laminate 902 is omitted, to prevent mark-off in the skin panel 240, 242 to which the stringer flanges 276 may be bonded.

Step 1002 of bonding the outer wing stringers 272 to the outer wing upper and/or lower skin panel 240, 242 may include secondary bonding, via an adhesive layer (not shown), the stringer flanges 276 and/or the stringer base laminate 902 of the outer wing stringers 272 (e.g., in the cured state) to the skin panel 240, 242 in the cured state. Alternatively, step 1002 may comprise co-bonding the outer wing stringers 272 (e.g., in either the cured state or the uncured state) to the skin panel 240, 242, which may be in either the uncured state or cured state. In a still further example, step 1002 may comprise co-curing the outer wing stringers 272 (e.g., in the cured state) and the skin panel 240, 242 (e.g., in the uncured state).

Step 1002 of bonding the outer wing stringers 272 to the outer wing upper and/or lower skin panel may further include locating the outer wing stringers 272 on each skin panel 240, 242 at a chordwise spacing 256 of from 6-11 inches between stringer centerlines 912. More preferably, the chordwise spacing 256 is from 8-10 inches. Preferably, the chordwise spacing 256 between outer wing stringers 272 is uniform in order to maintain a substantially uniform chordwise mass distribution of the outer wing structure 210. In some examples, the outer wing stringers 272 may be positioned in generally parallel arrangement (e.g., ±30 degrees) to each other on a skin panel 240, 242. The outer wing stringers 272 in each of the outer wing structures 210 may be aligned respectively with the center wing stringers 270 of the center wing structure 150. However, the outer wing stringers 272 may be non-aligned with the center wing stringers 270.

As described above, the method 1000 may include laying up a plurality of acreage plies 302 to result in the outer wing upper skin panel 240 and the outer wing lower skin panel 242. As mentioned above, the acreage plies 302 may be substantially constant in the chordwise direction between the outer wing front spar 212 and outer wing rear spar 214, and substantially constant in the spanwise direction between the outer wing stout rib 232 and the wing tip 126. To increase the bending stiffness of the outer wing skin panels, the method 1000 may further include interleaving one or more 0-degree ply strips 252 within the acreage plies 302 at one or more stringer mounting locations (i.e., chordwise locations) of the outer wing stringers 272 on the outer wing upper skin panel 240 and the outer wing lower skin panel 242. To avoid or reduce the risk of a ply-splitting failure mode in a skin panel 240, 242, the 0-degree ply strips 252 within the skin panels 240, 242 may be positioned between acreage plies 302 that are non-0-degree plies. To prevent resin cracking, no more than four 0-degree ply strips 252 may be stacked immediately adjacent to each other in the skin panels 240, 242.

To reduce the bending stiffness of the outer wing structure 210 along the spanwise direction, the method 1000 may further include incorporating one or more ply drops 264 in the 0-degree ply strips 252 interleaved within the acreage plies 302 of the outer wing upper skin panel 240 and/or the outer wing lower skin panel 242. As mentioned above, the spanwise locations of the ply drops 264 in the 0-degree ply strips 252 of (1) the stringer cap 910, (2) the stringer base laminate 902, and/or (3) the skin panels 240, 242 may be based on the desired bending stiffness profile of the skin panel 240, 242 along the spanwise direction. The stiffness profile may be based on the predicted aerodynamic wing loading on the outer wing structures 210 during flight.

The step of laying up the outer wing stringers 272 may include laying up each outer wing stringer 272 to have a stringer bending stiffness that is approximately 40-60 percent (e.g., more preferably 45-55 percent) of the combined plank-skin portion bending stiffness of the plank 600 and a skin panel portion 614 of the outer wing upper skin panel 240 or the outer wing lower skin panel 242. As shown in FIG. 62 and described above, the skin panel portion 614 has a panel portion width 618 that may extend between midpoints 622 respectively located on opposite sides of the outer wing stringer 272. Each midpoint 622 is located midway between the outer wing stringer 272 and an immediately adjacent outer wing stringer 272. Alternatively, the panel portion width 618 of a skin panel portion 614 may extend between a spar on one side of the outer wing stringer 272 and, on an opposite side of the outer wing stringer 272, a midpoint 622 between the outer wing stringer 272 and an immediately adjacent outer wing stringer 272.

The method 1000 may additionally include laying up the outer wing upper skin panel 240 and associated outer wing stringers 272 in a manner to have a combined axial stiffness in a spanwise direction that is higher than the combined axial stiffness of the outer wing lower skin panel 242 and associated outer wing stringers 272. As described above, the higher axial stiffness of the upper skin panel 240 may be dictated by relatively high compression loads induced in the upper skin panel 240 during upward bending of the outer wing structure 210, in contrast to a lower axial stiffness requirement of the lower skin panel 242 due to the increased tension load-carrying capability of composite structures as a result of the high tensile strength of the fibers relative to the compressive strength of the resin.

For examples of the outer wing structure 210 having a fuel tank 128, the method 1000 may include coupling the outer wing stringers 272 to the outer wing upper skin panel 240 and/or to the outer wing lower skin panel 242 in a manner such that each outer wing structure 210 is devoid of outer wing stringers 272 beyond the tank outboard end 134 of the fuel tank 128. Further in this regard, the method 1000 may include laying up the outer wing stringers 272 such that none of the 0-degree ply strips 252 in the stringer caps 910, the stringer base laminate 902, and/or in the skin panel 240, 242 the extend beyond the tank outboard end 134.

Step 1004 of the method 1000 is substantially similar to the above-described step 702 of the method 700. For example, Step 1004 includes coupling the outer wing upper skin panel 240 and the outer wing lower skin panel 242 (and associated outer wing stringers 272) to the outer wing front spar 212, the outer wing rear spar 214, and the outer wing ribs 234 (including the outer wing stout rib 232) of the outer wing structure 210 (e.g., FIGS. 59-70). As described above, the outer wing upper and lower skin panels 240, 242 may be bonded and/or mechanically fastened to the outer wing front and rear spar 212, 214 and the outer wing ribs 234.

Step 1006 of the method 1000 is substantially similar to the above-described step 706 of the method 700. Step 1006 includes coupling an outer wing inboard end 230 of each one of a pair of the outer wing structures 210 (e.g., FIGS. 59-70) respectively to opposing center wing outboard ends 168 of a center wing structure 150 to define a pair of wing joints 172. As described above and shown in FIG. 4, the center wing structure 150 has an engine mounting location on each of opposing sides of a wing centerline 124. The spar terminal ends 156 of the center wing front spar 152 and the center wing rear spar 154 154 at each wing joint 172 are located no further inboard than an engine centerline 106 associated with the engine mounting location, and no further outboard of the engine centerline 106 than ten percent of a distance between the engine centerline 106 and the wing centerline 124.

In addition, step 1006 may include any one or more of the above-described alternative or additional steps associated with step 706. For example, step 1006 may include coupling the outer wing stout rib 232 of the outer wing structure 210, to a center wing stout rib 170 of the center wing structure 150 such that the outer wing stout rib 232 and the center wing stout rib 170 are in back-to-back arrangement as shown in FIG. 17 and described above. Step 1006 may also include coupling, using a front spar splice plate 216, the spar terminal end 156 of the center wing front spar 152 to the spar terminal end 156 of the outer wing front spar 212 via mechanical fasteners, and coupling, using a rear spar splice plate 218, the spar terminal end 156 of the center wing rear spar 154 to the spar terminal end 156 of the outer wing rear spar 214 via mechanical fasteners as shown in FIG. 5 and described above.

Figure 72:
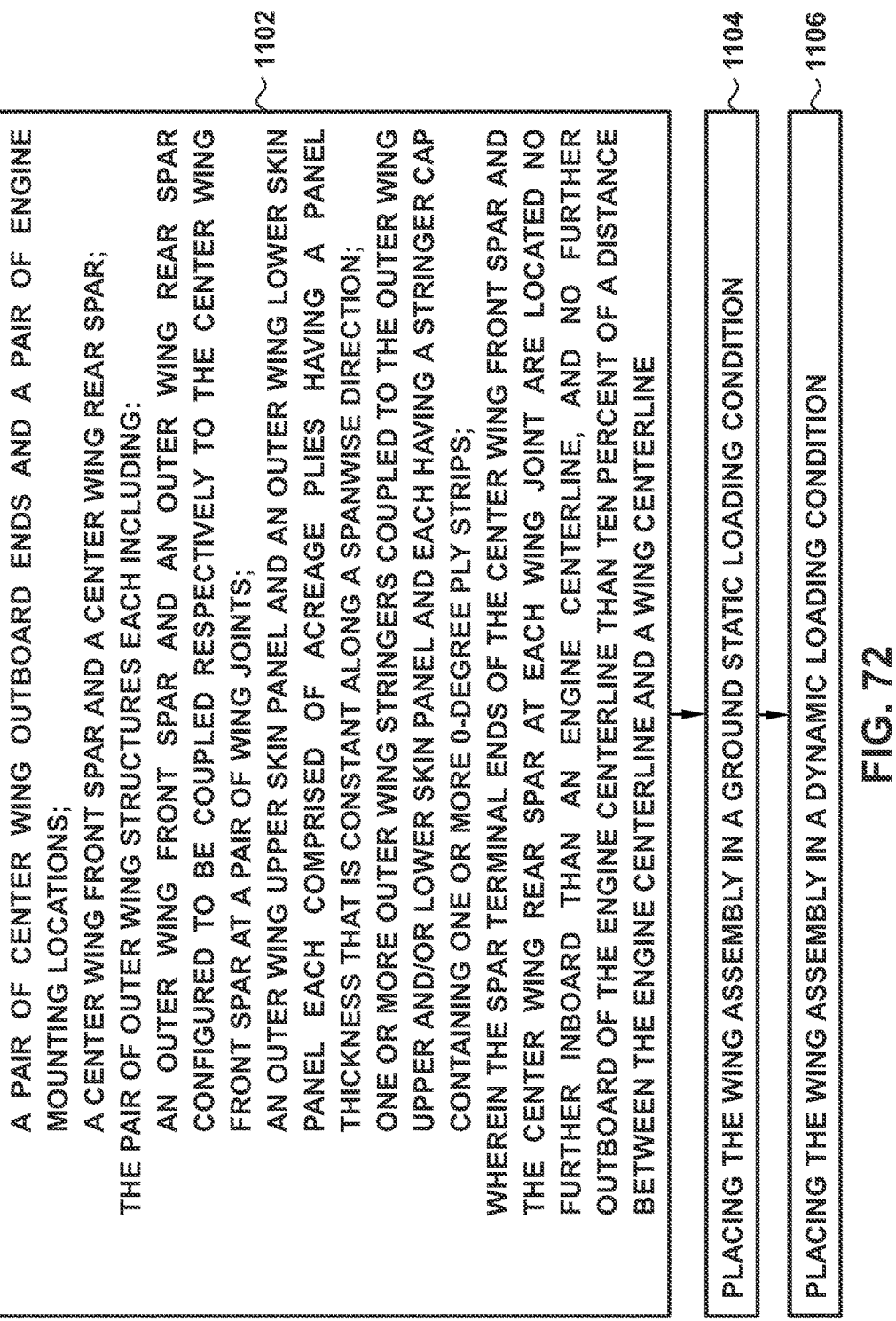
FIG. 72 is a flowchart of a method of loading a wing assembly comprised of a pair of stringer-stiffened outer wing structures to a center wing structure.

FIG. 72 is a flowchart of a method 1100 of loading a wing assembly 120 having outer wing structures 210 configured as shown in the above-described FIGS. 59-70. The method includes step 1102 of providing a wing assembly 120 having a pair of outer wing structures 210 each joined to a center wing structure 150. The center wing structure 150 may be substantially similar to the above-described arrangement shown in FIGS. 1-27. Each outer wing structure 210 is configured similar to the arrangement shown in FIGS. 59-70. The method 1100 may include step 1104 of placing the wing assembly 120 in a ground static loading condition, and step 1106 of placing the wing assembly 120 in a dynamic loading condition. As described above, the ground static loading condition is associated with the aircraft 100 substantially non-moving and under a ground static loading in which the wing assembly 120 is subjected to gravitational force due to a structural mass of the wing assembly 120. The dynamic loading condition is associated with the aircraft 100 in motion and the wing assembly 120 subjected to one of the following: gravitational force due to the structural mass of the wing assembly 120, inertial force due to the structural mass of the wing assembly 120, aerodynamic loads on the wing assembly 120, and/or control surface loads on the wing assembly 120.

Referring now to FIGS. 73-86, shown is an example of an outer wing structure 210 having an outer wing upper panel assembly 1200 and an outer wing lower panel assembly 1202. As shown in FIGS. 73-79, each panel assembly 1200, 1202 extends along a spanwise direction and is coupled to the outer wing front spar 212 and the outer wing rear spar 214. Each panel assembly 1200, 1202 may extend from the outer wing stout rib 232 to the wing tip 126. As shown in FIG. 76, each panel assembly 1200, 1202 includes an outer skin panel 1204 and a hat section panel 1206. The outer skin panel 1204 is comprised of acreage plies 302 and has a panel thickness that is constant along a spanwise direction from the outer wing stout rib 232 to the wing tip 126. The hat section panel 1206 is coupled to an inner side of the outer skin panel 1204. The hat section panel 1206 includes a plurality of generally parallel (e.g., ±30 degrees) hat-shaped sections 1210 spaced apart from each other in a chordwise direction. The hat-shaped sections 1210 are integrally formed with the hat section panel 1206 and extend in the spanwise direction. With the exception of the upper and lower panel assemblies 1200, 1202, the outer wing structure 210 of FIGS. 73-79 is configured similar to the above-described outer wing structure 210 of FIGS. 28-43, the outer wing structure 210 of FIGS. 48-56, and the outer wing structure 210 of FIGS. 59-70.

For example, the outer wing structure 210 of FIGS. 73-79 includes an outer wing front spar 212 and an outer wing rear spar 214 configured to be coupled respectively to the center wing front spar 152 (FIG. 5) and the center wing rear spar 154 (FIG. 5) to define a wing joint 172 (FIG. 5) coupling the outer wing structure 210 to the center wing structure 150 (FIG. 5). The wing joint 172 may include a front spar splice plate 216 (FIG. 5) and a rear spar splice plate 218 (FIG. 5) for respectively coupling the front and rear spars 212, 214 of the outer wing structure 210 to the front and rear spars 152, 154 of the center wing structure 150, as described above. In addition, the outer wing structure 210 of FIGS. 73-79 includes an outer wing stout rib 232 for coupling to the center wing stout rib 170 (FIG. 5) as described above. The outer wing upper and lower panel assembly 1200, 1202 are each coupled to the outer wing front spar 212, the outer wing rear spar 214, and the outer wing ribs 234, as described below.

Figure 75:
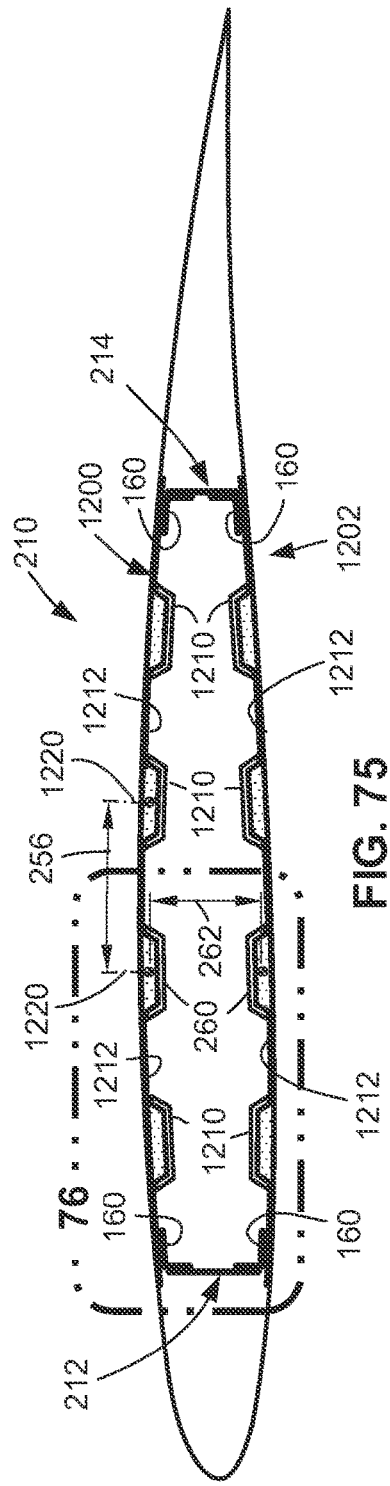
FIG. 75 is a sectional view taken along line 75-75 of FIG. 74.
Figure 76:
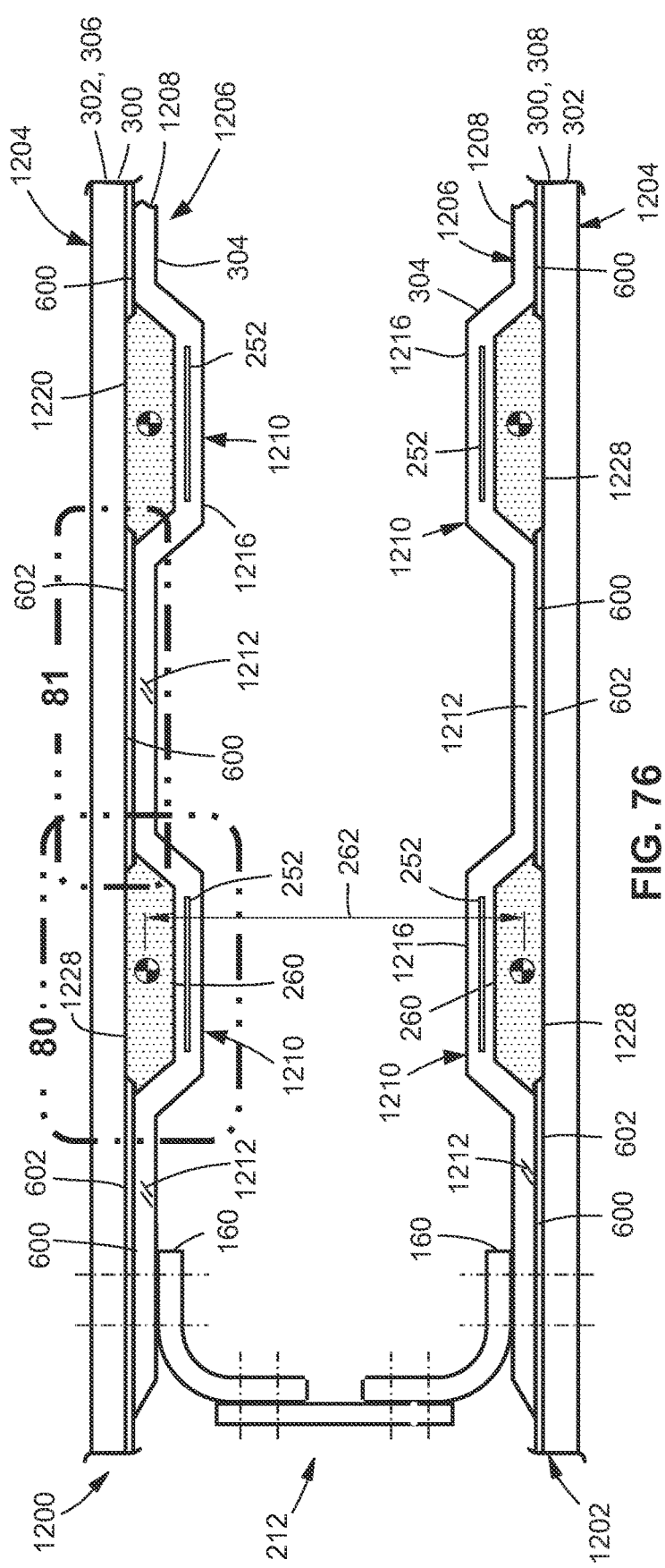
FIG. 76 is a magnified view of the portion of the outer wing structure identified by reference numeral 76 of FIG. 75 and illustrating an outer skin panel, a hat section panel, foam members, and planks that make up each of the outer wing upper and lower panel assembly.
Figure 77:
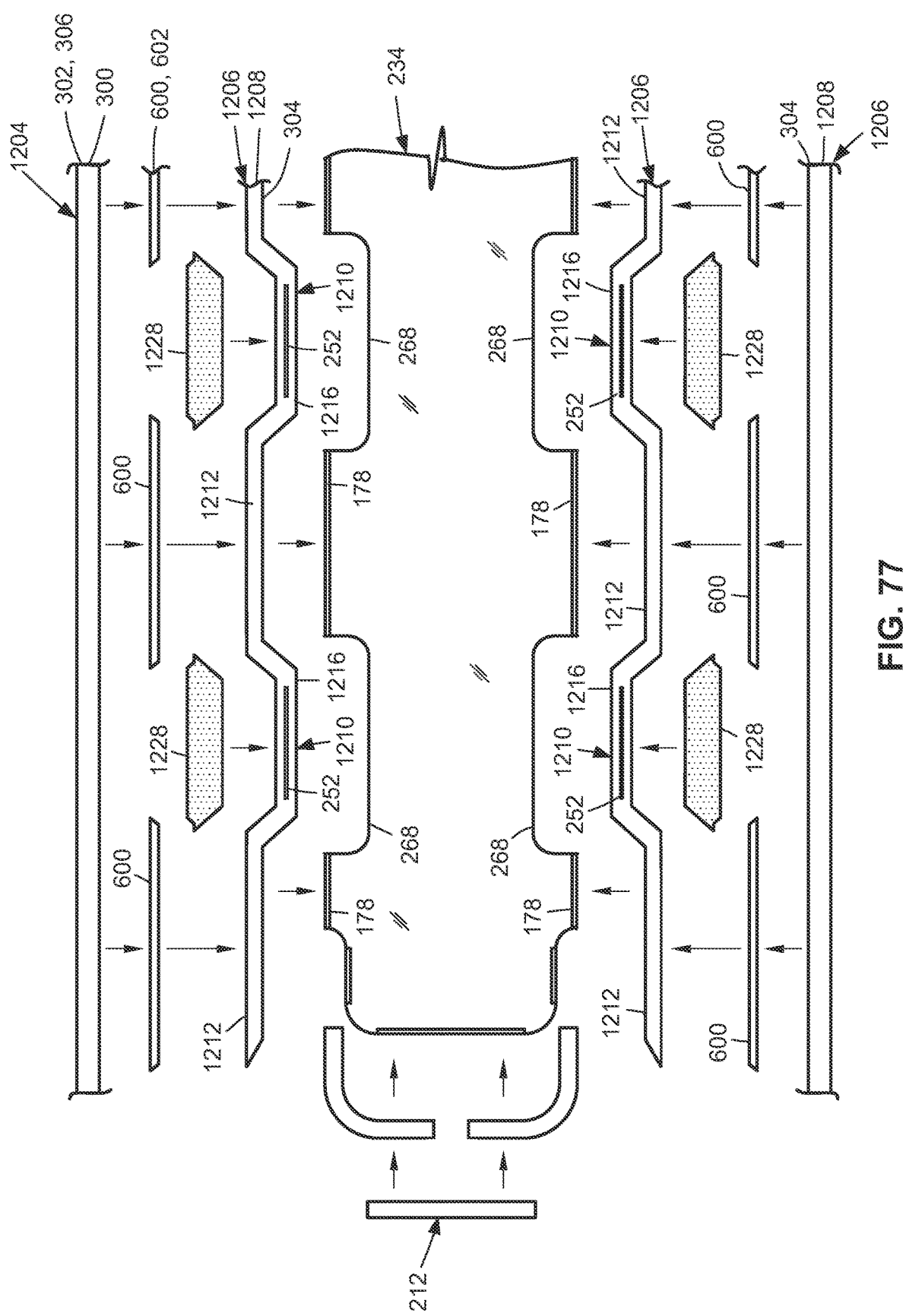
FIG. 77 is an exploded view of the outer wing structure illustrating the outer wing rib, hat section panels, foam members, planks, and outer wing panels of the outer wing upper and lower panel assemblies.

Referring to FIGS. 75-77, shown are sectional views of the outer wing structure 210 showing an example of an outer wing upper and lower panel assembly 1200, 1202. As mentioned above, each of the outer wing upper and lower panel assemblies 1200, 1202 includes an outer skin panel 1204 and a hat section panel 1206 as mentioned above. The acreage plies 302 of the outer skin panel 1204 may include from 10-70 unidirectional plies 306, and may be devoid of fabric plies 304. In some examples, the combination of the outer skin panel 1204 and the hat section panel 1206 may have a combined total of 32 composite plies 300, resulting in a panel thickness 194 that may provide a level of structural integrity in compliance with the flammability requirements of certain aviation regulatory bodies such as the Federal Aviation Administration (FAA). The unidirectional plies 306 of the outer skin panel 1204 may include 0-degree plies and 90-degree plies.

Referring still to FIGS. 75-77, each hat section panel 1206 is coupled to the inner side of an outer skin panel 1204. As mentioned above, the hat section panel 1206 extends between the outer wing front spar 212 and outer wing rear spar 214. For example, the forwardmost edge of the hat section panel 1206 may be terminate at a location just forward of the spar outer flange 160 of the outer wing front spar 212. In a similar manner, the aftmost edge of the hat section panel 1206 may be terminate at a location just aft of the spar outer flange 160 of the outer wing rear spar 214. The forwardmost edge and aftmost edge of the hat section panel 1206 may be tapered in order to minimize stress concentrations than may otherwise occur in the forward and aft edges of the hat section panel 1206. In the example shown, the outer skin panel 1204 of the upper and lower panel assemblies 1200, 1202 may extend forward of the outer wing front spar 212 and aft of the outer wing rear spar 214.

The hat section panel 1206 is comprised of hat section panel plies 1208. The hat section panel plies 1208 may include fabric plies 304, and may exclude unidirectional plies 306, except for the 0-degree ply strips 252 in the hat section caps 1216. The hat-shaped sections 1210 of the hat section panel 1206 are spaced apart from each other and are each interconnected by a hat section flange 1212, resulting in the hat section panel 1206 having a corrugated cross-sectional shape. Each hat-shaped section 1210 of the hat section panel 1206 may have the same cross-sectional size and same cross-sectional shape. The hat section panel 1206 may increase the bending stiffness of the outer wing structure 210. Each panel assembly 1200, 1202 may include a foam member 1228 sandwiched between the outer skin panel 1204 and the hat section panel 1206 at the location of each hat-shaped section 1210 as described below. Each panel assembly 1200, 1202 may also include a plank 600 comprised of 0-degree planks plies 602 sandwiched between the outer skin panel 1204 and each hat section flange 1212, as also described below.

Although the hat section panel 1206 of each panel assembly 1200, 1202 is shown (e.g., FIG. 75) having four hat-shaped sections 1210, a hat section panel 1206 may include any number of hat-shaped sections 1210. For example, a hat section panel 1206 may include only a single hat-shaped section 1210, or a hat section panel 1206 may include two or more hat-shaped sections 1210. Each hat-shaped section 1210 has a hat section centerline 1220 extending along a lengthwise direction of the hat-shaped section 1210. The hat-shaped sections 1210 may be spaced apart from each other at a chordwise spacing 256 of from 6-11 inches between hat section centerlines 1220 and, more preferably, at a chordwise spacing 256 of from 8-10 inches. The chordwise spacing 256 may be uniform between the hat-shaped sections 1210. The hat-shaped sections 1210 in each outer wing structure 210 may be aligned respectively with the center wing stringers 270 (FIG. 5) of the center wing structure 150 (FIG. 5). Alternatively, the hat-shaped sections 1210 in an outer wing structure 210 may be non-aligned with the center wing stringers 270.

As shown in the example of FIG. 75, the hat-shaped sections 1210 of a hat section panel 1206 may all have the same configuration, such as the same cross-sectional shape and/or same cross-sectional size, which may simplify manufacturing. In addition, a common cross-sectional shape and/or size of the hat-shaped sections 1210 may maintain the chord-wise mass distribution of the outer wing structure 210 to within 10 percent at all chordwise locations. Furthermore, the cross-sectional shape and/or cross-sectional size of each of the hat-shaped sections 1210 may be constant along the lengthwise direction.

Figure 78:
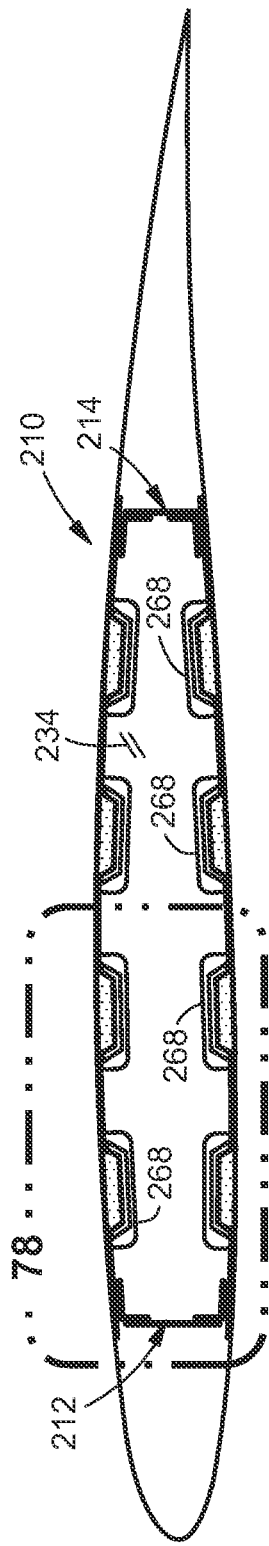
FIG. 78 is a sectional view taken along line 78-78 of FIG. 74 and illustrating the outer wing rib having rib cutouts for accommodating the hat-shaped sections of the outer wing upper and lower panel assemblies.
Figure 79:
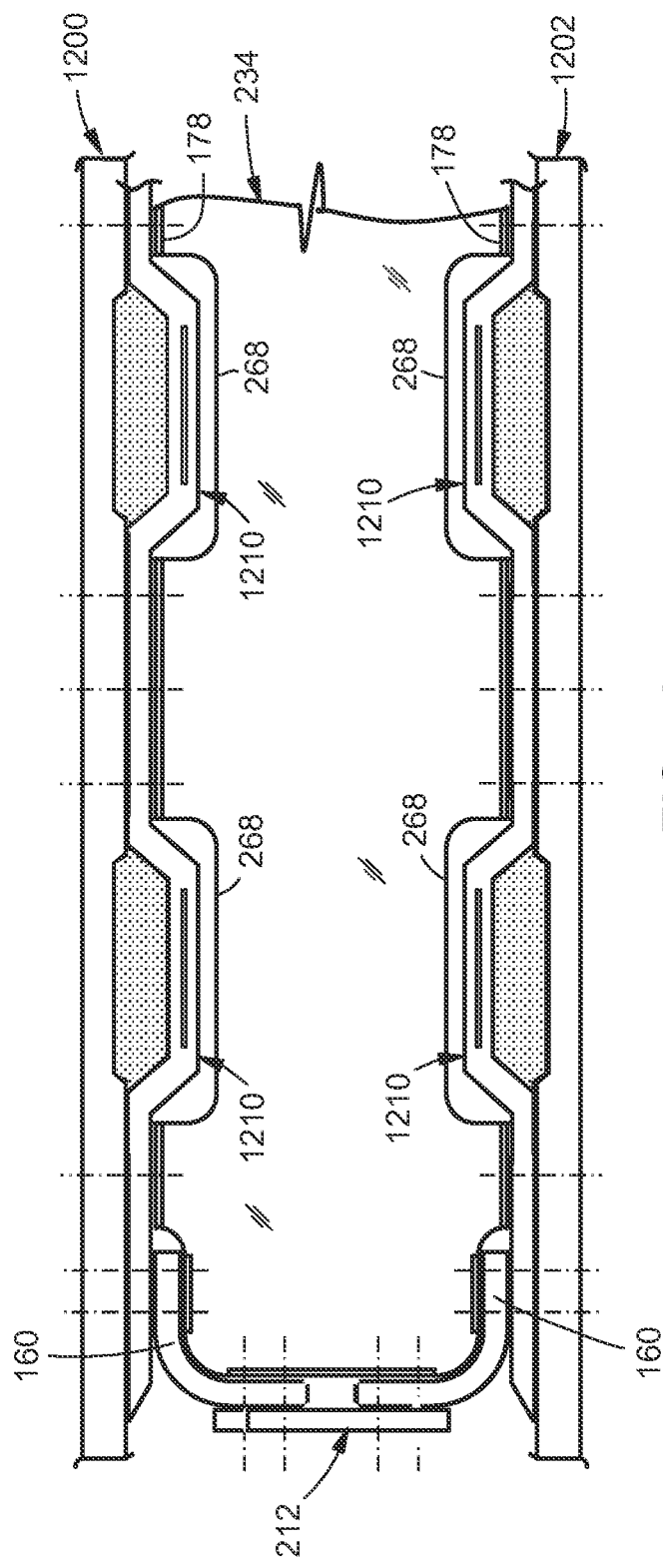
FIG. 79 is a magnified view of the portion of the outer wing structure identified by reference numeral 79 of FIG. 78 and illustrating rib cutouts for accommodating the hat-shaped sections of the hat section panel.

Referring briefly to FIGS. 78-79, shown is an outer wing rib 234 extending between the outer wing front spar 212 and outer wing rear spar 214. The outer wing rib 234 has rib cutouts 268 for accommodating the hat-shaped sections 1210 of the outer wing upper and lower panel assemblies 1200, 1202. The rib outer flanges 178 of the outer wing rib 234 may be bonded and/or mechanically fastened to the outer wing upper panel assembly 1200 and outer wing lower panel assembly 1202. In addition, the outer wing rib 234 may be bonded and/or mechanically fastened to the spar outer flanges 160 of the outer wing front spar 212 and outer wing rear spar 214.

Referring to FIG. 80, each of the hat-shaped sections 1210 may be symmetrical about a hat section vertical axis 1222. Each of the hat-shaped sections 1210 may have a hat section width 1224 of between 3-6 inches and, more preferably, a hat section width 1224 of between 4-5 inches. The hat section width 1224 may be measured between the intersections of the hat section flange 1212 and hat section web 1214 on each side of the hat section vertical axis 1222. In addition, each of the hat-shaped sections 1210 may have a hat section height 1226 of no greater than 3 inches.

Referring to FIGS. 80 and 82, the hat section panel 1206 is comprised of a plurality of hat section panel plies 1208 and is formed into a corrugated shape defined by the plurality of hat-shaped sections 1210. Each of the hat-shaped sections 1210 includes a pair of hat section flanges 1212. Adjacent pairs of hat-shaped sections 1210 share a common hat section flange 1212. In addition, each of the hat-shaped sections 1210 includes a pair of hat section webs 1214. Each hat section web 1214 is connected to a hat section flange 1212 by a radius portion 182. Each hat-shaped section 1210 also includes a hat section cap 1216 interconnecting the hat section webs 1214. Each hat section web 1214 is interconnected to the hat section by a radius portion 182.

Each of the hat section caps 1216 contains one or more 0-degree ply strips 252 interleaved within the hat section panel plies 1208 of the hat section panel 1206. Each 0-degree ply strip 252 has fibers aligned with the spanwise direction or lengthwise direction of the hat-shaped section 1210. As mentioned above, the 0-degree ply strips 252 may be located at an approximate mid-plane of the hat section cap 1216. Each 0-degree ply strip 252 in the hat section cap 1216 may extend across the full width of the hat section cap 1216. To avoid warpage as a result of thermal cycling during curing, each 0-degree ply strip 252 is confined to the hat section cap 1216, and is excluded from the radius portion 182 on each side of the hat section cap 1216. To prevent resin cracking, no more than four 0-degree ply strips 252 are stacked directly on top of each other in the hat section cap 1216. The interleaved 0-degree ply strips 252 increase the bending stiffness of the panel assembly 1200, 1202.

Referring to FIG. 83, the 0-degree ply strips 252 in each of the hat section caps 1216 may have one or more ply drops 264 to gradually reduce the bending stiffness of the outer wing structure 210 along the spanwise direction. However, the hat section panel plies 1208 (excluding the 0-degree ply strips 252) may be constant or continuous in the spanwise direction. The spanwise locations of the ply drops 264 of the 0-degree ply strips 252 in the hat section caps 1216 may be selected to create a desired bending stiffness profile of the outer wing structures 210 along the spanwise direction, and may be based on the predicted wing loading on the outer wing structure 210 during flight.

Referring to FIGS. 76-77 and 80-81, each panel assembly 1200, 1202 may include a plurality of planks 600 extending in a spanwise or lengthwise direction of the hat-shaped sections 1210. The hat plank plies 602 that make up the planks 600 may be continuous and constant along the spanwise direction from the outer wing stout rib 232 toward the wing tip 126. Although FIG. 80 shows an example of a plank 600 having three planks plies 602, a plank 600 may contain any number of planks plies 602. The planks plies 602 may include 0-degree plies and/or 0-degree plies. If non-0-degree plies are included, then the 0-degree plies may comprise the largest percentage of the planks plies 602 in each plank 600.

Each panel assembly 1200, 1202 may include a plank 600 on opposite sides of each of the hat-shaped sections 1210. Each plank 600 may be captured between the outer skin panel 1204 and a hat section flange 1212 of the hat section panel 1206. Each of the planks 600 may be laid up, and may be secondary bonded (e.g., via an adhesive layer), co-cured, or co-bonded to the outer skin panel 1204 and the hat section panel 1206. As shown in FIG. 84, the planks 600 of a hat section panel 1206 may include a ply drop 264 in one or more of the planks plies 602. Each ply drop 264 may be located at a predetermined spanwise location in correspondence with a desired stiffness requirement at the spanwise location of the outer wing structure 210.

Referring to FIG. 81, each of the planks 600 has opposing plank side edges 606. The plank side edges 606 of at least some of the planks 600 may be tapered at an edge taper angle 608 of no greater than 30 degrees relative to the inner surface of the corresponding outer skin panel 1204, and resulting in a generally trapezoidal cross-sectional shape for each plank 600. More preferably, the edge taper angle 608 is between approximately 15-30 degrees. By forming the plank side edges 606 at an edge taper angle 608, mark-off in the inner surface of the outer skin panel 1204 may be reduced or prevented.

Referring to FIGS. 80-81, the inner surface of the outer skin panel 1204 and the plank side edges 606 of adjacent pairs of the planks 600 each define a recess 1230 on opposite sides of each plank 600. The recess 1230 is part of a hat section cavity 1218 defined by the hat section webs 1214 and the hat section cap 1216 of each hat-shaped section 1210. Each hat section cavity 1218 (i.e., and recess 1230) may be filled with a foam member 1228. Each foam member 1228 may have a cross-sectional shape that is complementary to the cross-sectional shape of the hat section cavity 1218 such that each foam members 1228 occupies an entirety of a hat section cavity 1218. By filling the entirety of the hat section cavity 1218, the foam members 1228 may comply with flammability requirements of certain aviation regulatory bodies (e.g., FAA). In addition, the foam members 1228 may increase the overall bending stiffness of the panel assembly 1200, 1202. Furthermore, the foam members 1228 may function as a layup and/or cure tool over which the hat-shaped sections 1210 may be formed during layup of a hat section panel 1206. The foam members 1228 may be comprised of a closed-cell foam material such as Rohacell™.

Referring to FIG. 83, for examples of the outer wing structure 210 that include a fuel tank 128 (e.g., FIGS. 73-74), the outer wing upper panel assembly 1200 and/or the outer wing lower panel assembly 1202 may be configured such that the hat section panel 1206 terminates at the tank outboard end 134 of the fuel tank 128 due to reduced stiffness requirements outboard of the tank outboard end 134. The reduced stiffness requirements may be due to reduced inertial loads of the outer wing structure 210 outboard of the fuel tank 128. However, the outer skin panel 1204 may extend continuously from the outer wing stout rib 232 to the wing tip 126. For panel assemblies 1200, 1202 that include foam members 1228 and/or planks 600, the planks 600 and foam members 1228 may terminate at the same location as the termination of the hat section panel 1206 (e.g., at the tank outboard end 134).

Referring briefly to FIG. 76, shown is a cross-section of a portion of the outer wing structure 210 illustrating the short hat section height 1226 of each of the hat-shaped sections

1210 relative to the large height of a conventional stringer (not shown). As a result of the short hat section height 1226, each panel assembly 1200, 1202 has an area centroid 260 that is nearer to the skin panel 240, 242 than the area centroid of a skin panel having conventional hat stringers. The distance between the area centroids 260 of the outer wing upper panel assembly 1200 and lower panel assembly 1202 corresponds to a large effective wing thickness 262 for the outer wing structure 210 of FIGS. 73-80 relative to a smaller effective wing thickness of a wing assembly that uses conventional stringers. The increased effective wing thickness 262 of the outer wing structure 210 of FIGS. 73-80 results in an increase in the bending load-carrying efficiency of the outer wing structure 210, and which allows for a reduction in the structural mass of the outer wing structure 210.

The outer wing upper panel assembly 1200 may have a higher axial stiffness in the spanwise direction that the axial stiffness of the outer wing lower panel assembly 1202. The increased axial stiffness requirements for the outer wing upper panel assembly 1200 may accommodate compression loads in the outer wing upper panel assembly 1200 during upward bending of the outer wing structure 210. Toward this end, the outer wing upper panel assembly 1200 may have an increased quantity of 0-degree ply strips in the hat section caps 1216 and/or in the planks 600, and/or an increased quantity of hat section panel plies 1208 or a larger cross-sectional size of the hat-shaped sections 1210 that make up the hat section panel 1206 of the outer wing upper panel assembly 1200.

FIG. 85 is a flowchart of a method 1300 of manufacturing a composite wing assembly 120 having outer wing structures 210 as shown in the above-described FIGS. 73-84. The method 1300 includes step 1302 of bonding a hat section panel 1206 to an outer skin panel 1204 of an outer wing upper panel assembly 1200 and an outer wing lower panel assembly 1202 of an outer wing structure 210. As described above, each outer skin panel 1204 of the outer wing upper lower panel assembly is comprised of acreage plies 302 having a panel thickness that is constant along a spanwise direction. The hat section panel 1206 may also have a panel thickness that is constant along a spanwise direction. In addition, the hat section panel 1206 has a plurality of generally parallel hat-shaped sections 1210 each extending in a spanwise direction.

The method 1300 of manufacturing the wing assembly 120 having outer wing structures 210 of FIGS. 73-84 may include any one or more of the above-described steps of method 500 (FIG. 46), method 800 (FIG. 58), or method 1000, except that instead of interleaving 0-degree strip sets 250 into the skin panels 240, 242 of the outer wing structure 210 (e.g., FIGS. 41-45) or bonding planks 600 (e.g., FIGS. 54-55) or outer wing stringers 272 (e.g., FIGS. 62 and 68-69) to skin panels of the outer wing structure 210, the method 1300 involves bonding a hat section panel 1206 to an outer skin panel 1204 to result in an outer wing upper panel assembly 1200 or an outer wing lower panel assembly 1202 as shown in FIGS. 76-77.

Prior to bonding the hat section panel 1206 to the outer skin panel 1204, the method 1300 may include laying up a quantity of acreage plies 302 to result in the outer skin panel 1204. The acreage plies 302 may include unidirectional plies 306, and may exclude fabric plies 304. The step of laying up the acreage plies 302 may include laying up 0-degree plies and 90-degree plies at a ratio of 0-degree plies to 90-degree plies of between 1.75 and 2.5 to provide a higher magnitude of stiffness in the spanwise direction relative to the stiffness in the chordwise direction. However, the outer skin panel 1204 may be laid up in any ratio of 0-degree plies to 90-degree plies.

The method 1300 may also include laying up a plurality of hat section panel plies 1208 to result in the hat section panel 1206. The method 1300 may include laying up the hat section panel 1206 using fabric plies 304 to form the hat section panel 1206 in the corrugated shape defined by the spaced apart hat-shaped sections 1210. The hat section panel 1206 may be devoid of unidirectional plies 306 to avoid warpage and/or wrinkling that may occur when curing a non-planar composite laminate laid up of unidirectional plies 306. As mentioned above, the hat-shaped sections 1210 of a hat section panel 1206 may all have the same configuration, which may keep the chordwise mass distribution of the outer wing structure 210 within 10 percent at all chordwise locations.

The step of laying up the hat section panel plies 1208 to result in the hat section panel 1206 may include spacing the hat-shaped sections 1210 apart from each other at a chordwise spacing 256 of from 6-11 inches between hat section centerlines 1220. Each of the hat-shaped sections 1210 may be laid up to be symmetrical about a hat section vertical axis 1222. In addition, as mentioned above, the hat-shaped sections 1210 in each of the outer wing structures 210 may be aligned with the center wing stringers 270 of the center wing structure 150. The step of laying up the hat section panel 1206 may also include laying up each of the hat-shaped sections 1210 with a hat section width 1224 of between 3-6 inches, and/or a hat section height 1226 of no greater than 3 inches to keep the area centroid near the outer skin panel 1204.

The step of laying up a plurality of hat section panel plies 1208 to result in the hat section panel 1206 may include interleaving one or more 0-degree ply strips 252 within the hat section panel plies 1208 at each of a plurality of hat section caps 1216 respectively of the plurality of hat-shaped sections 1210. The 0-degree ply strips 252 may be interleaved at an approximate mid-plane of each hat section cap 1216. As mentioned above, the interleaved 0-degree ply strips 252 may contribute toward the bending stiffness provided by the hat-shaped sections 1210.

The step of laying up the hat-shaped sections 1210 may also include the incorporation of one or more ply drops 264 in the 0-degree ply strips 252 of the hat section caps 1216 as a means to gradually reduce the bending stiffness of the outer wing structure 210 along the spanwise direction. Although the 0-degree ply strips 252 include one or more ply drops 264, the hat section panel plies 1208 that define the hat section panel 1206 may be constant and continuous in a spanwise direction from the outer wing stout rib 232 toward the wing tip 126.

In some examples, the method 1300 may further include laying up a plurality of planks plies 602 on the inner surface of the outer skin panel 1204 to result in a plurality of planks 600 each extending in a spanwise direction and respectively located between the plurality of hat-shaped sections 1210. The step of laying up the planks plies 602 may include laying up a plurality of 0-degree plies and non-0-degree plies to result in a plank 600. As mentioned above, the 0-degree plies may comprise the largest percentage of planks plies 602 in the planks 600. The planks plies 602 may be planar in shape, and may therefore be laid up of unidirectional plies 306 including 0-degree plies and non-0-degree plies. After laying up the planks 600, the method 1300 may include positioning the planks 600 between the inner surface of the hat section flanges 1212 and the inner surface of the outer skin panel 1204, and bonding the hat section panel 1206 to the planks 600 and to the outer skin panel 1204 such that the planks 600 are captured between the outer skin panel 1204 and the hat section panel 1206. Advantageously, the planks 600 may increase the bending stiffness of the upper and lower panel assemblies 1200, 1202.

The step of laying up the planks plies 602 may include laying up each of the planks 600 with opposing plank side edges 606 that are tapered at an edge taper angle 608 of no greater than 30 degrees relative to the inner surface of the corresponding outer skin panel 1204, and which may result in a generally trapezoidal cross-sectional shape for each plank 600 as shown in FIG. 81. The step of laying up the planks plies 602 to form the planks 600, and positioning the planks 600 on the outer skin panel 1204 may result in a recess 1230 defined between adjacent pairs of the planks 600, as shown in FIG. 81. As described above, each recess 1230 may form a part of a hat section cavity 1218 that may optionally be filled with a foam member 1228.

The method 1300 may also include the step of incorporating one or more ply drops 264 in the planks plies 602 as a means to gradually reduce the bending stiffness of the outer wing structure 210 and the spanwise direction. As mentioned above, the planks 600 may each have a plank width 604 of between 3-6 inches. As shown in FIGS. 76-77, the plank width 604 may be dictated by the hat section width 1224 of each of the hat-shaped sections 1210, and also by the chordwise spacing 256 of the hat-shaped sections 1210.

As mentioned above, the outer wing upper and/or lower panel assembly 1200, 1202 may include foam members 1228. In this regard, the method 1300 may include laying up a hat section panel 1206 over a plurality of foam members 1228 to result in the plurality of the hat-shaped sections 1210. As mentioned above, the foam members 1228 may be contoured complementary to the desired configuration of the hat-shaped sections 1210 of the hat section panel 1206. Each foam member 1228 may function as a layup mandrel and/or cure mandrel over which the hat section panel plies 1208 may be laid up. After curing of the hat section panel 1206, the foam member 1228 may be retained within the hat section cavity 1218, and the method may further include bonding the hat section panel 1206 to the outer skin panel 1204 to result in the foam members 1228 being captured therebetween. Alternatively, the foam members 1228 may be removed from each hat section cavity 1218 prior to bonding the hat section panel 1206 to the outer skin panel 1204.

For examples where the outer wing structure 210 is configured to include a fuel tank 128, the method 1300 may include laying up each hat section panel 1206 such that the hat section panel 1206 extends no further outboard than the tank outboard end 134. In this regard, each outer wing structure 210 may be devoid of the hat section panel 1206 (e.g., including planks 600 and/or foam members 1228) beyond the tank outboard end 134.

Step 1304 of the method 1300 may be substantially similar to the above-described step 704 of the method 700, and/or the above-described step 1004 of the method 1000. For example, step 1304 includes coupling the outer wing upper panel assembly 1200 and the outer wing lower panel assembly 1202 to the outer wing front spar 212 and the outer wing rear spar 214 of the outer wing structure 210 (e.g., FIGS. 73-74). The outer wing upper and lower panel assembly 1200, 1202 may be bonded and/or mechanically fastened to the outer wing front spar 212, the outer wing rear spar 214, and the outer wing ribs 234 including the outer wing stout rib 232.

Step 1306 of the method 1300 may be substantially similar to the above-described step 706 of the method 700, and/or the above-described step 1006 of the method 1000. For example, step 1306 includes coupling the outer wing inboard end 230 of each one of the pair of outer wing structures 210 (e.g., FIGS. 73-74) respectively to opposing center wing outboard ends 168 of the center wing structure 150 to define a pair of wing joints 172. As described above and shown in FIG. 4, the center wing structure 150 has an engine mounting location on each of opposing sides of a wing centerline 124. The spar terminal ends 156 of the center wing front spar 152 and the center wing rear spar 154 at each wing joint 172 are located no further inboard than an engine centerline 106 associated with the engine mounting location, and no further outboard of the engine centerline 106 than ten percent of a distance between the engine centerline 106 and the wing centerline 124.

FIG. 86 is a flowchart of a method 1400 of loading (e.g., applying a load) a composite wing assembly 120 having outer wing structures 210 configured as shown in the above-described FIGS. 73-84. The method 1400 includes step 1402 of providing a wing assembly 120 having a pair of outer wing structures 210 each joined to a center wing structure 150. Each outer wing structure 210 may be configured similar to the arrangement shown in FIGS. 73-74.

The method 1400 includes step 1404 of placing the wing assembly 120 in a ground static loading condition, and step 1406 of placing the wing assembly 120 in a dynamic loading condition. As described above, the ground static loading condition is associated with the aircraft 100 substantially non-moving and under a ground static loading in which the wing assembly 120 is subjected to gravitational force due to a structural mass of the wing assembly 120. The dynamic loading condition is associated with the aircraft 100 in motion and the wing assembly 120 subjected to gravitational force due to the structural mass of the wing assembly 120, inertial force due to the structural mass of the wing assembly 120, aerodynamic loads on the wing assembly 120, and/or control surface loads on the wing assembly 120

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A wing assembly for an aircraft, comprising:
   a center wing structure, including:
      a pair of center wing outboard ends and a pair of engine mounting locations respectively on opposite sides of a wing centerline;
      a center wing rib at each of the center wing outboard ends;
      a center wing front spar and a center wing rear spar each having a spar terminal end at each of the center wing outboard ends;
   a pair of outer wing structures, each including:
      an outer wing inboard end;
      an outer wing rib at the outer wing inboard end, and configured to be positioned in back-to-back arrangement with, and mechanically fastened to, the center wing rib to define a wing joint coupling the outer wing structure to the center wing structure;
      an outer wing front spar and an outer wing rear spar each having a spar terminal end at the outer wing inboard end, and configured to be coupled respectively to the center wing front spar and the center wing rear spar at the wing joint; and wherein the center wing structure is configured such that the spar terminal ends of the center wing front spar and the center wing rear spar at each wing joint are located no further inboard than an engine centerline associated with the engine mounting location, and no further outboard of the engine centerline than ten percent of a distance between the engine centerline and the wing centerline.

2. The wing assembly of claim 1, wherein each wing joint includes:

a front spar splice plate coupling the center wing front spar to the outer wing front spar; and a rear spar splice plate coupling the center wing rear spar to the outer wing rear spar.

3. The wing assembly of claim 1, wherein:

the center wing structure includes a plurality of the center wing ribs, including a center wing stout rib at each of the center wing outboard ends, each center wing stout rib having a strength capability that is higher than the strength capability of the remaining center wing ribs; and each of the outer wing structures includes a plurality of the outer wing ribs, including an outer wing stout rib at the outer wing inboard end, each outer wing stout rib having a strength capability that is higher than the strength capability of the remaining outer wing ribs.

4. The wing assembly of claim 1, wherein each of the outer wing structures comprises:

an outer wing upper skin panel and an outer wing lower skin panel coupled to the outer wing front spar and the outer wing rear spar; and wherein at least one of the outer wing upper skin panel and outer wing lower skin panel is comprised of acreage plies defining a panel thickness that is constant along a spanwise direction from an outer wing inboard end toward a wing tip.

5. The wing assembly of claim 1, wherein each of the outer wing structures comprises:

an outer wing upper skin panel and an outer wing lower skin panel coupled to the outer wing front spar and the outer wing rear spar, at least one of the outer wing upper skin panel and outer wing lower skin panel is comprised of acreage plies; and one or more 0-degree strip sets coupled to at least one of the outer wing upper skin panel and the outer wing lower skin panel, each 0-degree strip set extends in a spanwise direction, and each includes one or more 0-degree ply strips interleaved within the acreage plies.

6. The wing assembly of claim 1, wherein each of the outer wing structures comprises:

an outer wing upper skin panel and an outer wing lower skin panel coupled to the outer wing front spar and the outer wing rear spar, at least one of the outer wing upper skin panel and outer wing lower skin panel is comprised of acreage plies; and one or more planks bonded to an inner surface of at least one of the upper skin panel and the lower skin panel and extending in a spanwise direction, each plank comprised of a stack of plank plies of narrower width than the acreage plies.

7. The wing assembly of claim 6, wherein:

each plank has a plank bending stiffness that is approximately 40-60 percent of a combined plank-skin portion bending stiffness of the plank and a skin panel portion of the upper skin panel or lower skin panel supported by the plank; and the skin panel portion having a panel portion width defined as one of the following:

the panel portion width extending between midpoints respectively located on opposite sides of the plank, each midpoint located midway between the plank and an immediately adjacent plank;

the panel portion width extending between a spar on one side of the plank and, on an opposite side of the plank, a midpoint between the plank and an immediately adjacent plank.

8. The wing assembly of claim 1, wherein each of the outer wing structures comprises:

an outer wing upper skin panel and an outer wing lower skin panel coupled to the outer wing front spar and the outer wing rear spar;

one or more outer wing stringers coupled to at least one of the outer wing upper skin panel and the outer wing lower skin panel; and the one or more outer wing stringers extend in a spanwise direction, and each outer wing stringer has a hat-shaped cross section, comprising a pair of stringer flanges, a pair of stringer webs extending outwardly respectively from the pair of stringer flanges, and a stringer cap interconnecting the pair of stringer flanges.

9. The wing assembly of claim 1, further comprising:

an outer wing upper panel assembly and an outer wing lower panel assembly each extending along a spanwise direction and coupled to the outer wing front spar and the outer wing rear spar, each panel assembly including:

an outer skin panel comprised of acreage plies and having a panel thickness that is constant along a spanwise direction; and a hat section panel coupled to an inner side of the outer skin panel, the hat section panel comprised of a plurality of hat section panel plies formed into a corrugated shape defined by a plurality of generally parallel hat-shaped sections each extending in a spanwise direction, each of the hat-shaped sections includes a pair of hat section flanges, a pair of hat section webs extending outwardly respectively from the hat section flanges, and a hat section cap interconnecting the hat section webs.

10. The wing assembly of claim 9, wherein:

each of the hat section caps contains one or more 0-degree ply strips interleaved within the hat section panel plies of the hat section panel.

11. A method of manufacturing a wing assembly of an aircraft, comprising:

coupling an outer wing rib on an outer wing inboard end of each one of a pair of outer wing structures to a center wing rib respectively on opposing center wing outboard ends of a center wing structure to define a pair of wing joints coupling the outer wing structures to the center wing structure, and the outer wing rib and the center wing rib at each wing joint are in back-to-back arrangement and are mechanically fastened together; and wherein the center wing structure has a center wing front spar and a center wing rear spar, each having a spar terminal end at each of the center wing outboard ends, and an engine mounting location on each of opposing sides of a wing centerline, and each of opposing spar terminal ends of the center wing front spar and the center wing rear spar at each wing joint are located no further inboard than an engine centerline associated with the engine mounting location, and no further outboard of the engine centerline than ten percent of a distance between the engine centerline and the wing centerline.

12. The method of claim 11, wherein coupling the outer wing rib on the outer wing inboard end of each outer wing structure to the center wing rib respectively on the opposing center wing outboard ends of the center wing structure includes performing the following at each wing joint:
coupling, using a front spar splice plate, the center wing front spar to an outer wing front spar of the outer wing structure; and
coupling, using a rear spar splice plate, the center wing rear spar to an outer wing rear spar of the outer wing structure.

13. The method of claim 11, wherein coupling the outer wing rib on the outer wing inboard end of each outer wing structure to the center wing rib respectively on the opposing center wing outboard ends of the center wing structure includes performing the following at each wing joint:
coupling an outer wing stout rib on the outer wing inboard end of the outer wing structure, to a center wing stout rib on the center wing outboard end of the center wing structure, such that the outer wing stout rib and the center wing stout rib are in back-to-back arrangement;
wherein:
each center wing structure includes a plurality of the center wing ribs, including a center wing stout rib at each center wing outboard end, and the center wing stout rib has a strength capability that is higher than the strength capability of the remaining center wing ribs; and
each of the outer wing structures includes a plurality of the outer wing ribs, including an outer wing stout rib at the outer wing inboard end, and the outer wing stout rib has a strength capability that is higher than the strength capability of the remaining outer wing ribs.

14. The method of claim 11, further comprising:
laying up at least one of an outer wing upper skin panel and an outer wing lower skin panel to include acreage plies defining a panel thickness that is constant along a spanwise direction from the outer wing inboard end to a wing tip; and
coupling the outer wing upper skin panel and the outer wing lower skin panel to an outer wing front spar and an outer wing rear spar of each of the outer wing structures.

15. The method of claim 11, further comprising:
interleaving one or more 0-degree ply strips within acreage plies of at least one of an outer wing upper skin panel and an outer wing lower skin panel, the 0-degree ply strips extending in a spanwise direction; and
coupling the outer wing upper skin panel and the outer wing lower skin panel to an outer wing front spar and an outer wing rear spar of each of the outer wing structures.

16. The method of claim 11, further comprising:
bonding one or more planks bonded to an inner surface of at least one of an outer wing upper skin panel and an outer wing lower skin panel of each outer wing structure, each plank extending in a spanwise direction and comprised of a stack of plank plies; and
coupling the outer wing upper skin panel and the outer wing lower skin panel to an outer wing front spar and an outer wing rear spar of each of the outer wing structures.

17. The method of claim 16, further comprising:
laying up each plank to have a plank bending stiffness that is approximately 40-60 percent of a combined plank-skin portion bending stiffness of the plank and a skin panel portion;
the skin panel portion having a panel portion width defined as one of the following:
the panel portion width extends between midpoints respectively located on opposite sides of the plank, each midpoint located midway between the plank and an immediately adjacent plank;
the panel portion width extends between a spar on one side of the plank and, on an opposite side of the plank, a midpoint between the plank and an immediately adjacent plank.

18. The method of claim 11, further comprising:
bonding one or more outer wing stringers to at least one of an outer wing upper skin panel and an outer wing lower skin panel of each outer wing structure, each outer wing stringer extending in a spanwise direction and comprised of a plurality of stringer plies and having a stringer cap containing one or more 0-degree ply strips; and
coupling the outer wing upper skin panel and the outer wing lower skin panel to an outer wing front spar and an outer wing rear spar of an outer wing structure.

19. The method of claim 11, further comprising:
bonding a hat section panel to an outer skin panel of at least one of an outer wing upper panel assembly and an outer wing lower panel assembly, the hat section panel is comprised of a plurality of hat section panel plies formed into a corrugated shape defined by a plurality of generally parallel hat-shaped sections each extending in a spanwise direction, each of the hat-shaped sections includes a pair of hat section flanges, a pair of hat section webs extending outwardly respectively from the hat section flanges, and a hat section cap interconnecting the hat section webs, the outer skin panel is comprised of acreage plies having a panel thickness that is constant along a spanwise direction; and
coupling the outer wing upper panel assembly and the outer wing lower panel assembly to an outer wing front spar and an outer wing rear spar of an outer wing structure.

20. A method of loading a wing assembly of an aircraft, comprising:
providing a wing assembly having a pair of outer wing structures each joined to a center wing structure, the center wing structure including:
a pair of center wing outboard ends and a pair of engine mounting locations respectively on opposite sides of a wing centerline;
a center wing rib at each of the center wing outboard ends;
a center wing front spar and a center wing rear spar each having a spar terminal end at each of the center wing outboard ends;
the pair of outer wing structures each including:
an outer wing inboard end;
an outer wing rib at the outer wing inboard end, and positioned in back-to-back arrangement with, and mechanically fastened to, the center wing rib to define a wing joint coupling the outer wing structure to the center wing structure;

an outer wing front spar and an outer wing rear spar coupled respectively to the center wing front spar and the center wing rear spar at the wing joint;

wherein the spar terminal ends of the center wing front spar and the center wing rear spar at each wing joint are located no further inboard than an engine centerline associated with the engine mounting location, and no further outboard of the engine centerline than ten percent of a distance between the engine centerline and the wing centerline;

placing the wing assembly in a ground static loading condition; and placing the wing assembly in a dynamic loading condition.

\* \* \* \* \*